(12) United States Patent
Maki et al.

(10) Patent No.: US 7,983,560 B2
(45) Date of Patent: Jul. 19, 2011

(54) MODULAR WSS-BASED COMMUNICATIONS SYSTEM WITH COLORLESS ADD/DROP INTERFACES

(75) Inventors: Jeffery J. Maki, Fremont, CA (US); Christopher M. Look, Pleasanton, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 951 days.

(21) Appl. No.: 11/546,676

(22) Filed: Oct. 11, 2006

(65) Prior Publication Data

US 2009/0041457 A1 Feb. 12, 2009

Related U.S. Application Data

(60) Provisional application No. 60/725,728, filed on Oct. 11, 2005.

(51) Int. Cl.
*H04J 14/00* (2006.01)
*H04J 14/02* (2006.01)
(52) U.S. Cl. ............... 398/50; 398/5; 398/48; 398/56; 398/83
(58) Field of Classification Search ............... 398/1, 2, 398/3, 5, 7, 45–57, 83
See application file for complete search history.

(56) References Cited

U.S. PATENT DOCUMENTS

| | | | |
|---|---|---|---|
| 6,973,229 B1 * | 12/2005 | Tzathas et al. | 385/16 |
| 7,416,347 B2 * | 8/2008 | Livingston et al. | 385/53 |
| 2002/0186432 A1 * | 12/2002 | Roorda et al. | 359/128 |
| 2003/0016925 A1 * | 1/2003 | Sun et al. | 385/115 |
| 2003/0161629 A1 * | 8/2003 | Frascolla et al. | 398/5 |
| 2005/0012985 A1 * | 1/2005 | Tsadka et al. | 359/333 |
| 2007/0014510 A1 | 1/2007 | Kusama | |
| 2008/0056715 A1 | 3/2008 | Akiyama et al. | |

OTHER PUBLICATIONS

International Search Report and Written Opinion, Application No. PCT/US08/78034, dated Dec. 2, 2008.
PCT Chapter I International Preliminary Report on Patentability (IPER) for PCT Application No.: PCT/US2008/078034 mailed Mar. 29, 2011.

* cited by examiner

*Primary Examiner* — Ken N Vanderpuye
*Assistant Examiner* — Daniel G Dobson
(74) *Attorney, Agent, or Firm* — Blakely, Sokoloff, Taylor & Zafman, LLP

(57) ABSTRACT

Modular WSS-based Communications system with colorless and network-port transparent add/drop interfaces is described herein. According to certain aspects of the invention, equipment architecture is provided that enables a linear, ring, and mesh optical network. The embodiments of the invention are primarily on how to add and drop signals at a node of the network. The embodiments of the invention are based on the use a wavelength selective switch (WSS), which is an emerging component technology. Other methods and apparatuses are also described.

24 Claims, 81 Drawing Sheets

MODULAR WSS-BASED COMMUNICATIONS SYSTEM WITH COLORLESS ADD/DROP INTERFACES

RELATED APPLICATIONS

This application claims the benefit of U.S. Provisional Patent Application No. 60/725,728, entitled "Modular WSS-Based Communications System With Colorless Add/Drop Interfaces", filed Oct. 11, 2005, which is incorporated by reference herein in its entirety.

FIELD OF THE INVENTION

The present invention relates generally to an optical networking system. More particularly, this invention relates to a modular WSS-based communications system with colorless add/drop interfaces that are not network-port assigned.

BACKGROUND

The application covers the creation of a colorless and transparent mesh optical network, where we define colorless to mean no fiber or component is pre-assigned a specific operating channel wavelength and where we define transparent to mean no node of the network becomes blocking for any subset of the operating channel wavelengths passing through to other nodes or being added/dropped from/to a specific colorless (tunable) transponder. Three forms of blocking are explicitly considered: (1) Contention where a channel wavelength is already in use between two or more nodes and thus preventing a distant node from using that channel wavelength to send a signal through those two or more nodes when no optical-to-electrical-to-optical (OEO) conversion is employed at the intermediate nodes. (2) Unpopulated equipment where a channel wavelength is blocked either from passing through or being added/dropped because the equipment is not installed to support that channel wavelength, which is a problem of downward scalability while maintaining all channel wavelengths. (3) Transponders tied to a particular network port preventing signals being added/dropped at any wavelength to/from any other port of the network. It is the second and third definition of blocking we are primarily trying to solve; however, we do solve the first definition of blocking when solving the second and third. Such solutions to the problem of blocking thus provide the desired network transparency.

In regards to the second definition, mesh optical networks can be based on N×N space-switch matrices. Transparency is lost when the equipment is not fully populated at each node, so that certain channel wavelengths are not supported, which is called channel blocking. N×N switches must be installed for each channel wavelength to avoid blocking regardless of the degree of the network at that node.

In regards to the third definition, mesh optical networks can be based on interconnecting "East-West" Reconfigurable Optical Add/Drop Multiplexers (ROADMs) when based on Wavelength Selective Switch (WSS) modules. It is the means of doing adds/drops with "East-West" ROADMs that causes transparency to be lost. For a direct application of "East-West" ROADMs to form degree-2 network nodes in a ring network topology, this lack of transparency has been acceptable owing to the bi-directional nature of rings. When scaling beyond a degree-2 network node to form a mesh network, this lack of transparency is problematic. Alternative routes through the network are not always available and if available their use can exasperate wavelength contention (i.e., the first definition of blocking given above).

SUMMARY OF THE DESCRIPTION

A modular WSS-based Communications system with colorless and transparent add/drop interfaces is described herein. According to certain aspects of the invention, equipment architecture is provided that enables a mesh optical network. The embodiments of the invention are primarily on how to add and drop signals at a node of the network in a network port and wavelength independent fashion. The embodiments include (a) a modular arrangement of the hardware enabling components such as a WSS to plug into a chassis containing optical and electronics backplanes, (b) provision for uninterrupted service while adding the modules, (c) the ability to monitor the quality of the optical signal(s) at ingress and egress to the node, (d) the ability to perform diagnostic functions such as optical loop-back, and (e) provisions for service restoration in the event of a fiber or equipment failure. The embodiments of the invention are based on the use a wavelength selective switch (WSS), which is an emerging component technology.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

A modular WSS-based Communications system with colorless and network-port transparent add/drop interfaces is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to one embodiment, an equipment architecture is provided that enables a mesh optical network. The embodiments of the invention are primarily on how to add and drop signals at a node of the network. The embodiments of the invention are based on the use of a wavelength selective switch (WSS), which is an emerging component/module technology.

In one embodiment, any node of the possible mesh network is scalable from degree 1 up to the degree N of the WSS. The number of bidirectional network ports supported by the node can be no larger than the difference between the number of WSS-module ports, N, and the number of Add-Drop modules, where the number of Add-Drop modules is always less than N. The wavelength Add-Drop modules described herein require fewer (as compared to alternative architectures) or no 1×N, N×1, or N×N space switches, which thus reduces cost and complexity. The slots of the chassis can be made to be generic so modules may be placed in arbitrary slots. The modules can be hot swappable, and thus enable a node to be upgradeable and down-gradable whilst in service. All channel wavelengths are available for use regardless of degree the node is configured to support. The design does not require channel depopulation (which would result in blocking) to reduce cost. Optical 2R with optional wavelength conversion are easily provided by a separate optional module similar to a module consisting of tunable transponders. The optical modules of the system are compatible with each other allowing for a common chassis to interconnect them all, with any module using any slot.

This optical network design makes possible a metropolitan area mesh network that may be deployed to fit minimum initial needs for degree and active channel plan, yet is scalable to higher degree and expanded active channel plan, while being cost minimized for each level of deployment.

Figure 1:
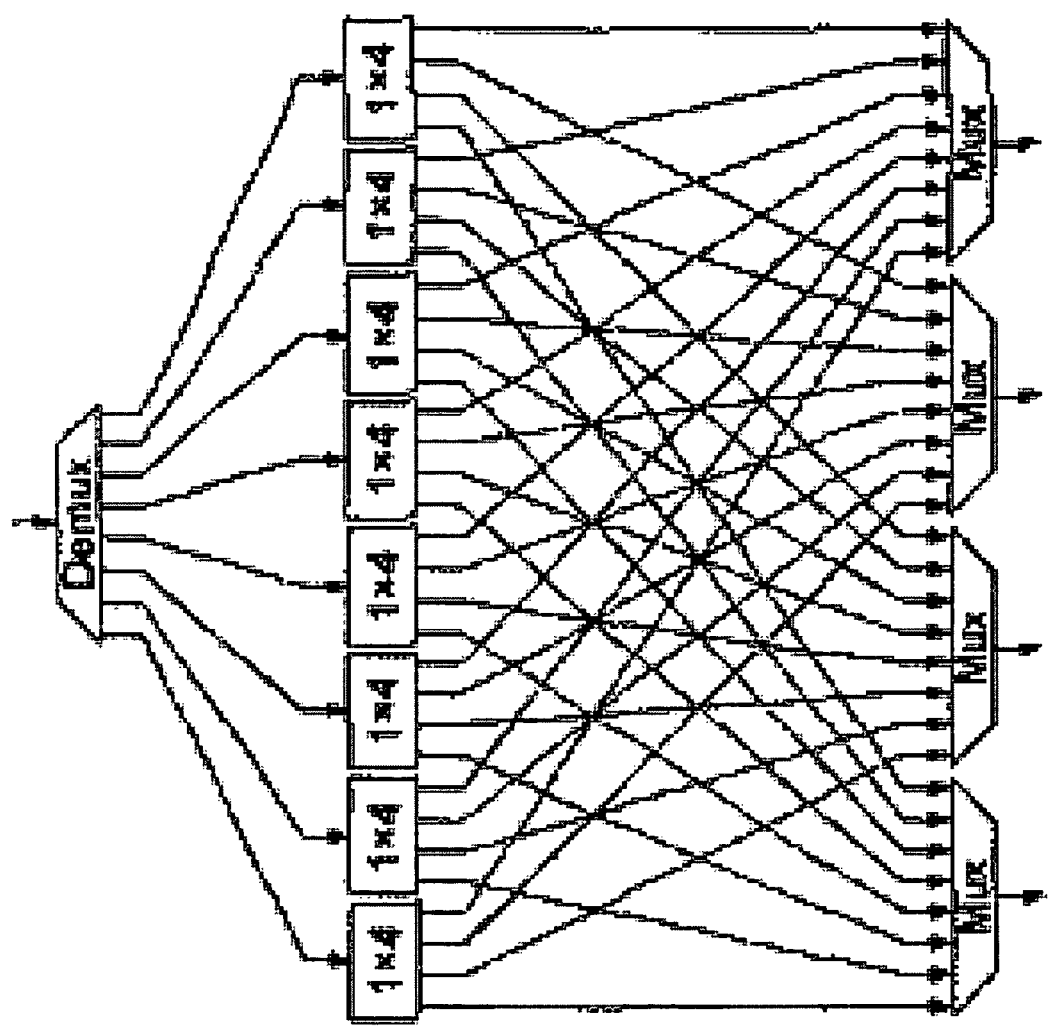
FIG. 1 shows a certain embodiment of a conventional WSS module with arrows to show the direction of the optical signal transmission when used as a 1×N WSS module. An N×1 module would be depicted with arrows in the opposite direction.
Figure 2:
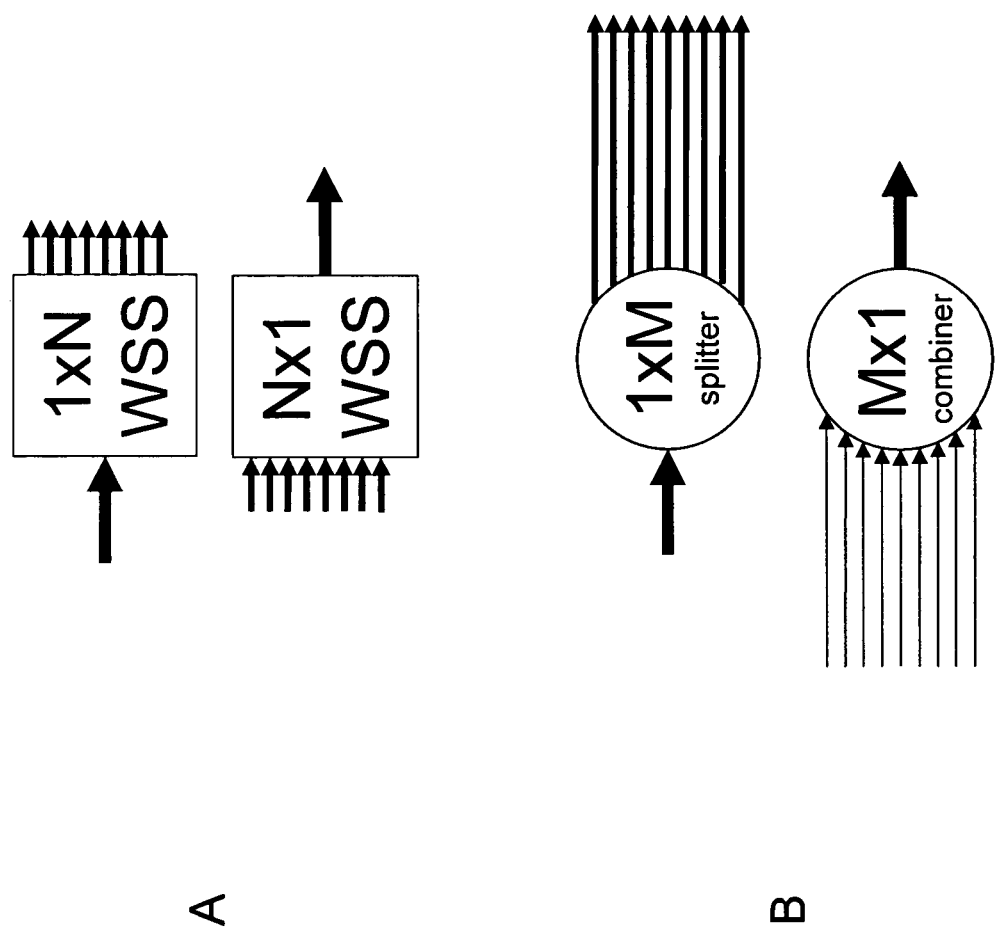
FIG. 2A shows the symbols used to depict WSS modules in a 1×N or an N×1 usage.
FIG. 2B shows the symbol used to depict a standard M-port optical splitter/combiner in a 1×M splitter or M×1 combiner usage, where it is to be understood that the splitter/combiner has little or no wavelength dependence.

As mentioned above, embodiments of the invention include an equipment architecture that enables a modular and scalable, colorless and transparent, optical-communications system. In one embodiment, no optical fiber or optical component is wavelength assigned or network-port assigned before being used as compared to prior art that generally has the wavelength and/or the network port pre-determined at the time of physical connection. The system provides for arbitrary wavelength reconfiguration and arbitrary selection of network-port for connection with a given transponder. The particular wavelength selection is limited by the tunability of the components. The components are intended to be tunable over the C-band, L-band, S-band, or superset such as C- and L-bands. For example, C-band operation could include at least 40 channels at 100 GHz spacing or 80 channels at 50 GHz spacing. The typical exact channel wavelengths would be expected to follow the International Telecommunications Union standard known as the ITU grid. An embodiment of the invention makes use of wavelength selective switch (WSS) component/module technologies. Shown in FIG. 1 is an example of a 1×4 WSS prior art that portrays some functionality. It has 4 ports of which up to 8 possible channel wavelengths may be routed. In general, the WSS is found in two varieties of usage as shown in FIG. 2A, a 1×N WSS and an N×1 WSS. The 1×N WSS partially or fully demultiplexes incoming multiple channel-wavelength signals from a single network fiber and routes them to N output ports. Most typical WSS components/modules route each unique input channel-wavelength signal to an arbitrary but single output port; however, certain other WSS are capable of effectively power splitting the channel-wavelength signal so that the WSS routes the input channel-wavelength signal to two or more output ports, which is known as optical broadcasting or multicasting. N is typically 2, 4, 5, 8, or 9, and can be larger. The maximum number of channel wavelengths can be much larger, such as 40 or more as discussed above. Thus each output port of the 1×N WSS may have one or more channel-wavelength signals.

The signals are mutually exclusive between the output ports when broadcasting/multicasting, if available in the WSS, is not employed. In addition, each channel may be attenuated and even blocked, so that not all input signals necessarily are output by the 1×N WSS. The N×1 WSS multiplexes the single or multiple channel-wavelength signals from each of the N input ports to a single output port. Similar to the 1×N WSS, each channel may be attenuated and even blocked, so not all input signals necessarily are output by the N×1 WSS. For the N×1 WSS, this blocking feature is highly important when signals are not mutually exclusive between the input ports. By blocking all but one signal of the same channel wavelength, optical and hence electrical interference at the receiver is prevented, which is typically required. Many of the characteristics of an N×1 WSS are shared with a 1×N WSS. The N×1 WSS is essentially a 1×N WSS operating in reverse direction of optical propagation and is optimized for wavelength multiplexing input signals from the N ports of the WSS onto a single outgoing network fiber.

Another embodiment of the invention makes use of both wavelength selective switch (WSS) component/module technologies and optical splitters/combiners. In general, a splitter/combiner is found in two varieties of usage as shown in FIG. 2B, a 1×M splitter and an M×1 combiner. Different from 1×N WSS component/module, for a 1×M splitter, the same multiplexed wavelength signals that appear on the input to a splitter always also appear on all of the output ports of the splitter, which is optical broadcasting or multicasting. Different from N×1 WSS component/module, for an M×1 combiner, all wavelength signals at the M inputs always appear multiplexed at the output of the combiner. There is no ability to block selectively wavelength signals passing through a splitter/combiner.

Modular Optical Cross-Connect System Examples

Figure 3:
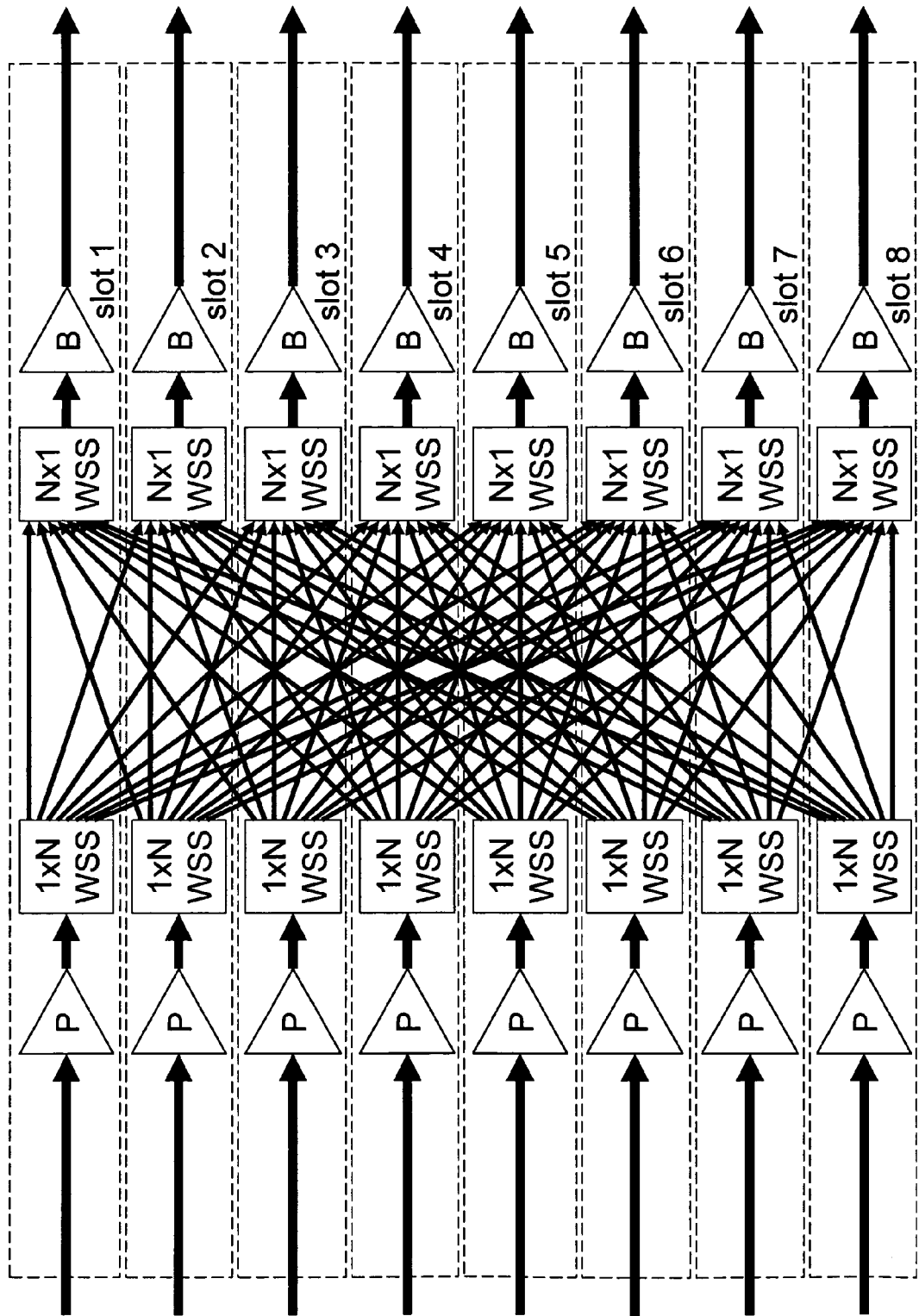
FIGS. 3-5 show WSS modules used to form Optical Cross-Connects (OXCs) according to certain embodiments of the invention.

FIG. 3 is a possible degree-8 node of a communications system based upon 1×N and N×1 wavelength selective switches for N≧8 according to one embodiment. This is also referred to case #1. As shown in FIG. 3, major components are spread over a set of Cross-Connect boards placed into slots of a chassis, where each board in a slot provides bidirectional communication with a remote node. The chassis includes backplanes to interconnect the boards optically and electrically. The optical fibers interconnecting the 1×N and N×1 WSS form the Optical backplane.

Figure 4:
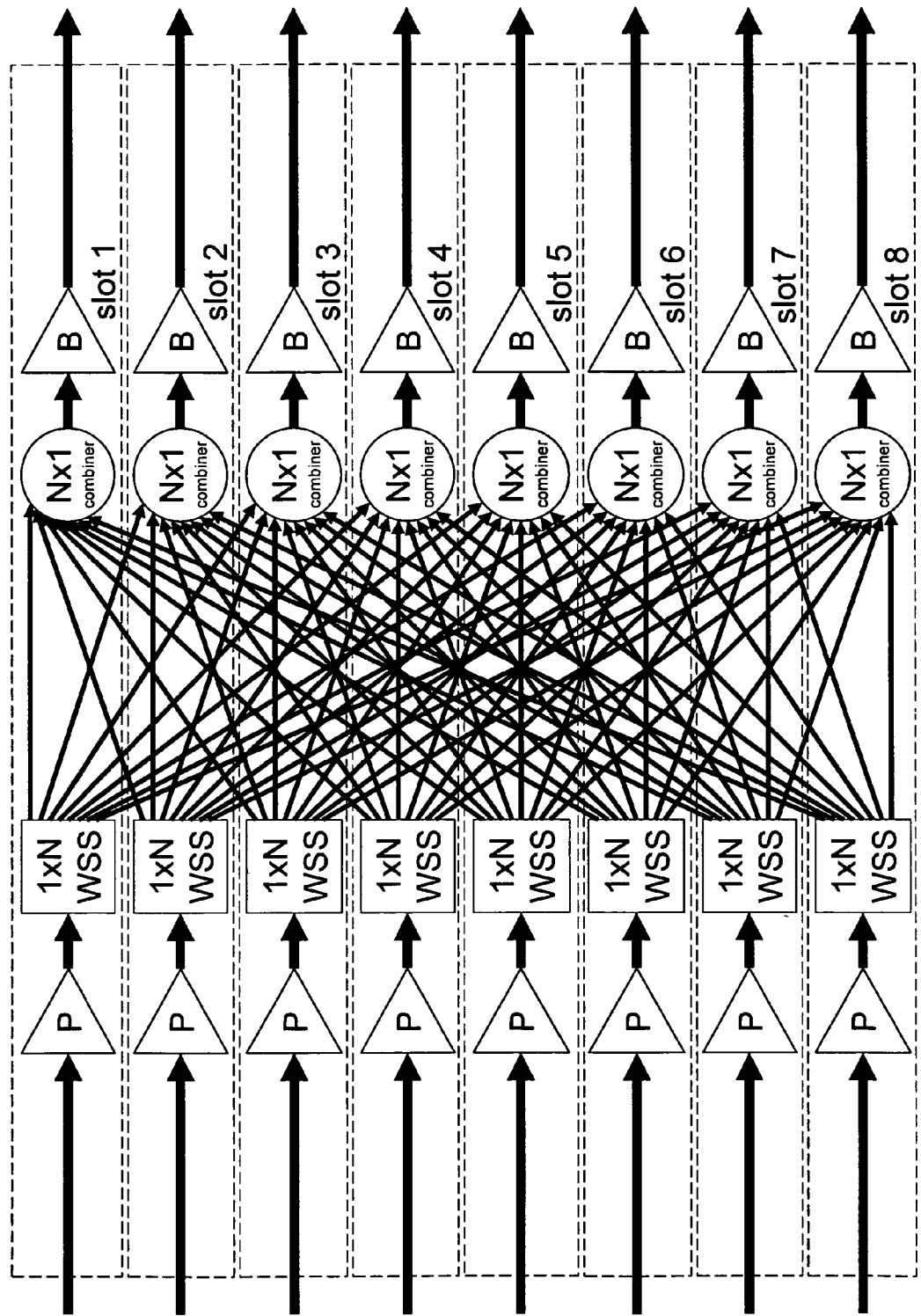

One of the advantages of using two WSSs for each Cross-Connect board placed in a slot is that the crosstalk is greatly reduced owing to the double isolation according to certain embodiments of the invention. In the event that a single WSS provides sufficiently weak crosstalk and the optical loss of an N×1 combiner can be tolerated, then FIG. 4 gives an alternative approach for making a degree-8 node for N≧8 according to certain embodiments. This is also referred to as case #2, where each Cross-Connect board placed in a slot has one 1×N WSS and one N×1 combiner, where again each populated slot provides bidirectional communication with another node. For the crosstalk to be sufficiently weak, the extinction of the single 1×N WSS may be greater than or equal to the combined isolation of the two WSSs used in the first approach shown in FIG. 3 to achieve the same level of performance. A weakness of this embodiment is that if one or more 1×N WSS modules were to fail, then stray channel-wavelength signals would be sent to modules in other slots and/or lack proper power balancing owing to the potential failure of the VOA capability of the WSS. Note that such an occurrence would be deleterious considering that the N×1 combiners lack the ability to block selectively these errant channel-wavelength signals or provide power balancing.

Figure 5:
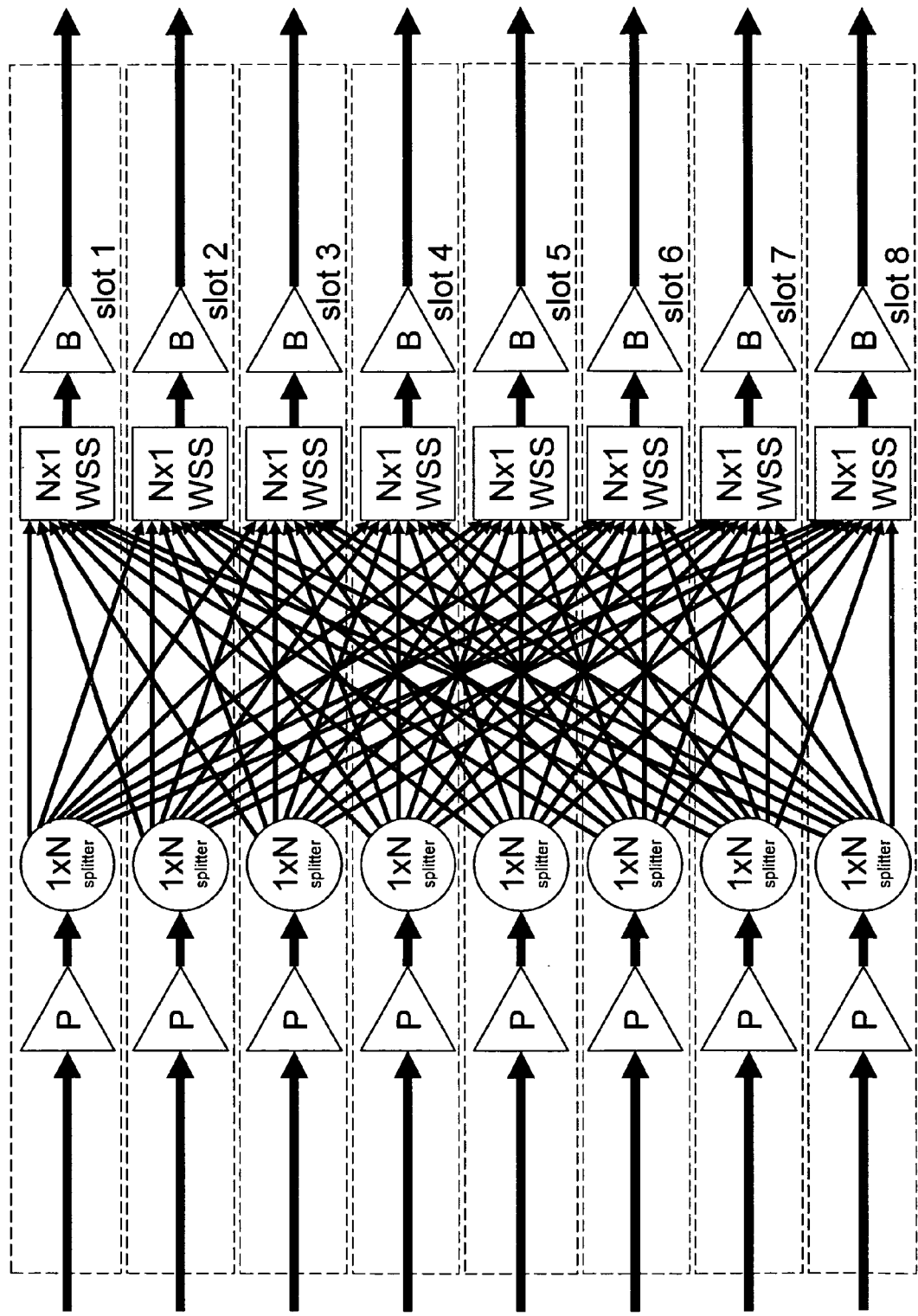

Another embodiment shown in FIG. 5 is similar to that shown in FIG. 4, but with the 1×N WSSs replaced with 1×N splitters and the N×1 combiners returned to being N×1 WSSs. This is also referred to as case #3, where each N×1 WSS would be relied upon to block the wavelength channels of each of the N input ports not meant to be part of the multiplexed output. For the crosstalk to be sufficiently weak, the isolation of the single 1×N WSS must be greater than or equal to the combined isolation of the two WSSs used in the first approach shown in FIG. 3 to achieve the same level of performance. An advantage of the embodiment shown in FIG. 5 over that shown in FIG. 4 is that a pathway traverses a splitter first and then a WSS. If a single WSS were to fail, then only the signals traversing out a fiber of a given slot would be impacted, which could be blocked by disabling the booster (B) optical amplifier. Note that the optical-amplifier module becomes opaque when disabled by removing any source of electrical power.

In FIG. 3, FIG. 4, and FIG. 5, the triangles with the letters P and B represent respectively a pre-amp and a booster optical amplifier. Example optical amplifiers are the Erbium-doped fiber amplifier (EDFA) and the semiconductor optical amplifier (SOA), according to certain embodiments of the invention. The pre-amp amplifies multiplexed signals entering the optical cross-connect and the booster amplifies multiplexed signals leaving the optical cross connect. The thick solid lines represent optical fibers carrying multiplexed channel-wavelength signals that travel between nodes such as the possible 40 channels. The medium thick lines represent optical fibers carrying multiplexed or partially demultiplexed channel-wavelength signals between boards (modules). The narrow rectangular boxes that are drawn using a dashed line represent slots of a potential chassis.

Modular Add-Drop System Examples

Figure 6:
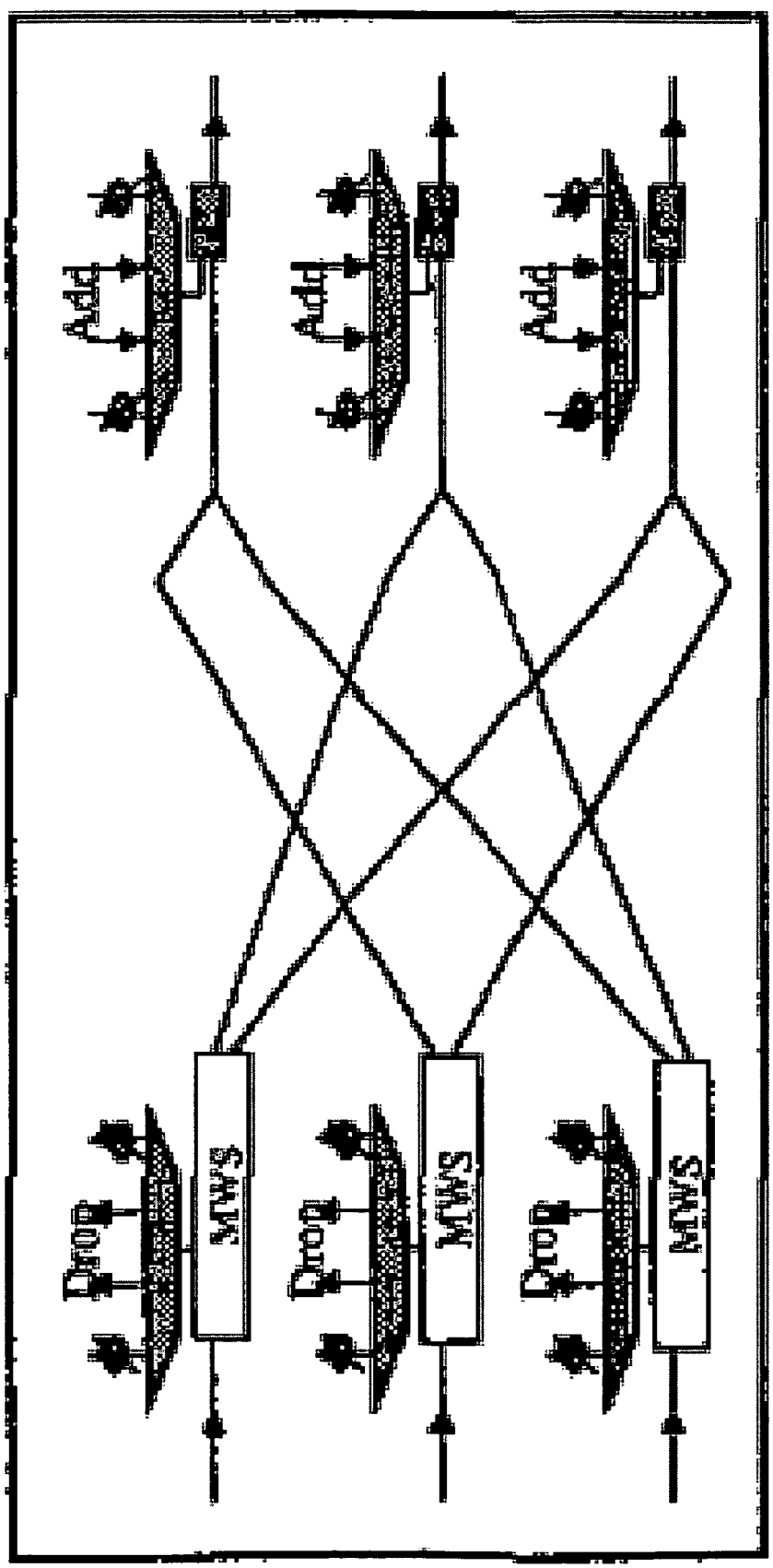
FIG. 6 shows a conventional WSS system with OXC and add/drop ports.

FIG. 6 is a conventional approach for adding and dropping signals. The approach is restrictive in two ways. 1) The optical fibers for adding or dropping signals are wavelength assigned owing to the use of wavelength-assigned multiplexers and demultiplexers for the adding and dropping of signals, respectively. 2) The adding and dropping is done separately for each remote node that signals are being respectively transmitted or received, which means separate banks of transmitters and receivers (e.g., transponders) would be required for communications with each remote node. Separate banks of transmitters and receivers would be expensive and bulky. In order to use a common set of transmitters and receivers, additional switches matrices would be required to route the dropped signals to common receivers of the local node and switches to route the signals from the common transmitters of the local node to the desired add ports. All of these additional switches and optical pathways would need to operate in a manner consistent with the wavelength assignment of the drop-signal demultiplexers and add-signal multiplexers shown in FIG. 6. Furthermore, these additional switches would themselves create cost and physical-space problems. Said differently, the DWDM transponders of a router line card would be network-port assigned. If a router does not have a DWDM transponder connected or available for use with a given network port, then no communication via that port is possible. Note that this limitation of doing adds and drops is similar to the limitation of ROADMs used to form optical cross connects with adds and drops.

Modular Add-Drop Embodiments

In one embodiment, a modular add-drop approach is utilized that does not possess the two kinds of problems (bottlenecks) of the conventional approaches. An Add-Drop board is utilized that takes the place of a Cross-Connect board. No input or output ports (optical fibers) are wavelength assigned (i.e., colorless) and no additional space-switch matrices are required (i.e., port transparency). We show, by a series of figures, examples of the modular add-drop modules concert with the three cases of the modular cross-connect approach, according to certain embodiments of the invention.

Figure 7:
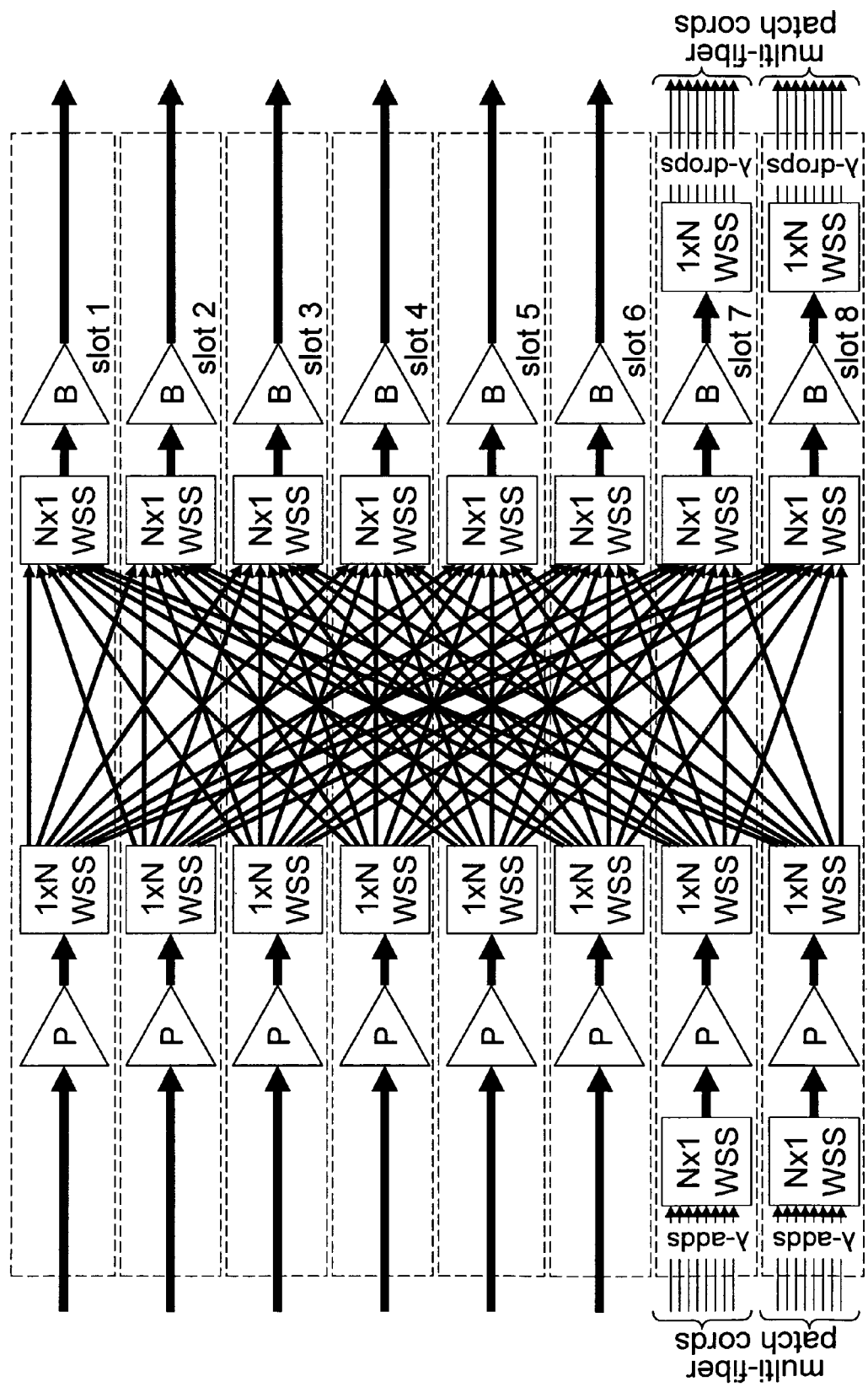
FIGS. 7-19 show WSS systems with OXC and add/drop ports according to certain embodiments of the invention.
Figure 8:
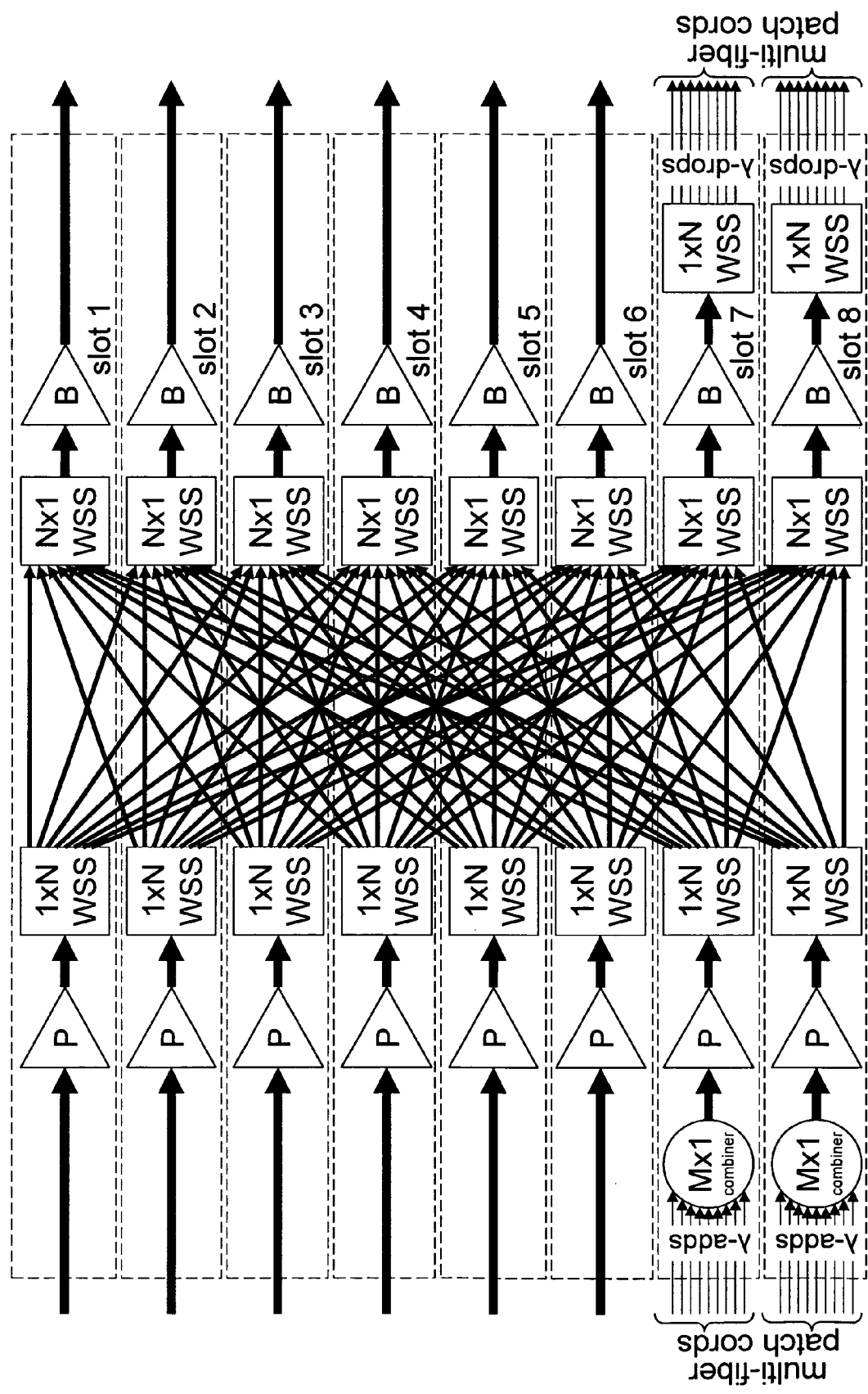
Figure 9:
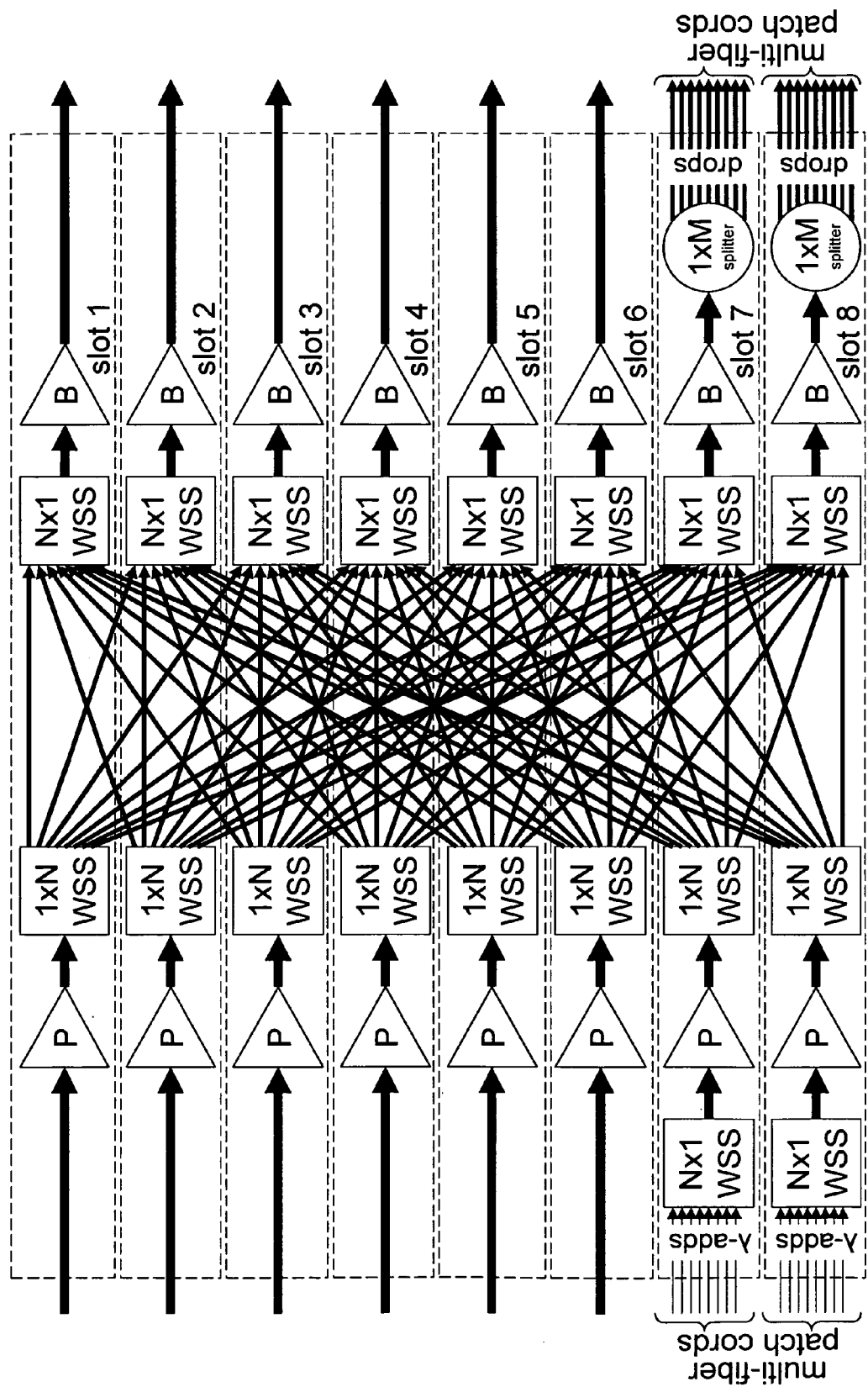
Figure 10:
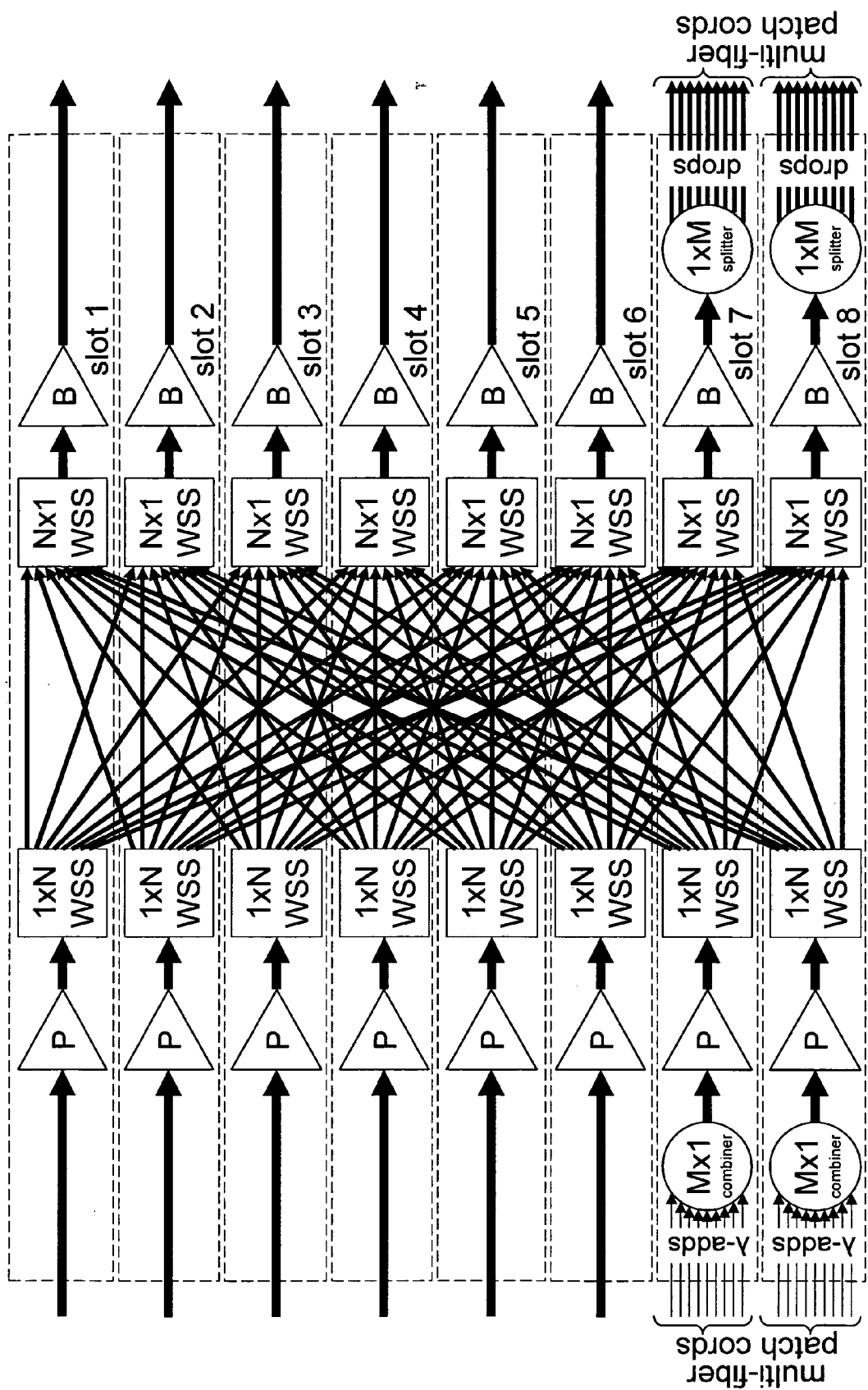

Based on the use of the case #1 cross connect, according certain embodiments, FIG. 7 shows a degree-6 node with slot 7 and slot 8 populated with Add-Drop boards each using a 1×N and an N×1 WSS, which each provide N-add and N-drop channels for a total of 2N-add and 2N-drop channels for this node. In FIG. 8, a degree-6 node is depicted with slot 7 and slot 8 populated with Add-Drop boards each using an M×1 combiner and a 1×N WSS, according to one embodiment of the invention. Note that the configurations are shown by way of examples, not by way of limitations, which each provides M-add and N-drop channels for a total of 2M-add and 2N-drop channels for this node. In FIG. 9, in one embodiment a degree-6 node is depicted with slot 7 and slot 8 populated with Add-Drop boards each using an N×1 WSS and a 1×M splitter, which each provides N-add and M-drop channels for a total of 2N-add and 2M-drop channels for this node. Note that it will usually be desirable for N to be close to or equal to M. FIG. 10 shows a degree-6 node with slot 7 and slot 8 populated with Add-Drop boards each using an M×1 combiner and a 1×M splitter, which each provides M-add and M-drop channels for a total of 2M-add and 2M-drop channels for this node, according to certain embodiments of the invention.

Figure 11:
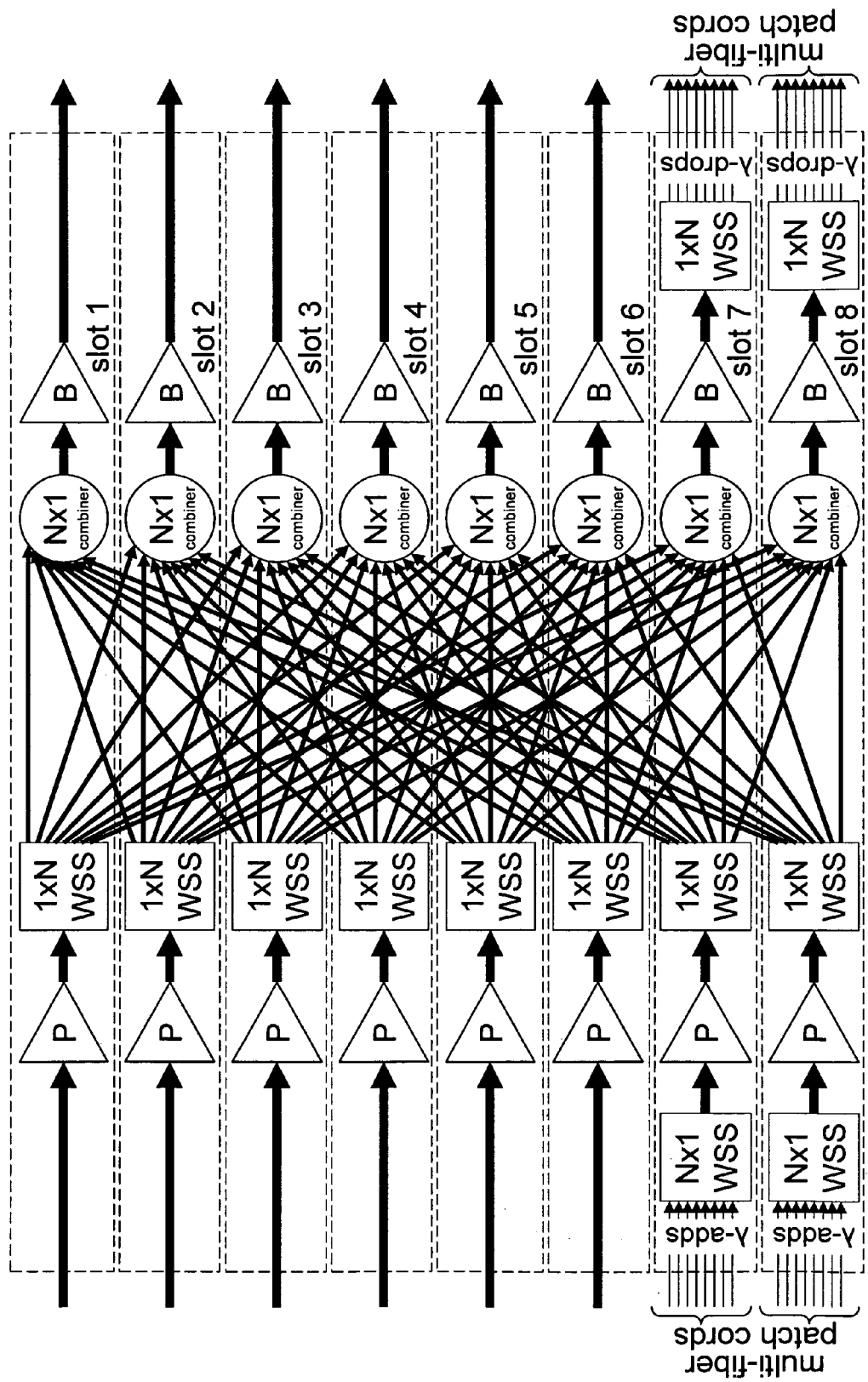
Figure 12:
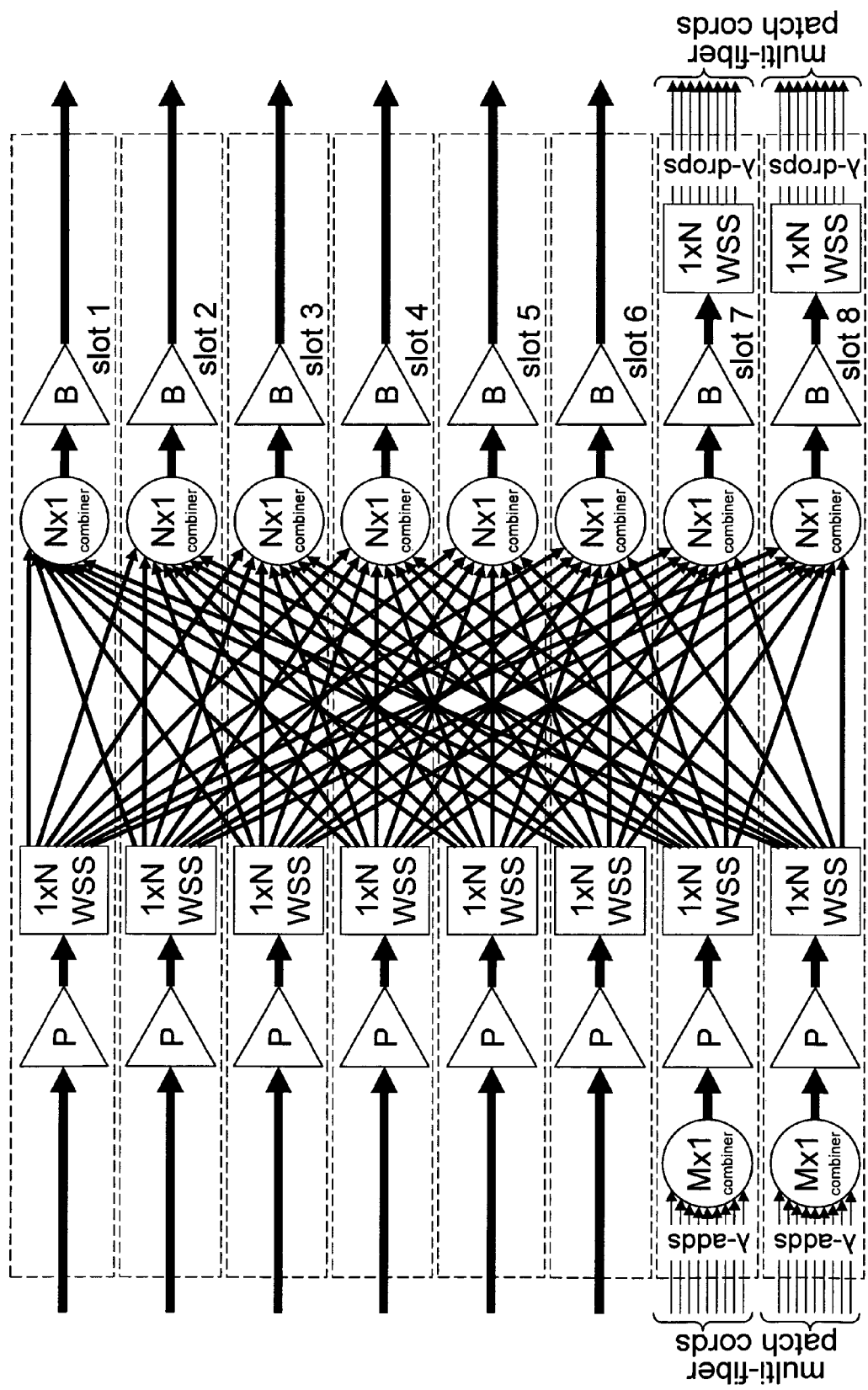
Figure 13:
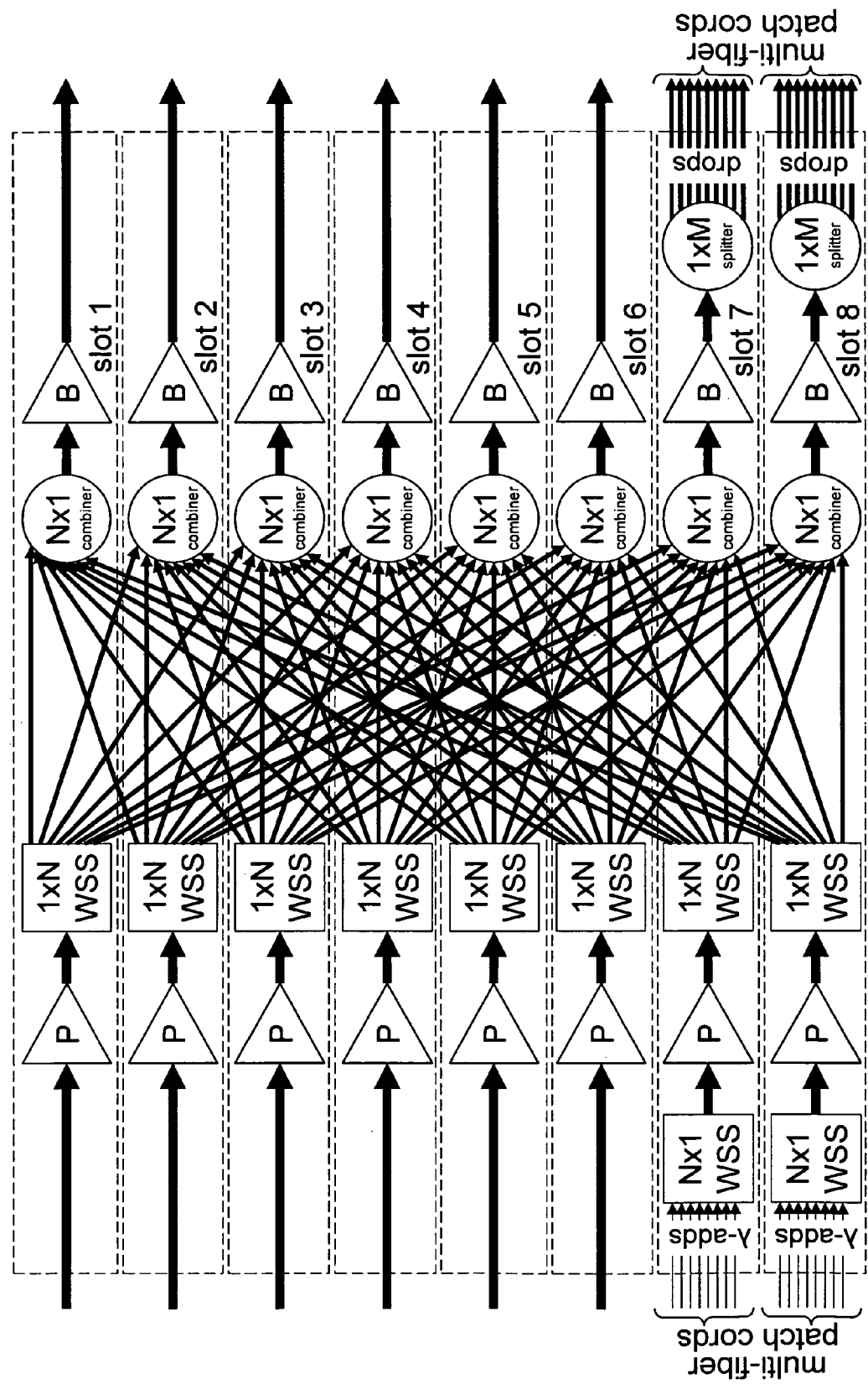
Figure 14:
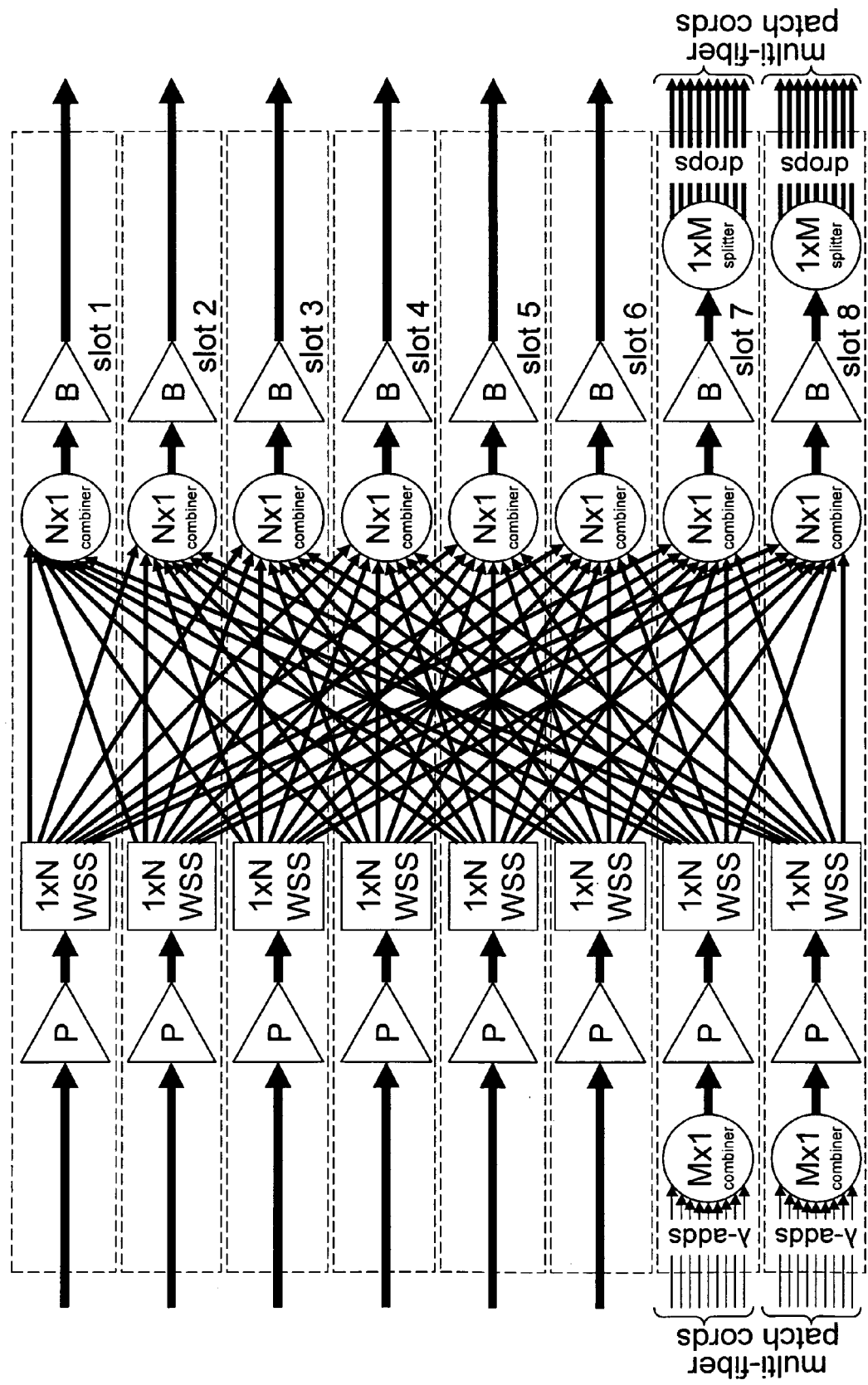

Based on the use of the case #2 cross connect, according to one embodiment FIG. 11 shows a degree-6 node with slot 7 and slot 8 populated with Add-Drop boards each using a 1×N and an N×1 WSS, which each provides N-add and N-drop channels for a total of 2N-add and 2N-drop channels for this node. In FIG. 12, according to one embodiment, a degree-6 node is depicted with slot 7 and slot 8 populated with Add-Drop boards each using an M×1 combiner and a 1×N WSS, which each provides M-add and N-drop channels for a total of 2M-add and 2N-drop channels for this node. In FIG. 13, according to one embodiment, a degree-6 node is depicted with slot 7 and slot 8 populated with Add-Drop boards each using an N×1 WSS and a 1×M splitter, which each provides N-add and M-drop channels for a total of 2N-add and 2M-drop channels for this node. Note, again, that it will usually be desirable for N to be close to or equal to M. FIG. 14 shows a degree-6 node with slot 7 and slot 8 populated with Add-Drop boards each using an M×1 combiner and a 1×M splitter, according to certain embodiments, which each provide M-add and M-drop channels for a total of 2M-add and 2M-drop channels for this node.

Figure 15:
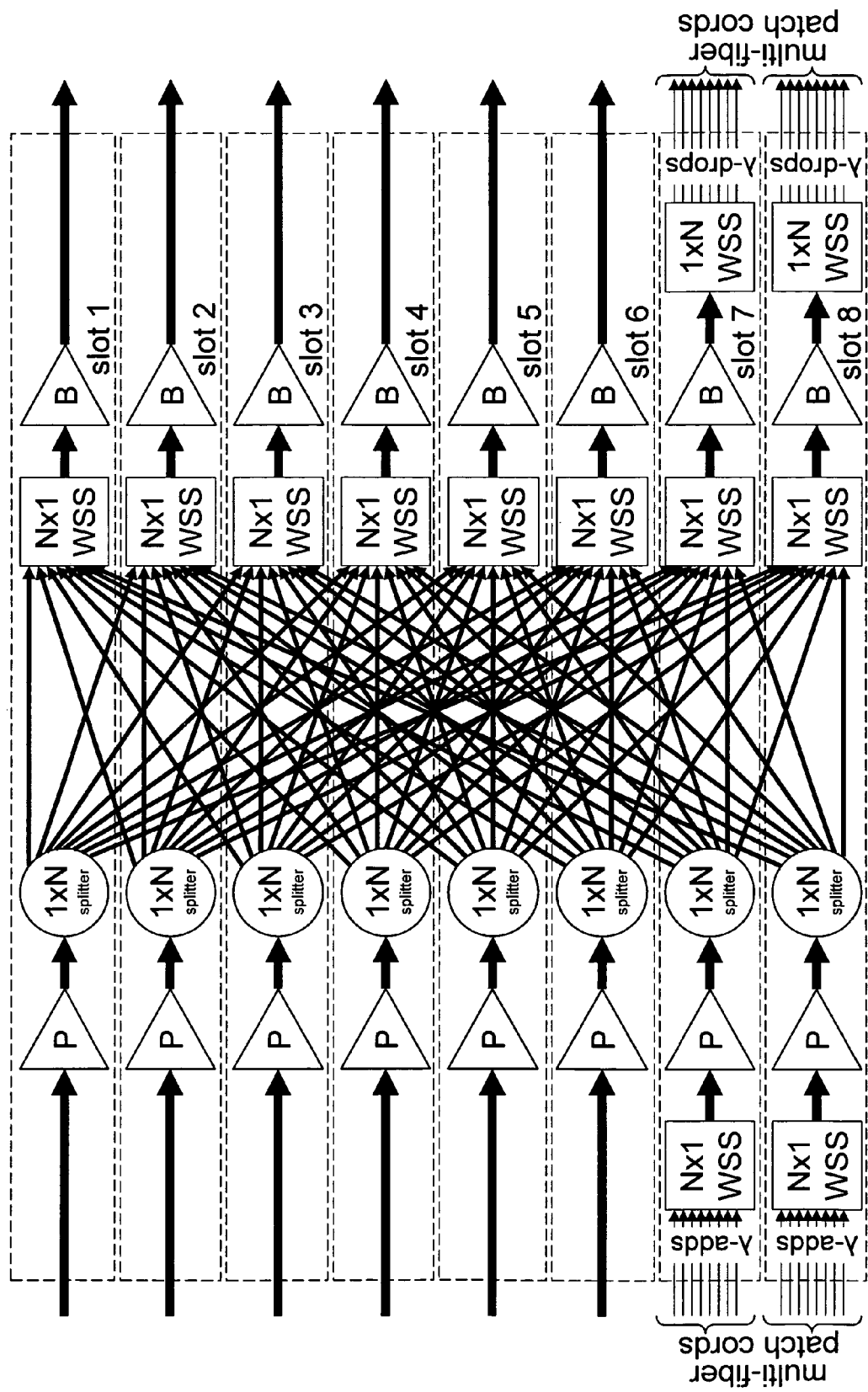
Figure 16:
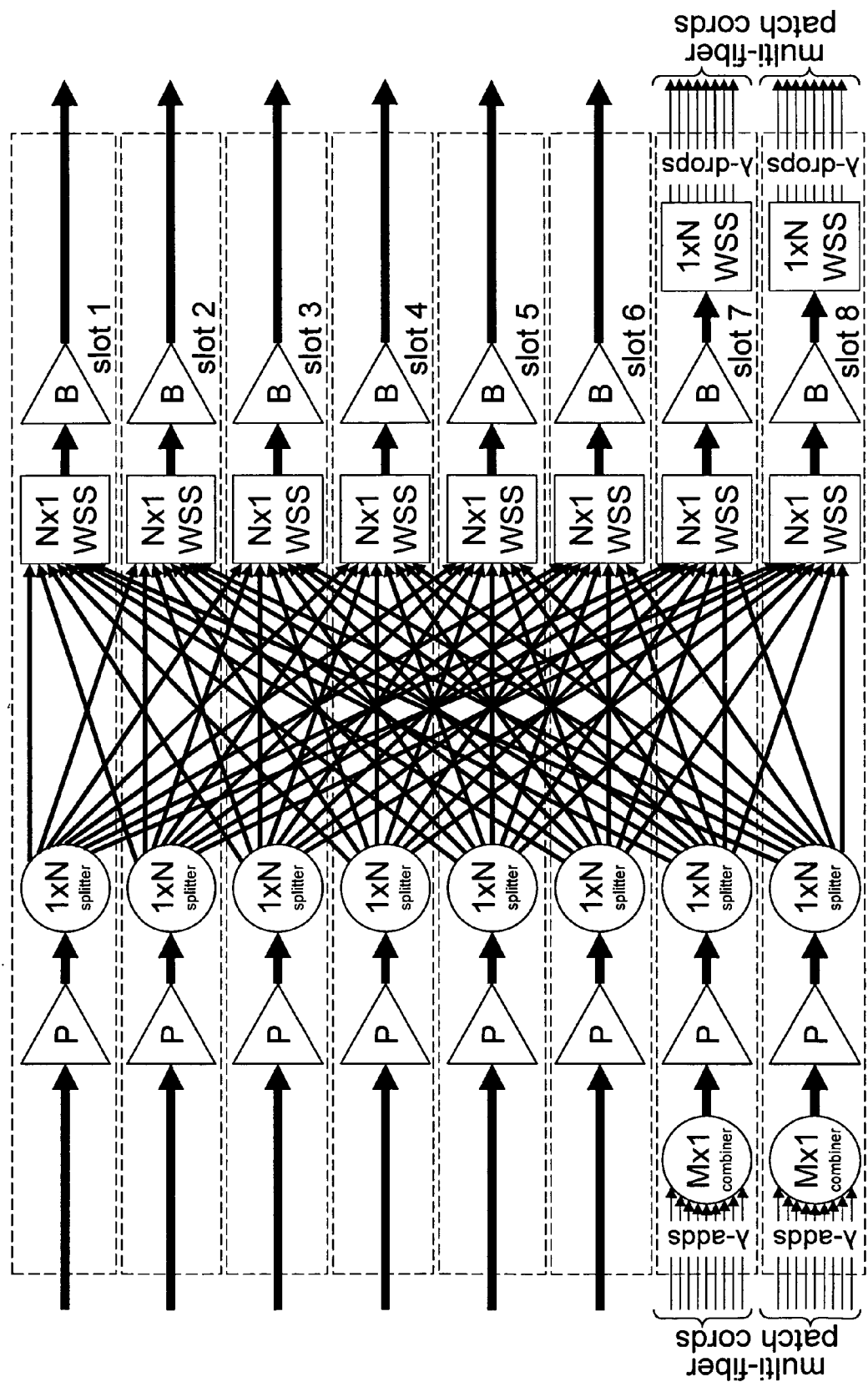
Figure 17:
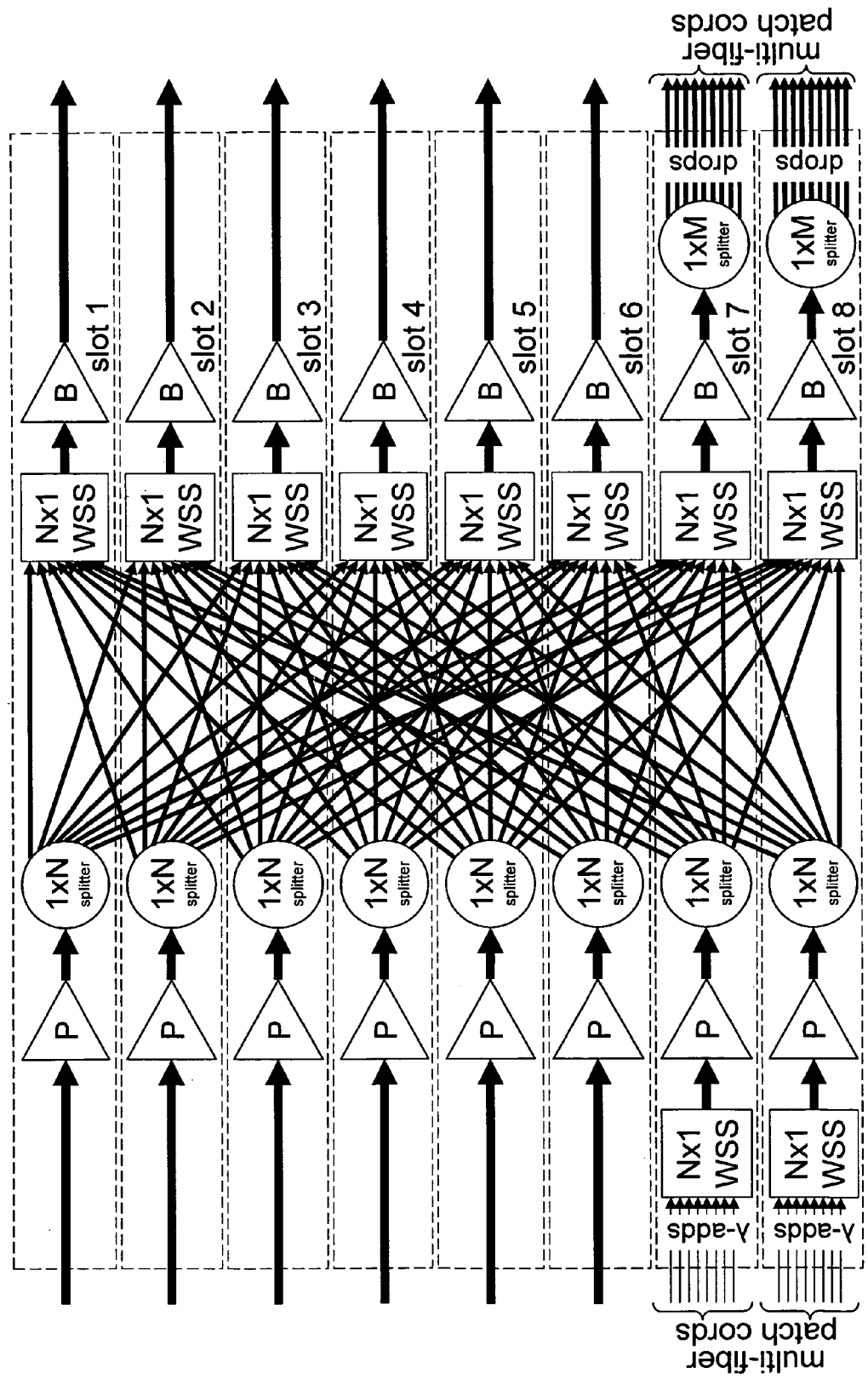
Figure 18:
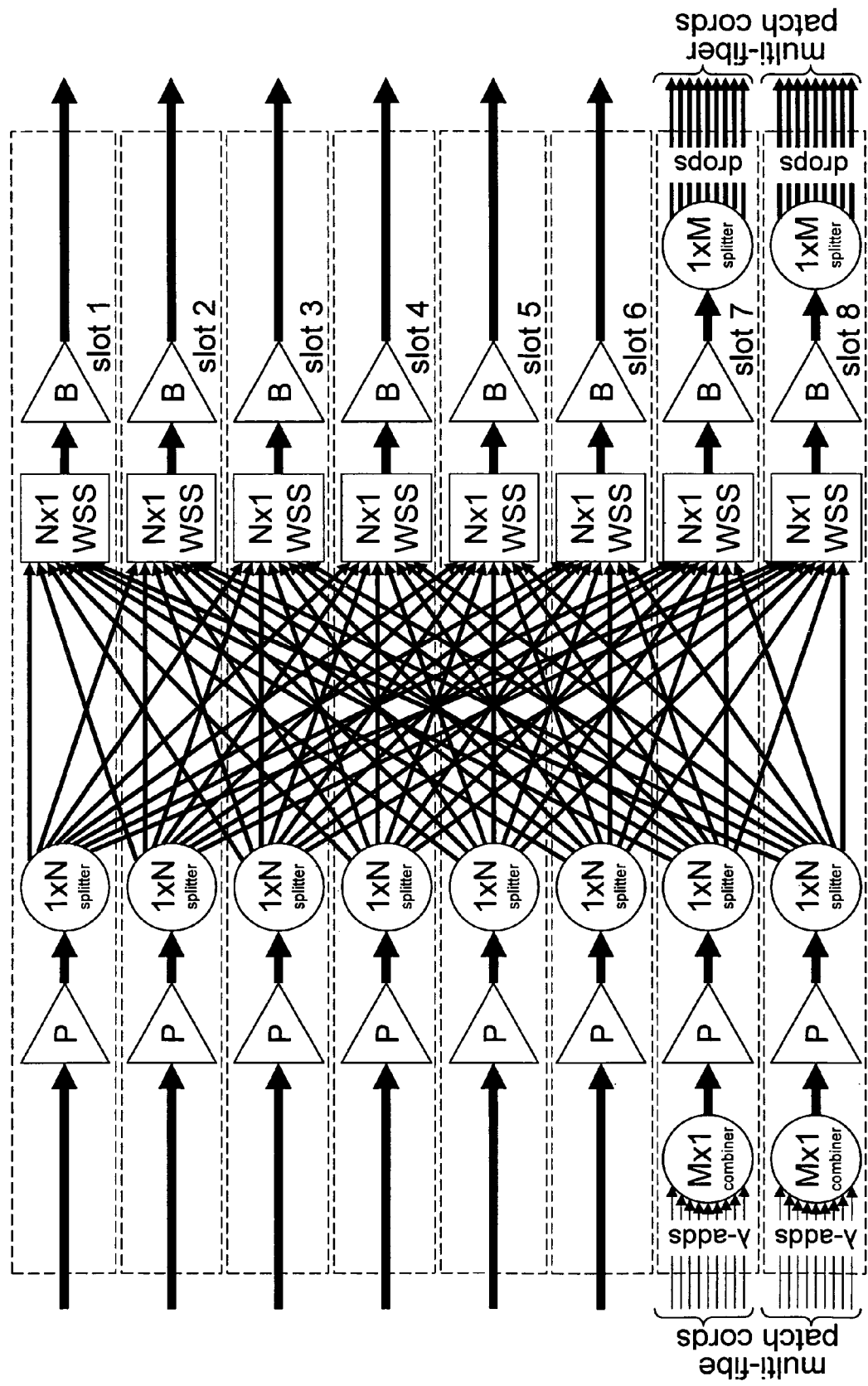

Based on the use of the case #3 cross connect, according to one embodiment, FIG. 15 shows a degree-6 node with slot 7 and slot 8 populated with Add-Drop boards each using a 1×N and an N×1 WSS, which each provide N-add and N-drop channels for a total of 2N-add and 2N-drop channels for this node. In FIG. 16, according to one embodiment, a degree-6 node is depicted with slot 7 and slot 8 populated with Add-Drop boards each using an M×1 combiner and a 1×N WSS, which each provides M-add and N-drop channels for a total of 2M-add and 2N-drop channels for this node. In FIG. 17, according to one embodiment a degree-6 node is depicted with slot 7 and slot 8 populated with Add-Drop boards each using an N×1 WSS and a 1×M splitter, according to one embodiment, which each provide N-add and M-drop channels for a total of 2N-add and 2M-drop channels for this node. Note, again, that it will usually be desirable for N to be close to or equal to M. FIG. 18 shows a degree-6 node with slot 7 and slot 8 populated with Add-Drop boards each using an M×1 combiner and a 1×M splitter, which each provide M-add and M-drop channels for a total of 2M-add and 2M-drop channels for this node.

Note that the N×1 WSS and 1×N WSS modules used in an Add-Drop board to aggregate single wavelengths (λ-adds) or separate single wavelengths (λ-drops), respectively, have a slightly different requirement in that each of the N fibers only contain a single wavelength. This differentiation provides an opportunity for a different technology to be employed, than the technology required for the WSS modules providing the optical cross-connect functionality.

An embodiment of the invention adds on the left and drops on the right as compared to the prior artwork that does the reverse, drops on the left and adds on the right. In one embodiment, laser transmitters connected to the input ports of the N×1 WSS or M×1 combiner of the Add-Drop boards may be selected to transmit on an arbitrary wavelength as long as it is not already in use by another transmitter connected to this Add-Drop board. Another transmitter can operate at this similar or same wavelength as long as it is input by another Add-Drop board, according to certain embodiments of the invention, where the total number of common wavelengths is limited by the total number of Add-Drop boards employed at a given node.

Figure 19:
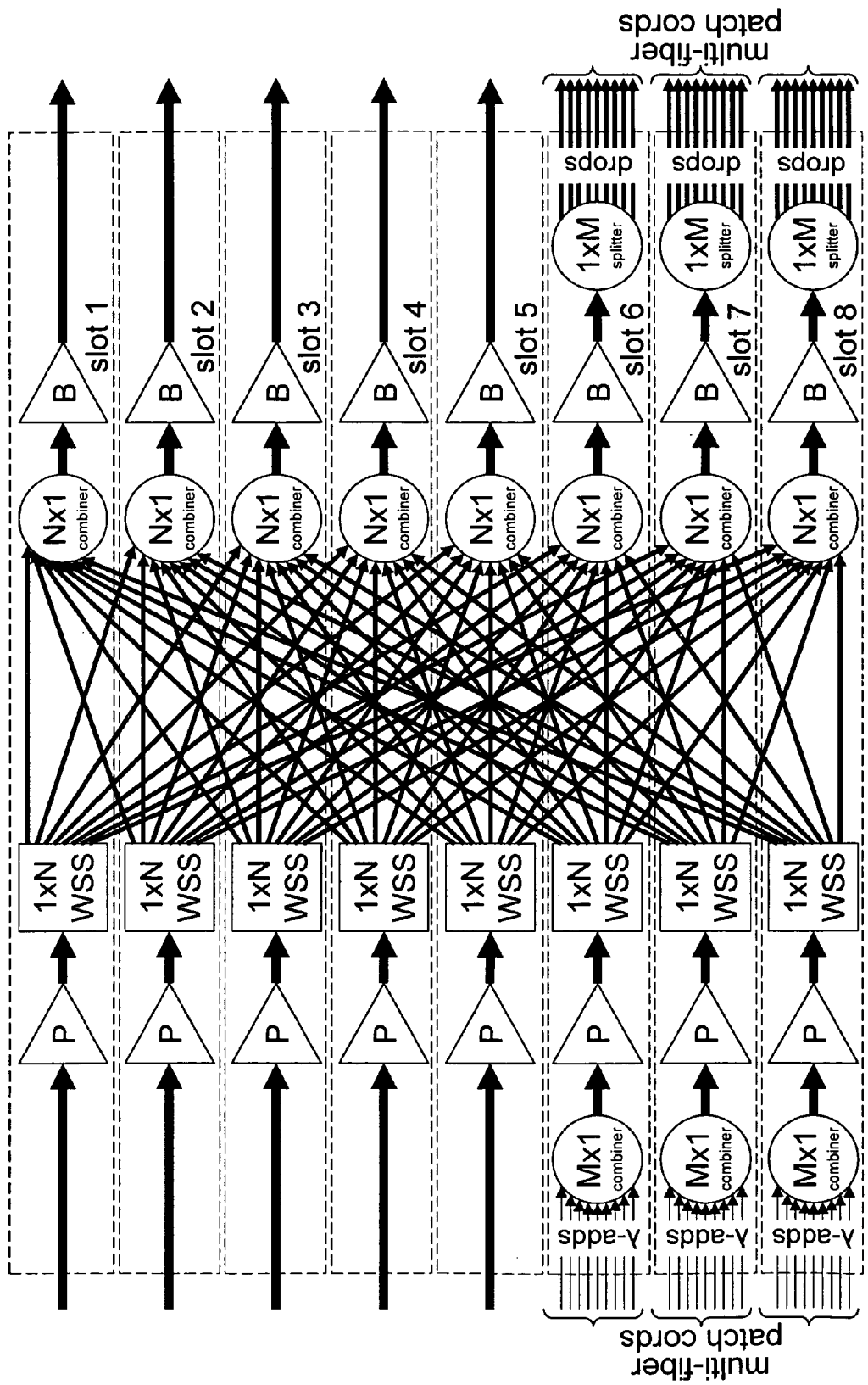

According to some embodiments, the individual add channel wavelengths can be routed to any of the outputs going to remote nodes as long as that node output does not already have this channel wavelength in use. In the event that a 1×N WSS module is employed that provides multicasting/broadcasting or a 1×N splitter is employed, then the same channel-wavelength signal can be routed to multiple outputs going to multiple remote nodes as long as those node outputs do not already have this channel wavelength in use. This feature is a direct use of the port transparency of the add/drop system of this invention. According to a further embodiment, the added signals can be dropped locally and tested using the similar or same Add-Drop board or another Add-Drop board by passing through the optical cross connect. Furthermore, received signals at this node can be routed arbitrarily to any of the output fibers of the 1×N WSS or 1×M splitter of the Add-Drop board for delivery to a receiver as long as that wavelength is not already in use for that Add-Drop board. The number of simultaneous received signals at the same wavelength for a given node is limited to the number of Add-Drop boards placed in the chassis. For example, according to one embodiment, shown in FIG. 19 is a degree-5 node with slots 6 through 8 populated with Add-Drop boards that provide 3M-add and 3M-drop channels, where three of the same channel wavelengths can be used for add signals and also for drop signals.

Call Protections

Figure 20:
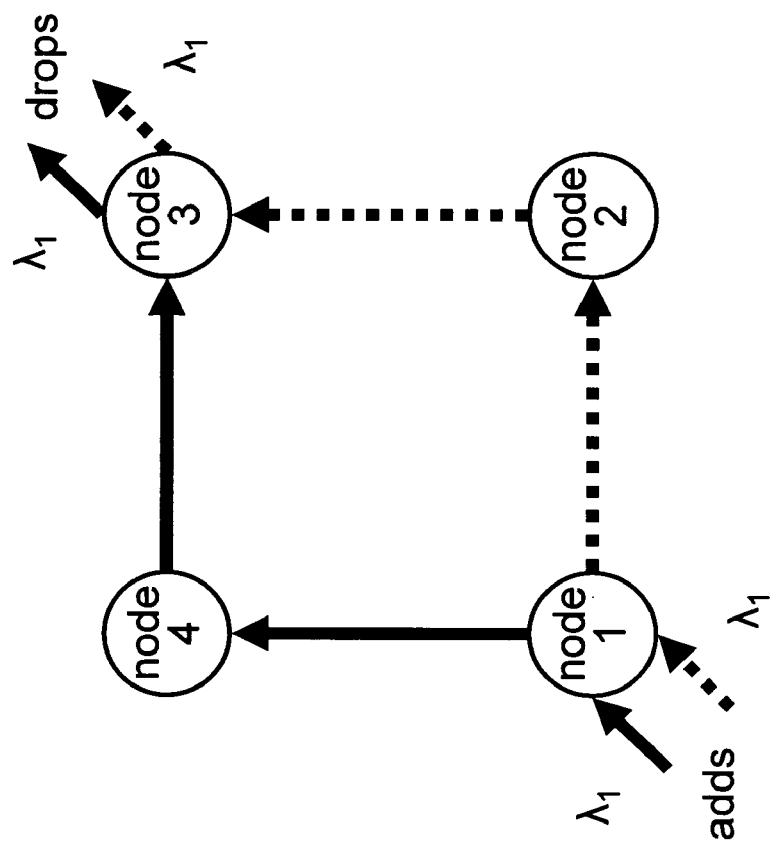
FIGS. 20-21 show network configurations with working and protection paths using WSS systems according to certain embodiments of the invention.
Figure 21:
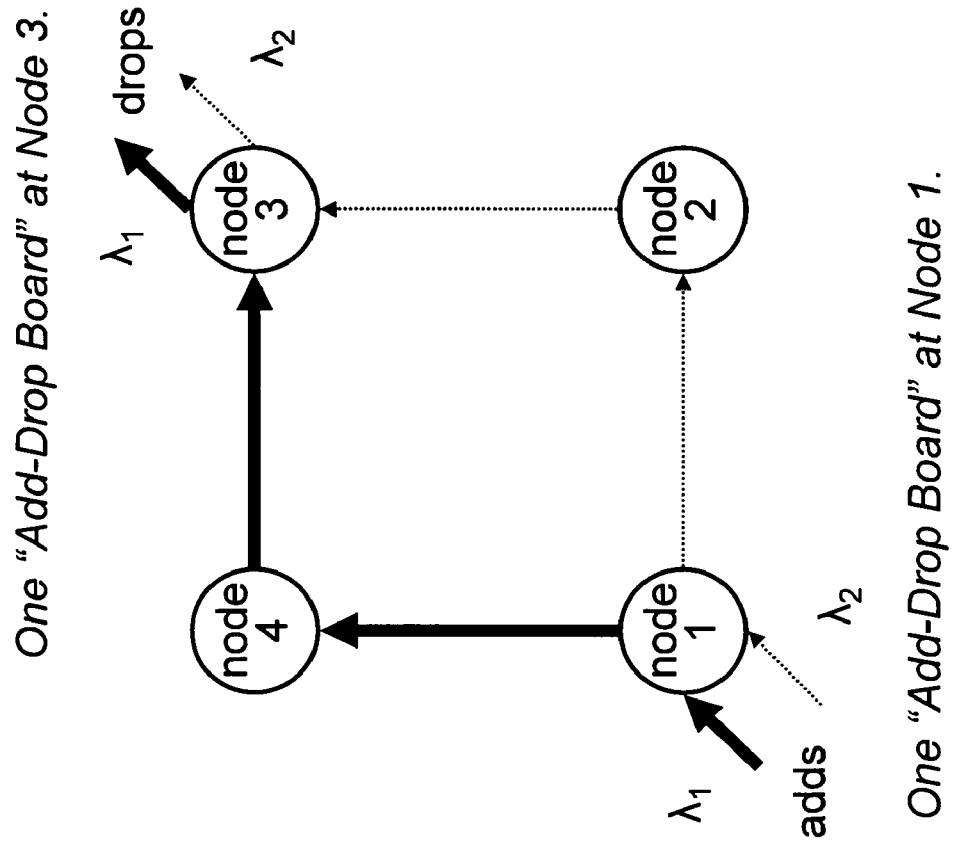

The add-drop approach provides for call protection against failure of the active link pathway. Shown in FIG. 20 is how a same-wavelength call and protection pathway is provided by having two Add-Drop boards at the call origination and destination nodes according to one embodiment, which provides for board-level disjointness at each node for greater network reliability. In FIG. 21, the call pathway and protection pathway use two different wavelengths, which can be provided by having just a single Add-Drop board at the call origination and destination nodes. Examples of call failure this approach protects against are fiber cuts; total loss of power at an intermediate node or any catastrophic failure at that node; failure of source transmitter or destination receiver; or Add-Drop board failure at the source or destination node.

Node Cross-Connect and Add-Drop Scaling

Figure 22:
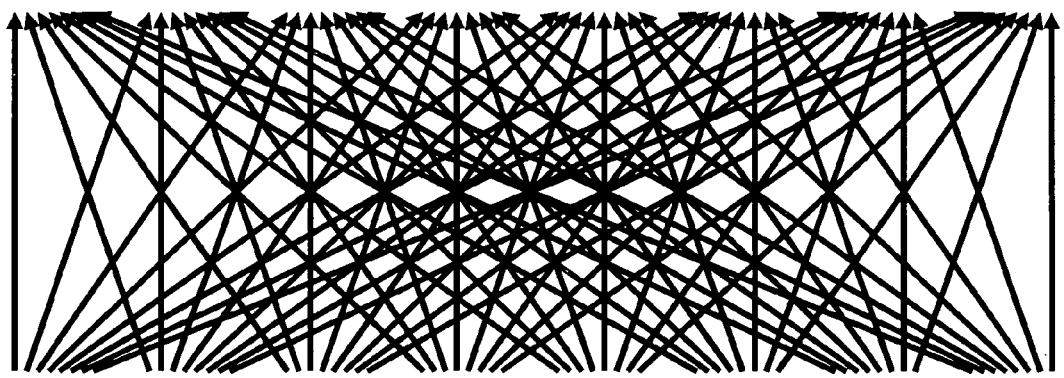
FIG. 22 shows all of the fabric-layers of Optical backplane together.

An embodiment of an Optical backplane is depicted in FIG. 22. Note that it can consist of one or more physically-separable fabric layers. The backplane is an N×N shuffle, which means that signals entering the Optical backplane from each of the N slots can be routed passively to exit the Optical backplane at any of the N slots depending upon which of the N fibers are selected by the 1×N WSS of a given slot. Signals can even be routed through the Optical backplane to exit the same board that launched the signal into the Optical backplane, which is known as loop back, according to certain embodiments of the invention. The symmetry of the Optical backplane and the versatility of the WSS allow for every slot to be an equal in functionality. The slots are redundant. Furthermore, any embodiment/kind of Cross-Connect or Add-Drop board functions with the same embodiment/implementation of the backplane.

Figure 23:
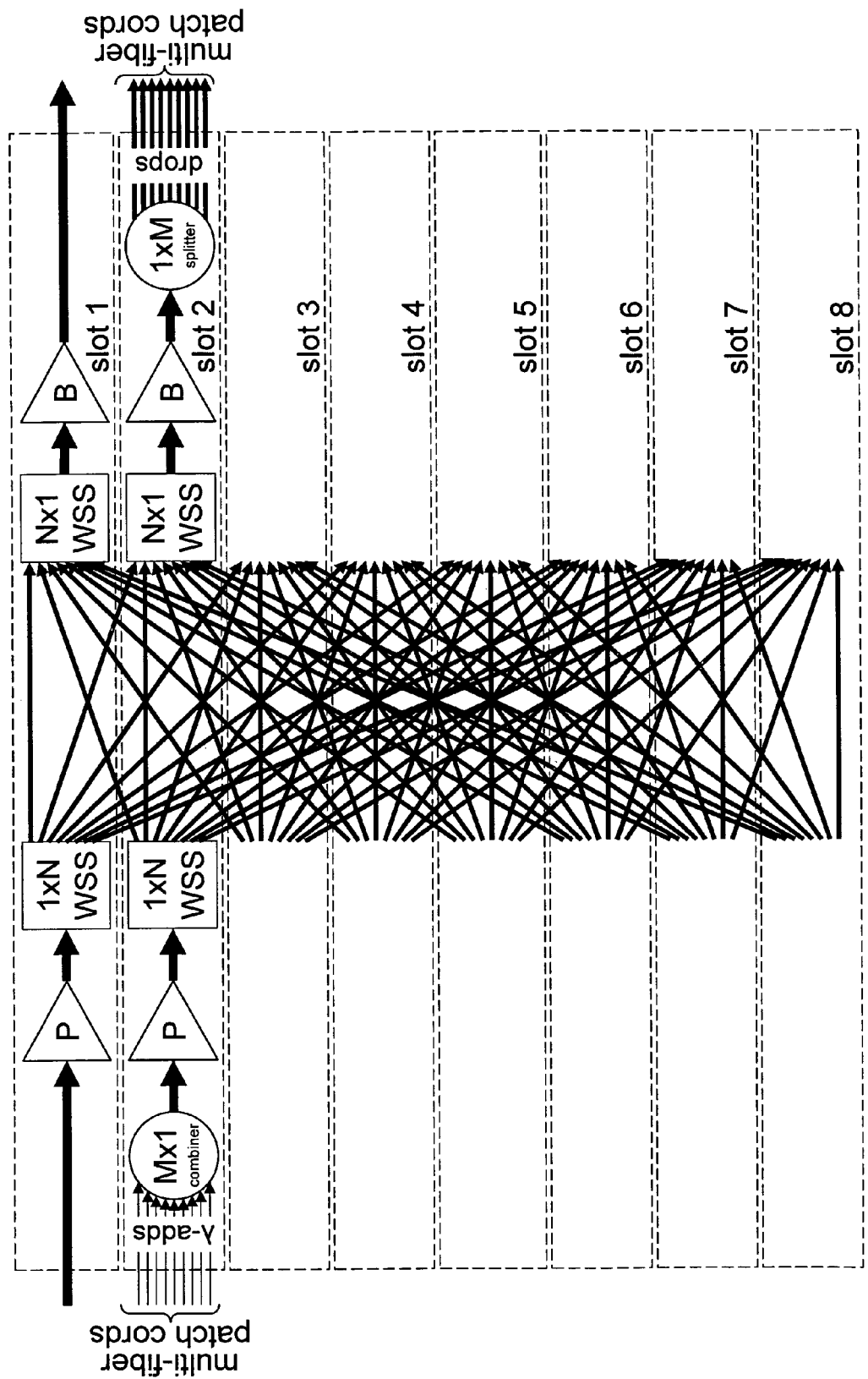
FIGS. 23-25 show WSS systems with OXC and add/drop ports according to certain embodiments of the invention.

The versatility of the backplane in conjunction with the versatility of the WSS-based boards provides for the following features, according to certain embodiments. The optical system functions even when heavily depopulated. No additional channel wavelength blockage or contention occurs with the depopulation other than that related to the limited degree of the node or limitation posed by the number of Add-Drop boards as described above. For example, according to one embodiment, shown in FIG. 23 is a degree-1 node with a single Add-Drop board populated in slot 2, which provides M-add and M-drop channels. This may be considered to be a network-termination node, since it provides for no pass through of signals other than loop back.

Figure 24:
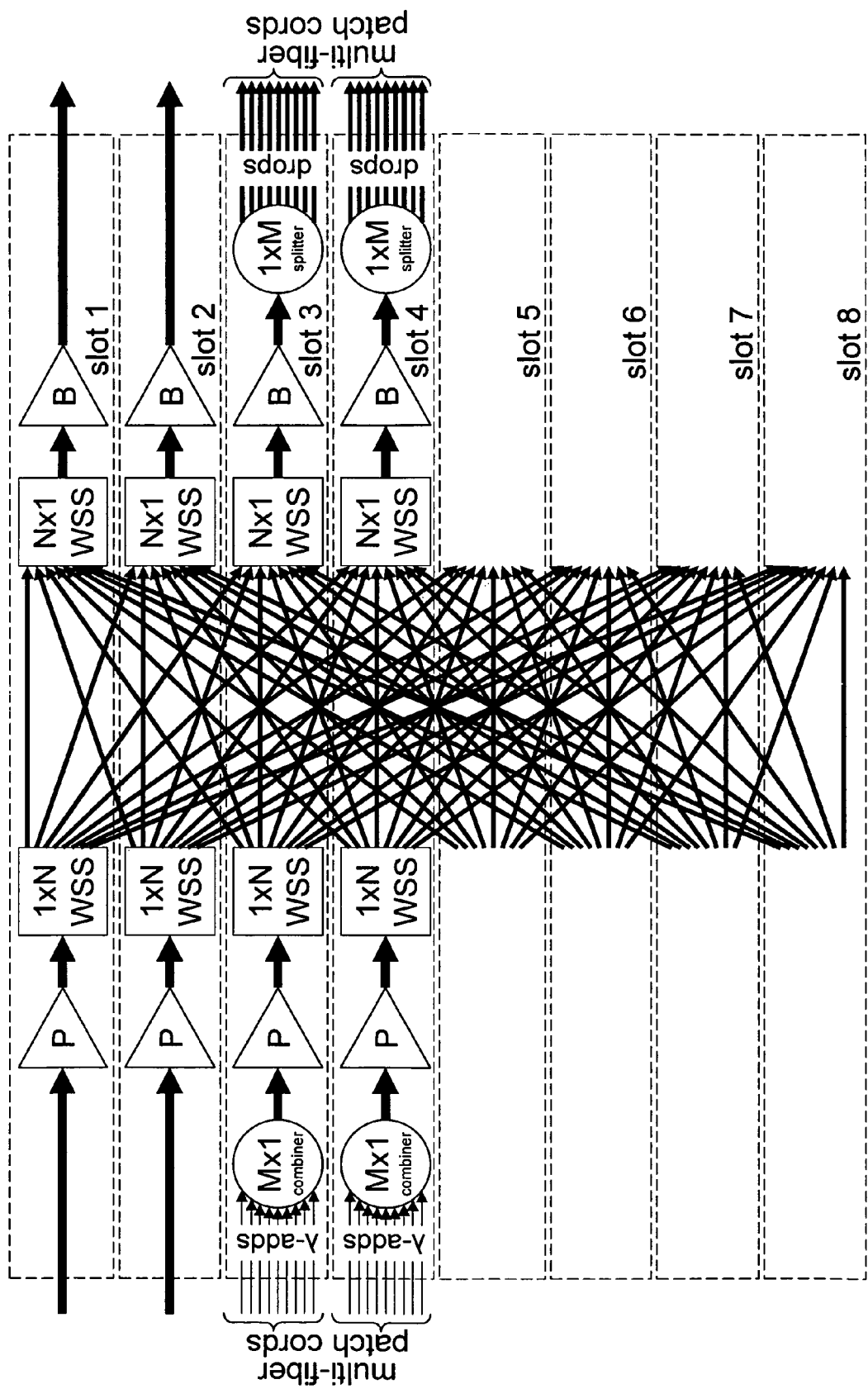
Figure 25:
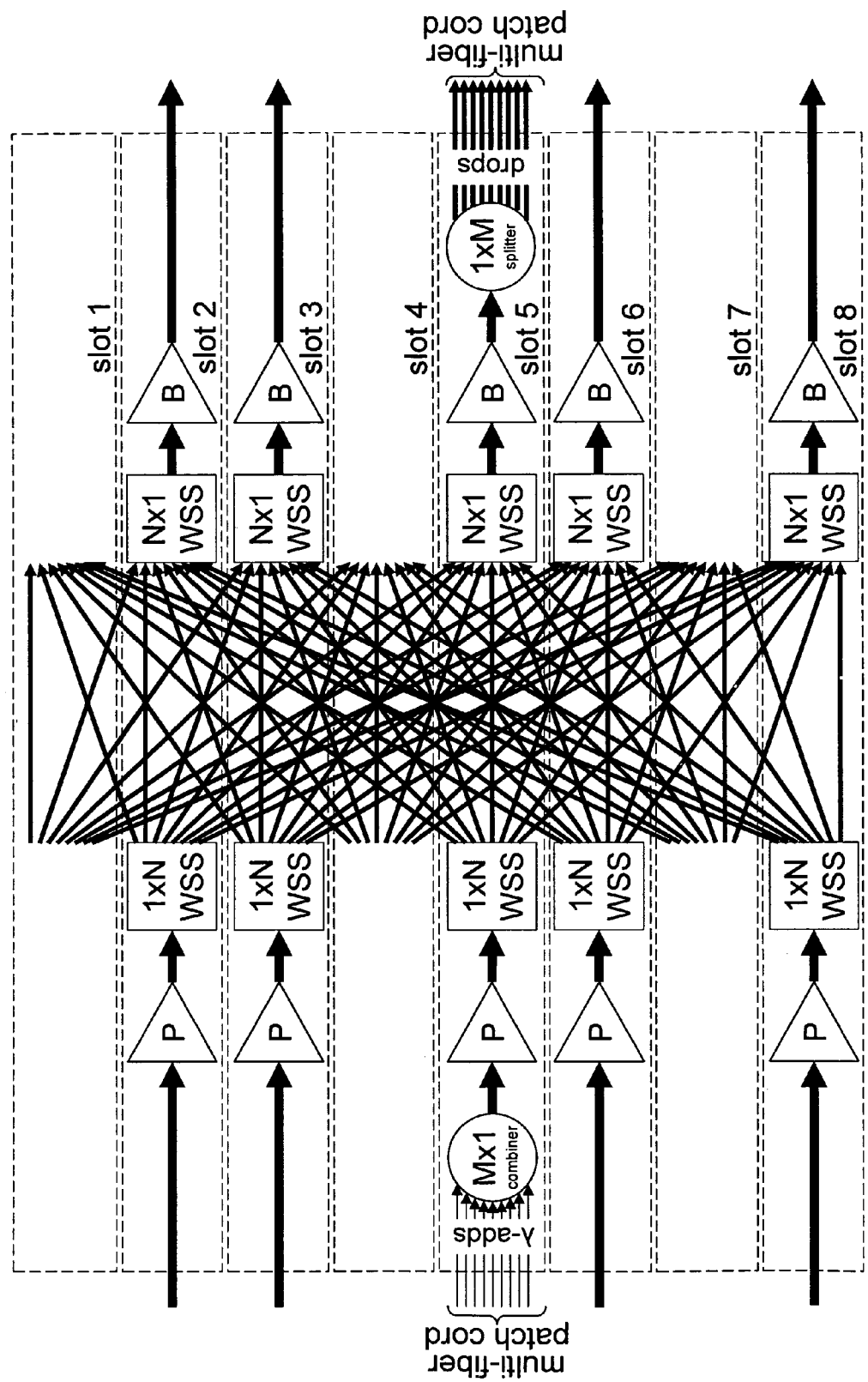

FIG. 24 shows a degree-2 node with slot 3 and slot 4 populated with Add-Drop boards, which provide 2M-add and 2M-drop channels according to certain embodiments of the invention. Note that this configuration is similar to what is known as an east-west reconfigurable add-drop multiplexer (ROADM); however, it does not have the deficiency of port assignment as conventional ROADMs have for adds/drops. Note that a single Add-Drop board would be sufficient. The node may be populated in an arbitrary manner. FIG. 25 shows this capability of arbitrary population and arrangement according to certain embodiments of the invention. Important in making use of this feature is the target specification that the boards be hot pluggable and unpluggable electrically in terms of the electrical high-speed signals and control signals the chassis and boards may use.

Modular Signal System Examples

Colorless boards for signal creation and acquisition are needed to form a completely colorless optical communications system. Colorless means there is no wavelength assignment. We show how such boards should be made and how they should be interconnected with the Add-Drop boards.

Transmitter-Receiver Boards

Figure 26:
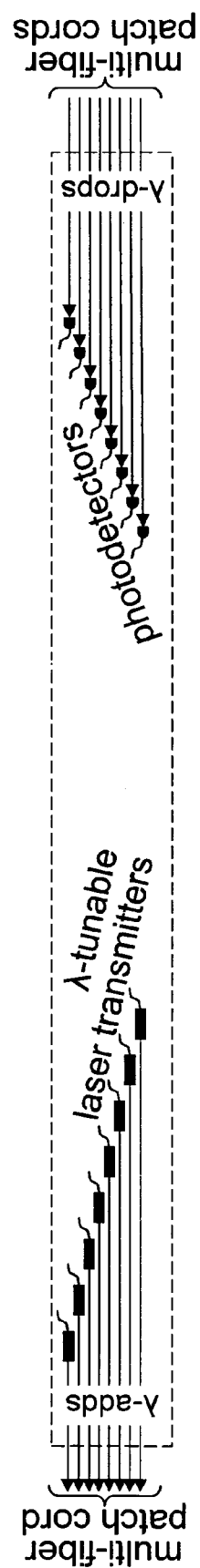
FIGS. 26-27 show tunable transponders (transmitters and receivers) according to certain embodiments of the invention (i.e., Transmitter-Receiver boards).
Figure 27:
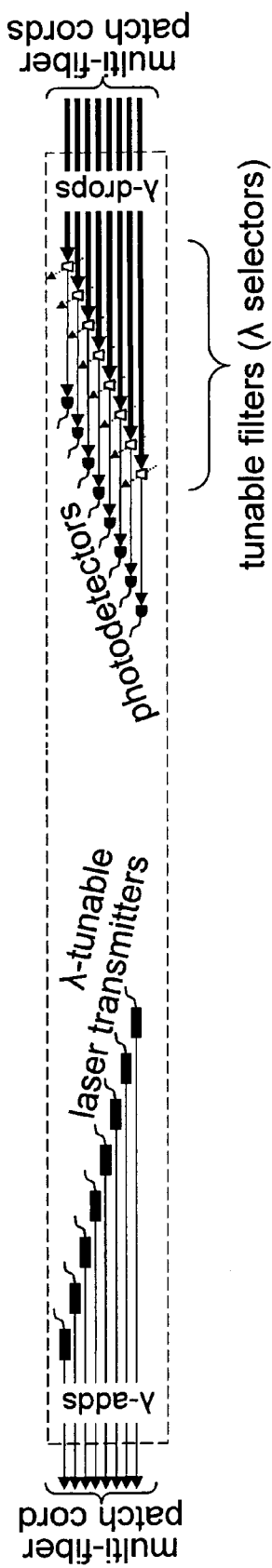
Figure 28:
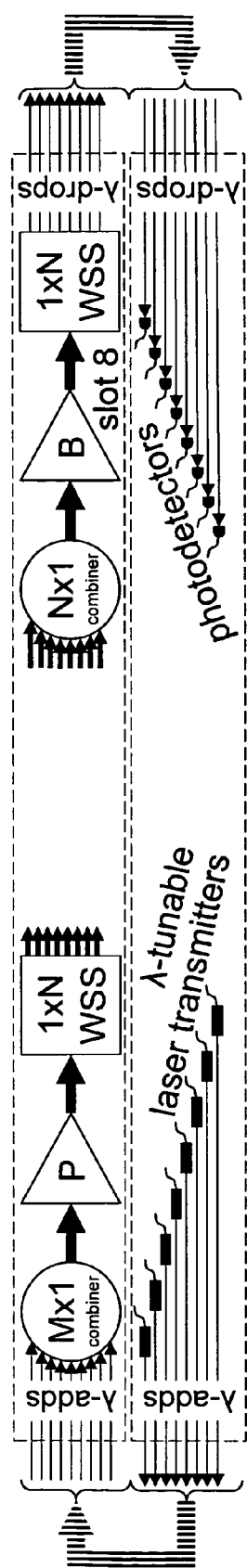
FIGS. 28-29 show WSS systems with tunable transponders (transmitters and receivers) according to certain embodiments of the invention.
Figure 29:
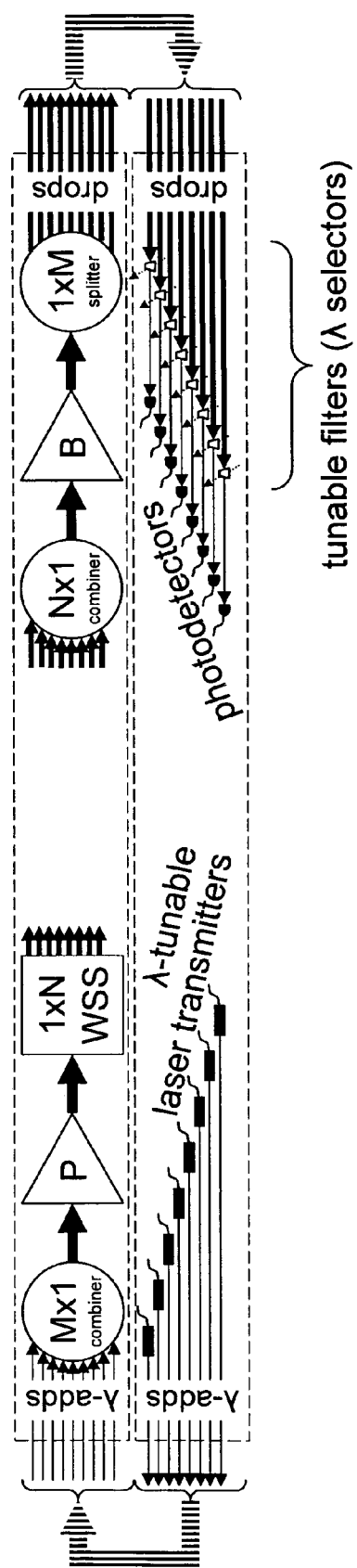

According to certain embodiments of the invention, Transmitter-Receiver boards are shown in FIG. 26 and FIG. 27. The thin line represents optical fibers containing a single wavelength channel. Both use wavelength-tunable laser transmitters to select the desired channel wavelength for the add signal, where the use of an N×1 WSS or M×1 combiner on the Add-Drop board plays no role with channel selection. For the drop signals when the Add-Drop board has a 1×N WSS to make the final down selection of the single drop-channel wavelength, the board depicted in FIG. 26 is sufficient. The inherent wavelength-insensitive nature of photodetector receivers (ignoring the weak change in responsivity with wavelength) allows them to be used with an arbitrary, but single drop channel-wavelength signal. In the case where the Add-Drop board has a 1×M splitter to deliver the drop signals to the output port of the Add-Drop board, the board depicted in FIG. 27 is required. A tunable filter on the Transmitter-Receiver board does the final down selection of single-channel wavelength. FIG. 28 shows how a multi-fiber-optic patchcord interconnects in a one-to-one manner the wavelength-tunable laser transmitters and the add ports, and between the single-wavelength drop channels and the wavelength-insensitive receivers. FIG. 29 shows how a multi-fiber-optic patchcord interconnects in a one-to-one manner the wavelength-tunable laser transmitters and the add ports as before, and between the multiplexed-wavelength drop channels and the wavelength-tunable receivers, according to certain embodiments of the invention.

Optical-2R Boards

Figure 30:
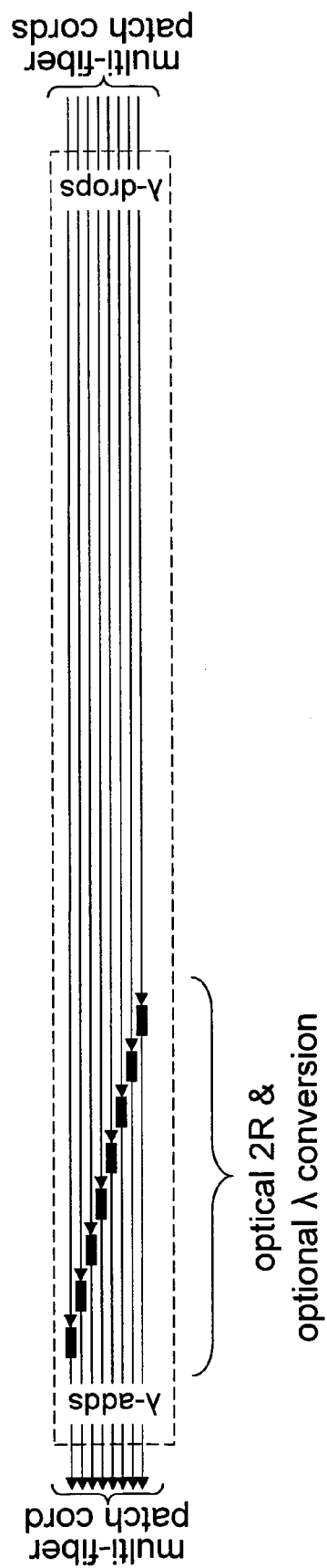
FIGS. 30-31 show wavelength-converting optical-2R devices according to certain embodiments of the invention (i.e., Optical-2R boards).
Figure 31:
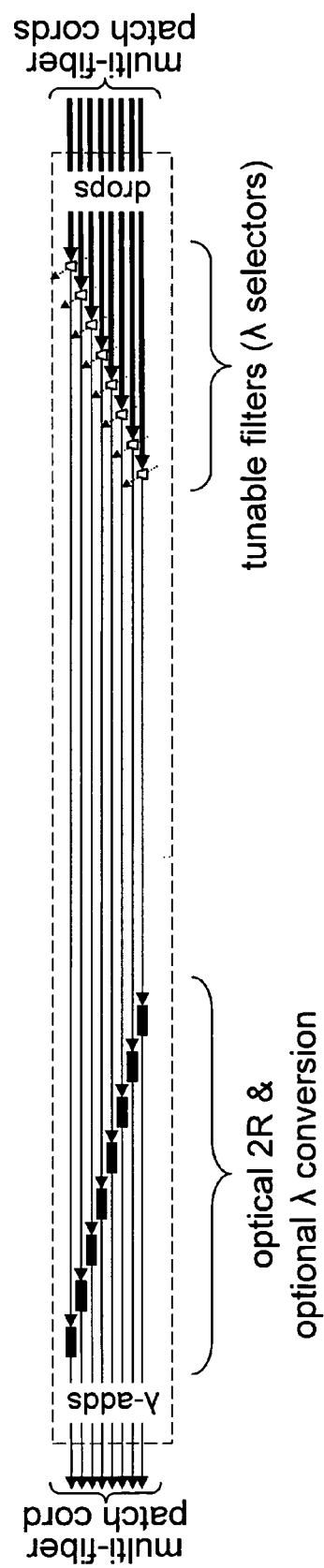

Alternative signal manipulation boards may be based on optical-2R devices. An optical-2R device does signal re-amplification and reshaping without the use of optical-to-electrical-to-optical (OEO) conversion as provided by laser transmitters and optical receivers. Depicted in FIG. 30 is an Optical-2R board containing optical-2R devices with optional wavelength-conversion capability, according to one embodiment. Not shown are the tunable lasers each optical-2R device may employ. Each optical-2R device has a single input wavelength channel ($\lambda$-drop) and outputs a single wavelength channel ($\lambda$-add). FIG. 31 shows another possible Optical-2R board, according to another embodiment, which contains optical-2R devices with optional wavelength-conversion capability. Again, not shown are the tunable lasers each optical-2R device may employ. In this case, a tunable filter selects a single wavelength channel from the multiplexed wavelength channels of each drop port, which is optically processed and produces a single wavelength channel ($\lambda$-add) output.

Figure 32:
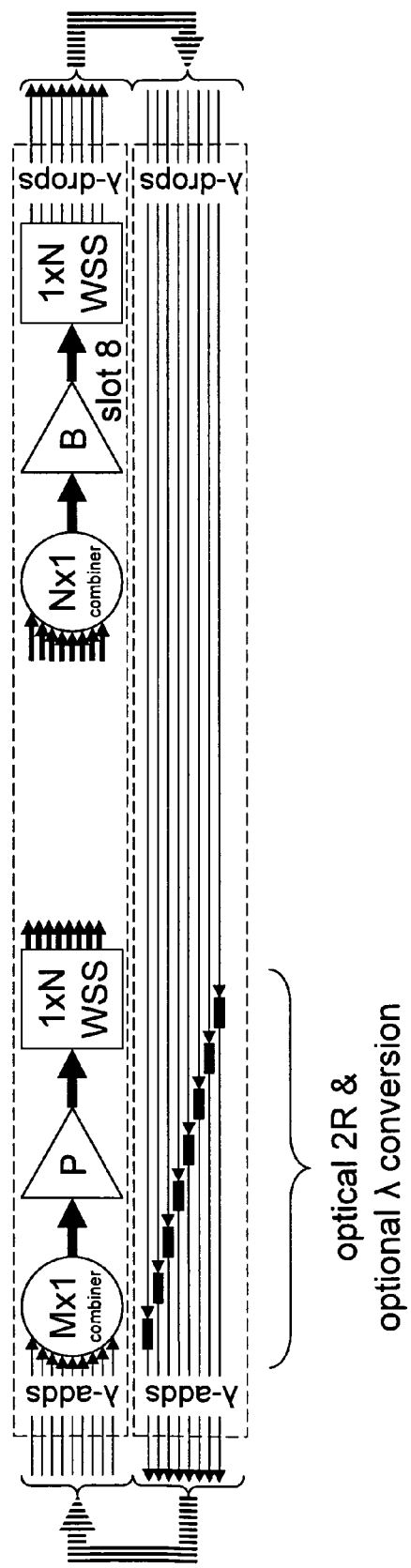
FIGS. 32-33 show WSS systems with wavelength-converting optical-2R devices according to certain embodiments of the invention.
Figure 33:
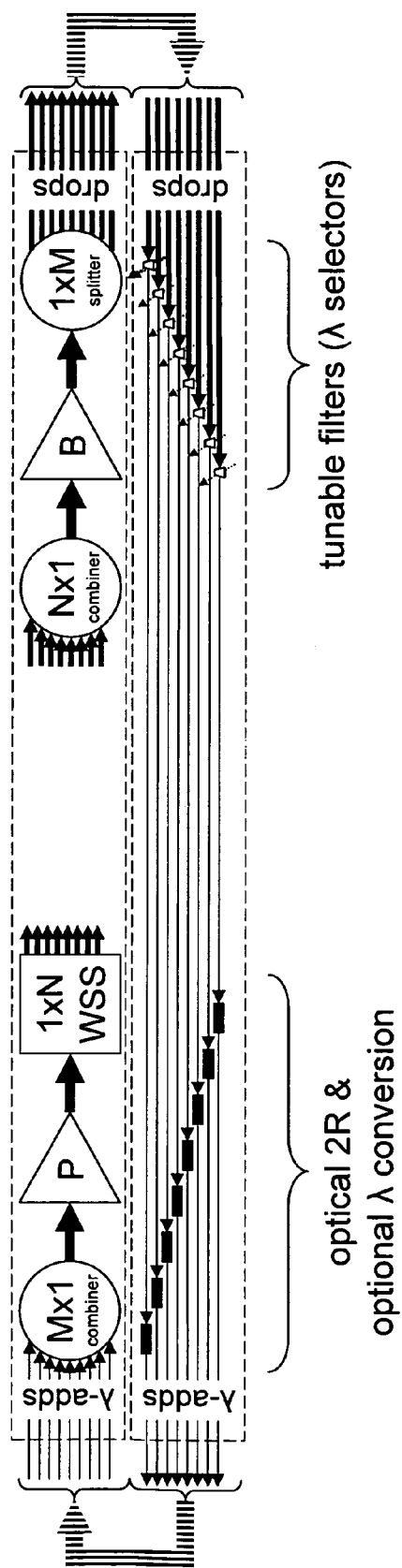

Similar to the case of Transmitter-Receiver boards, according to one embodiment the Optical-2R boards connect with the Add-Drop boards using multi-fiber patch cords. FIG. 32 shows explicitly a multi-fiber-optic patch-cord interconnection between the output of the individual wavelength-tunable optical-2R devices and the add ports formed by the M×1 combiner of the Add-Drop board, and between the single-wavelength channel drops and the inputs of the optical-2R devices, according to one embodiment. We show in FIG. 33 the multi-fiber-optic patch-cord interconnection between the output of the individual wavelength-tunable optical-2R devices and the add ports formed by the M×1 combiner of the Add-Drop board, and between the multiplexed wavelength channels of each drop port of the 1×M splitter and the input of each optical-2R device according to one embodiment. A tunable filter selects a single wavelength channel from the multiplexed wavelength channels of each drop port, which is optically processed and produces a single wavelength channel ($\lambda$-add) output.

Alien Wavelength Management

Figure 34:
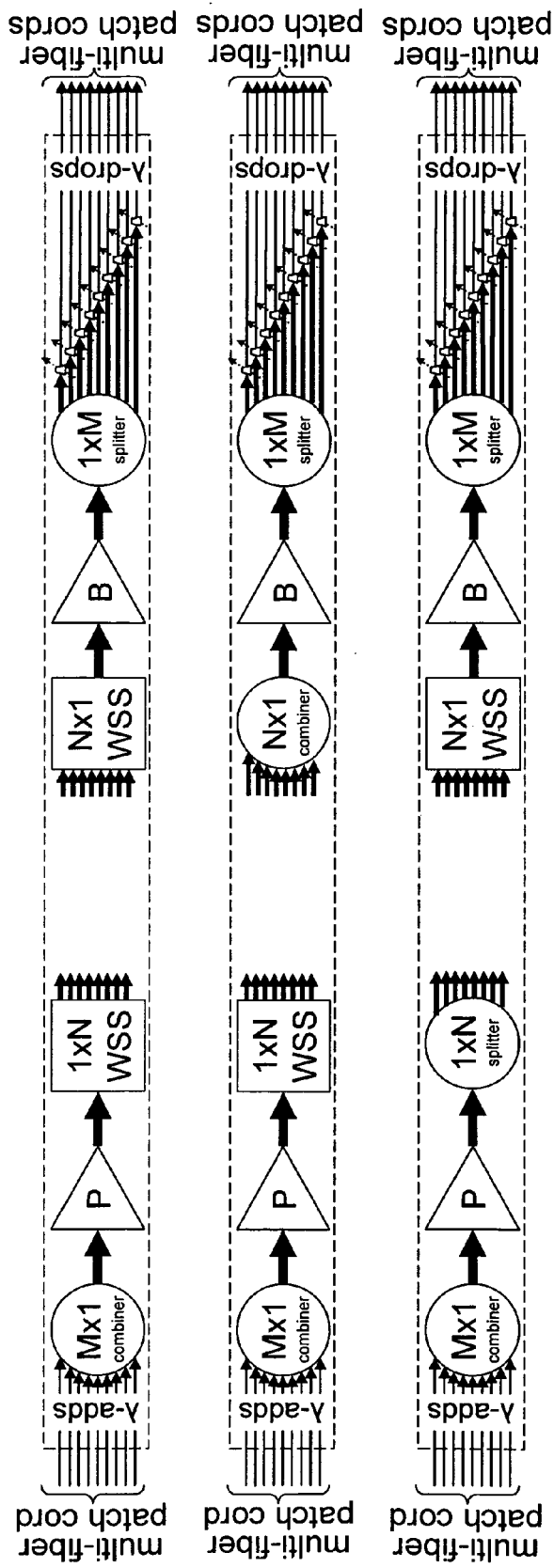
FIG. 34 shows boards providing add/drop ports for WSS systems suitable for alien wavelengths according to certain embodiments of the invention (i.e., Alien-Wavelength boards).

When a client requires a dedicated channel for which they originate the signal, we call this an alien wavelength although it is actually a standard channel wavelength. We may return to the client this alien-wavelength signal at some remote node. In addition, bidirectional communication may also be required. Add-Drop boards that drop a single channel wavelength, and not multiplexed (broadcasted) channels, also can serve as Alien-Wavelength boards. It is assumed that the client will originate a signal on the proper channel wavelength. An input filter could be included on any Alien-Wavelength board to block all but the allowed channel, but this would add additional cost. Shown in FIG. 34 are some specific Alien-Wavelength boards that contain tunable filters on the output ports of the 1×M splitter, which causes only a single wavelength (the alien wavelength) to be returned to the client according to certain embodiments of the invention. Summarized below are all the boards that can function as Alien-Wavelength boards. The patch cording required for Alien-Wavelength boards is quite straightforward, since the individual fibers are merely being connected to the client's transmitters and receivers.

Figure 35:
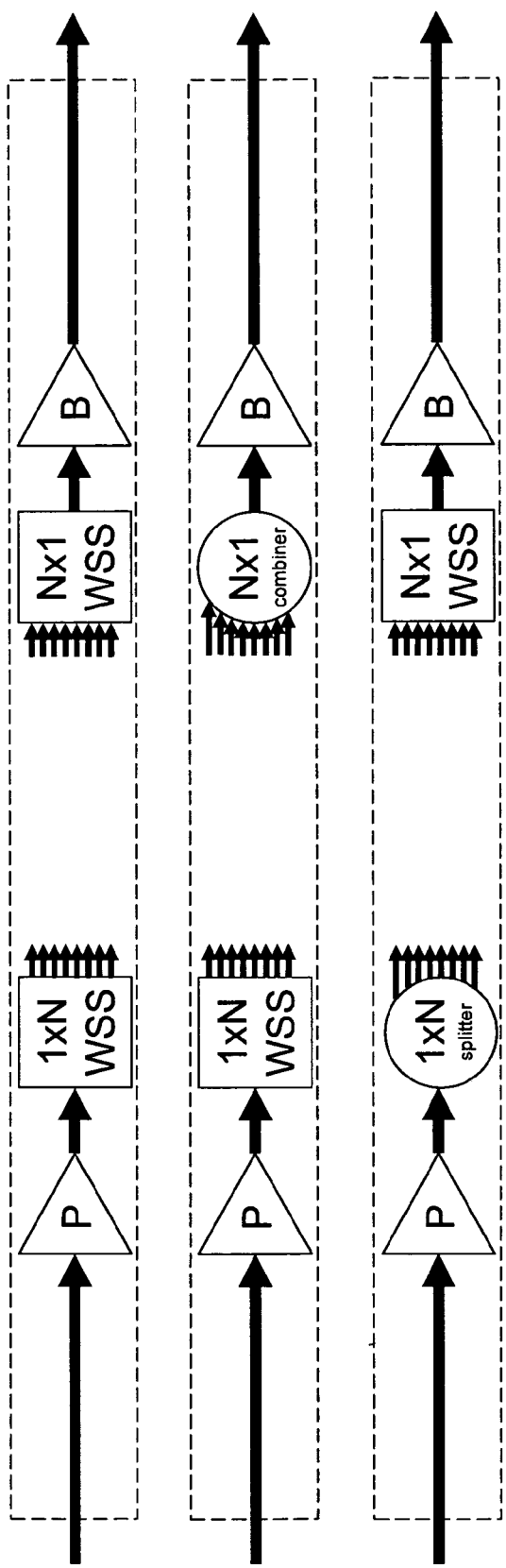
FIG. 35 shows a summary of Cross-Connect boards for WSS systems according to certain embodiments of the invention.
Figure 36:
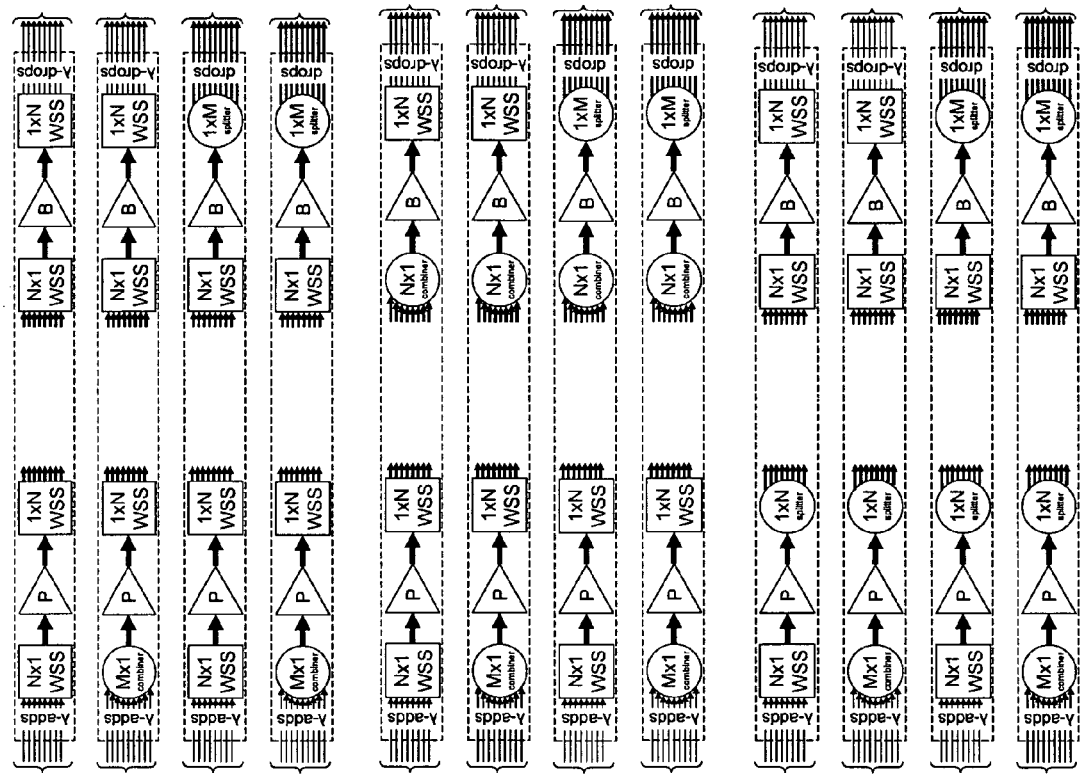
FIG. 36 shows a summary of Add-Drop boards providing add/drop ports for WSS systems according to certain embodiments of the invention.
Figure 37:
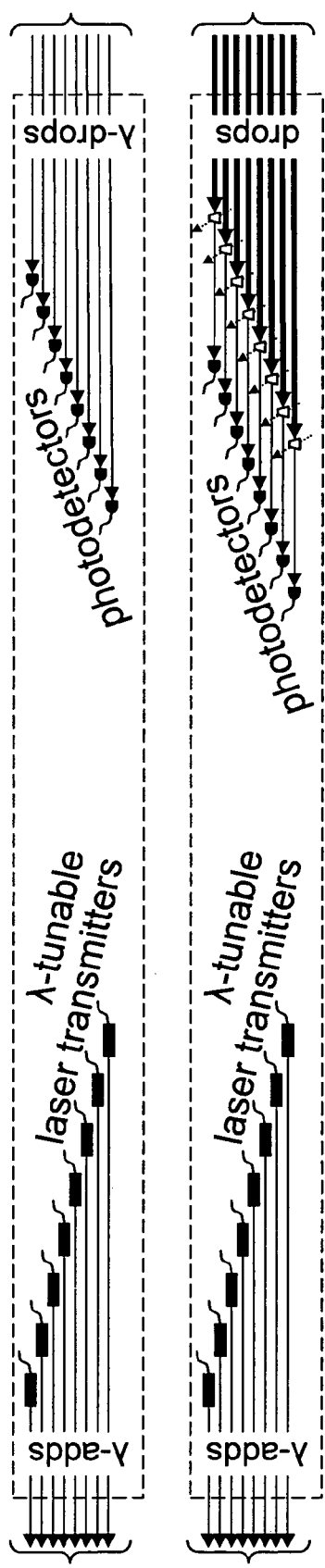
FIG. 37 shows a summary of Transmitter-Receiver boards according to certain embodiments of the invention.
Figure 38:
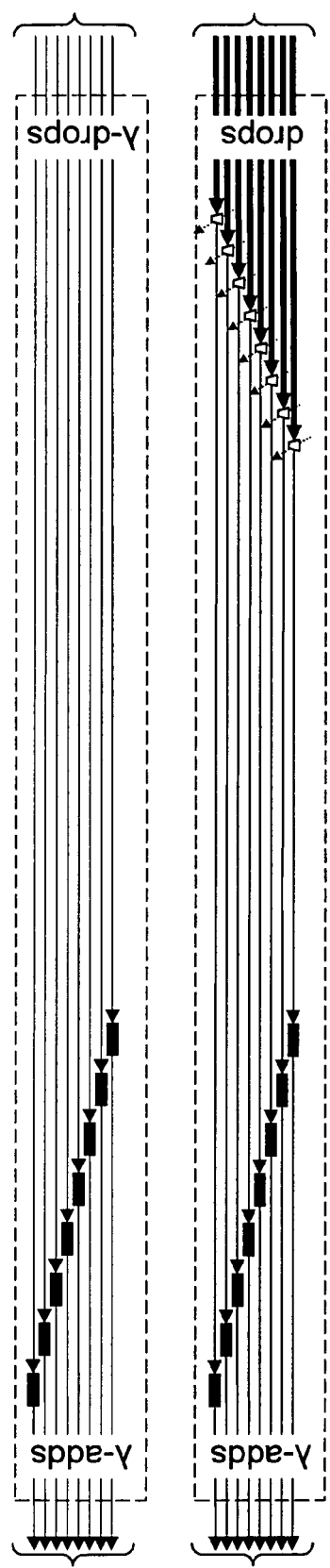
FIG. 38 shows a summary of optical-2R boards according to certain embodiments of the invention.
Figure 39:
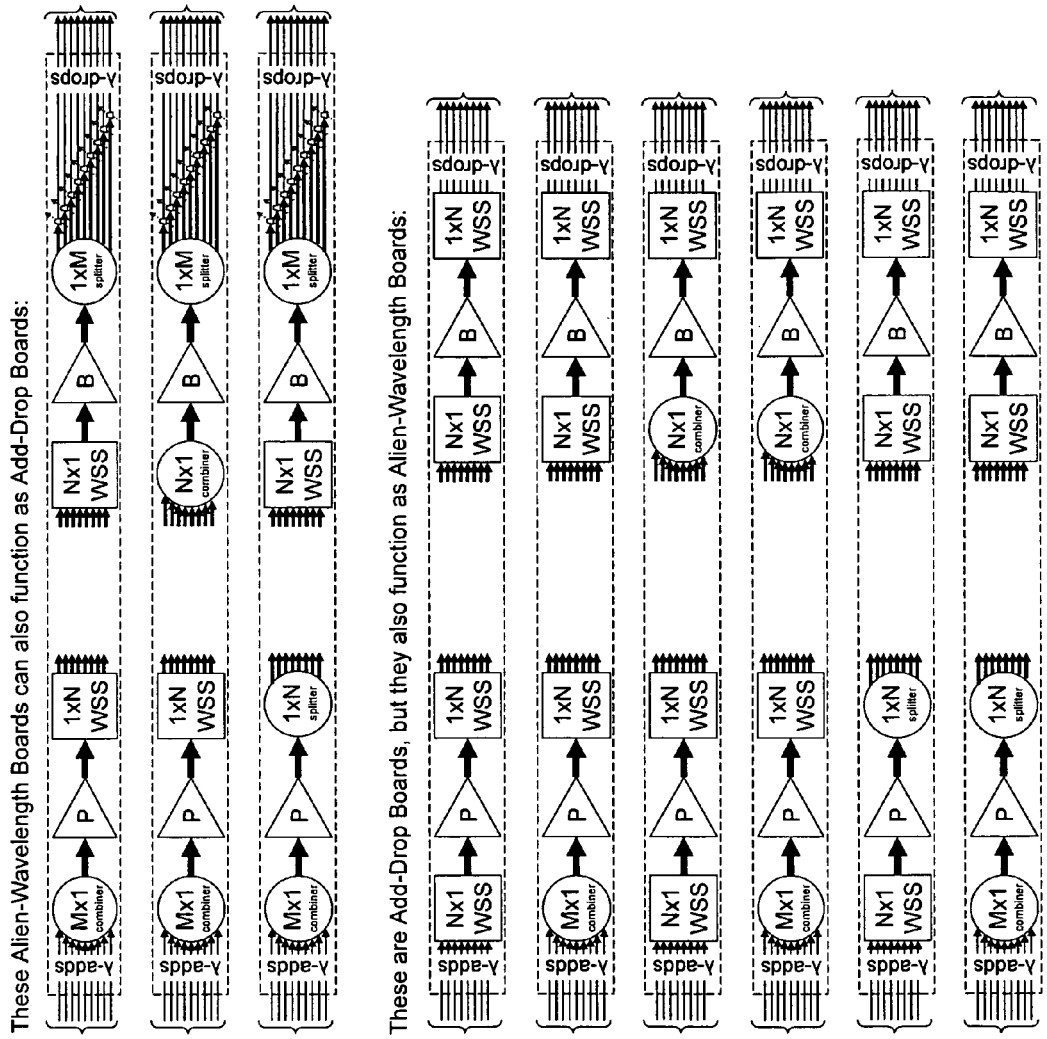
FIG. 39 shows a summary of Alien-Wavelength boards and those Add-Drop boards that can function as Alien-Wavelength boards for WSS systems according to certain embodiments of the invention.

For the purposes of illustration, the level of detail was limited to illustrate only the critical functions and their relation among the various kinds of boards. FIG. 35 gives a pictorial summary of Cross-Connect boards; FIG. 36 gives a pictorial summary of Add-Drop boards; FIG. 37 gives a pictorial summary of Transmitter-Receiver boards; FIG. 38 gives a pictorial summary of Optical-2R boards; and FIG. 39 gives a pictorial summary of Alien-Wavelength broads, where some also function as Add-Drop boards, according to some embodiments of the invention.

Enhancements
Alternative Board-Level Embodiments

Figure 40:
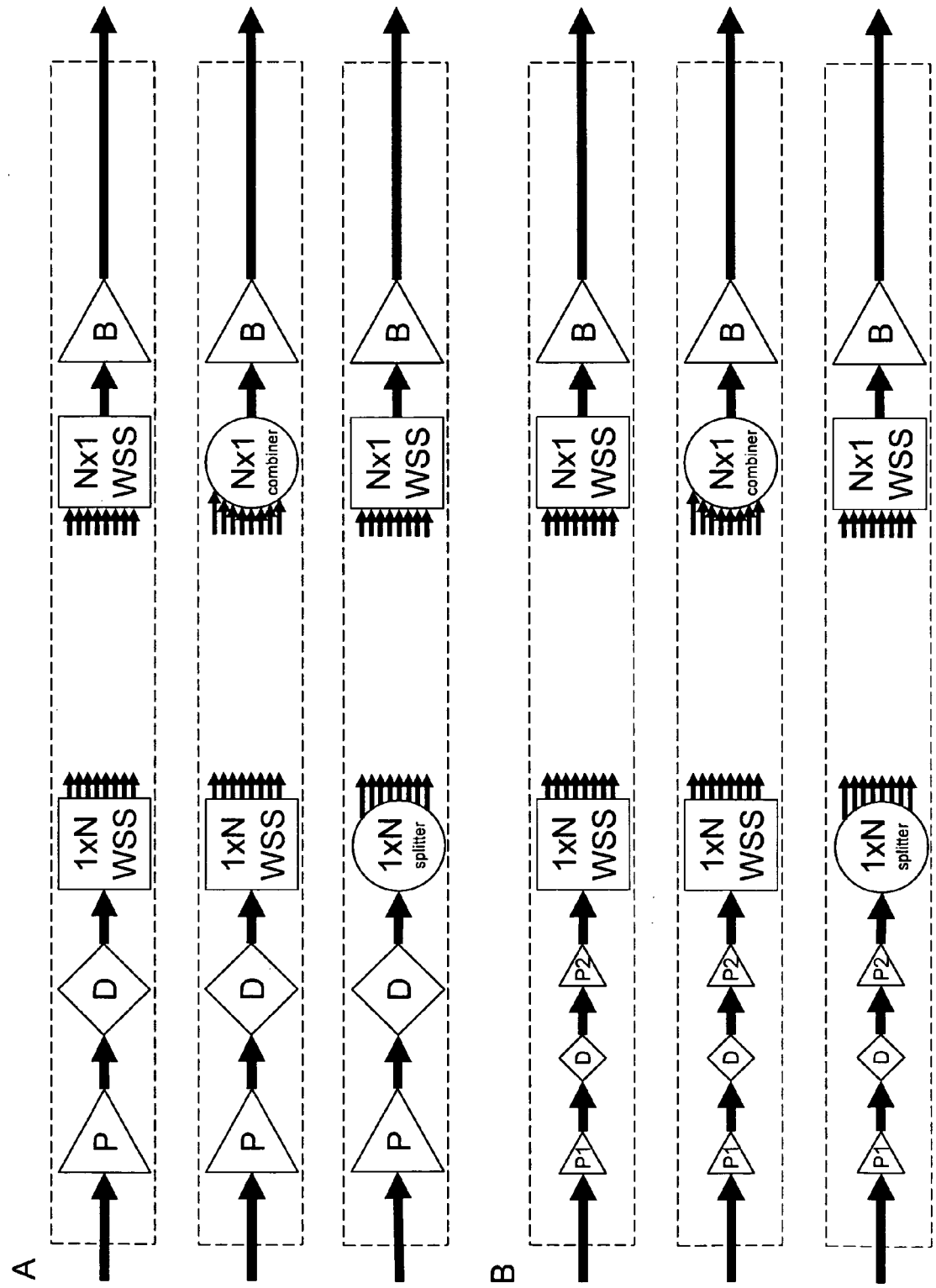
FIGS. 40-41 show Dispersion-Managed Cross-Connect boards for WSS systems with dispersion-compensator devices for WSS systems according to certain embodiments of the invention.
Figure 41:
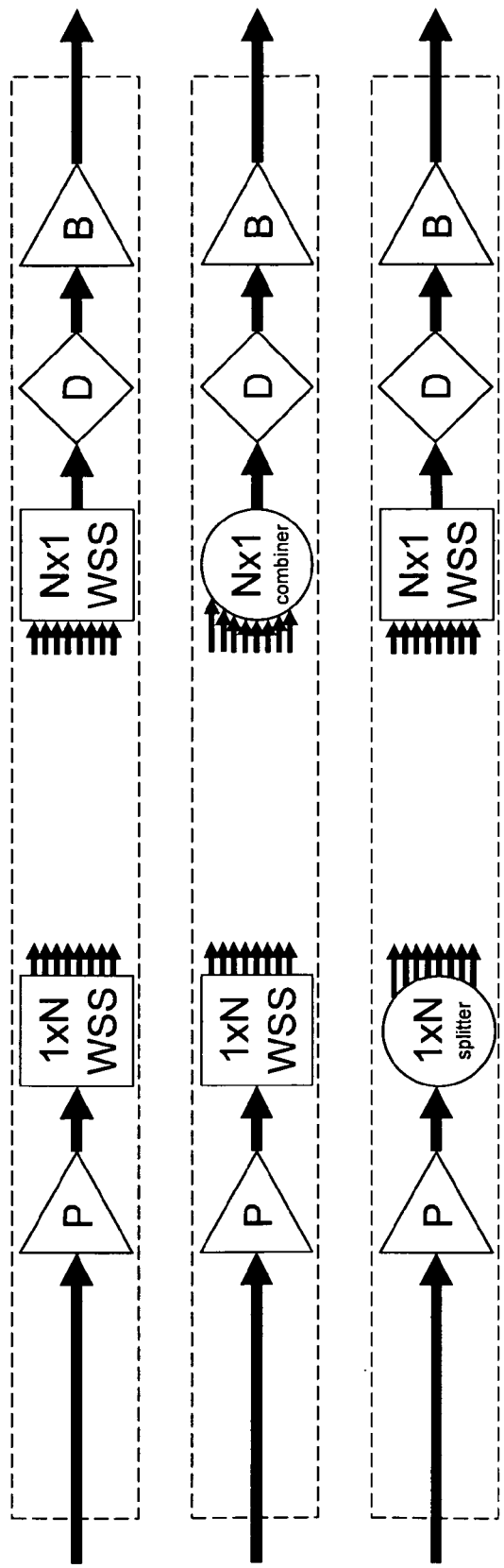

Additional features that may be included and form an integral part of embodiments of the invention are optical-dispersion compensation and optical-channel monitoring. FIG. 40A and FIG. 40B shows certain embodiments of Dispersion-Managed Cross-Connect boards where the dispersion management is at the ingress. FIG. 40A gives placement of a multi-channel dispersion compensator (marked with the letter D) after the ingress optical amplifier (pre-amp, marked with a letter P), and FIG. 40B gives placement of the multi-channel dispersion compensator (marked with the letter D) between the two stages of a possible two-stage ingress optical amplifier (pre-amps, marked P1 and P2). FIG. 41 shows certain embodiments of Dispersion-Managed Cross-Connect boards where the dispersion management is at the egress. The multi-channel dispersion compensator (marked with the letter D) is placed before the egress optical amplifier (booster, marked with the letter B). Note that there is no need for any DCM on the Add-Drop boards, since the use of a DCM is to compensate for node-to-node fiber-optic link dispersion, which is handled completely by the Dispersion-Managed Cross-Connect boards.

Figure 42:
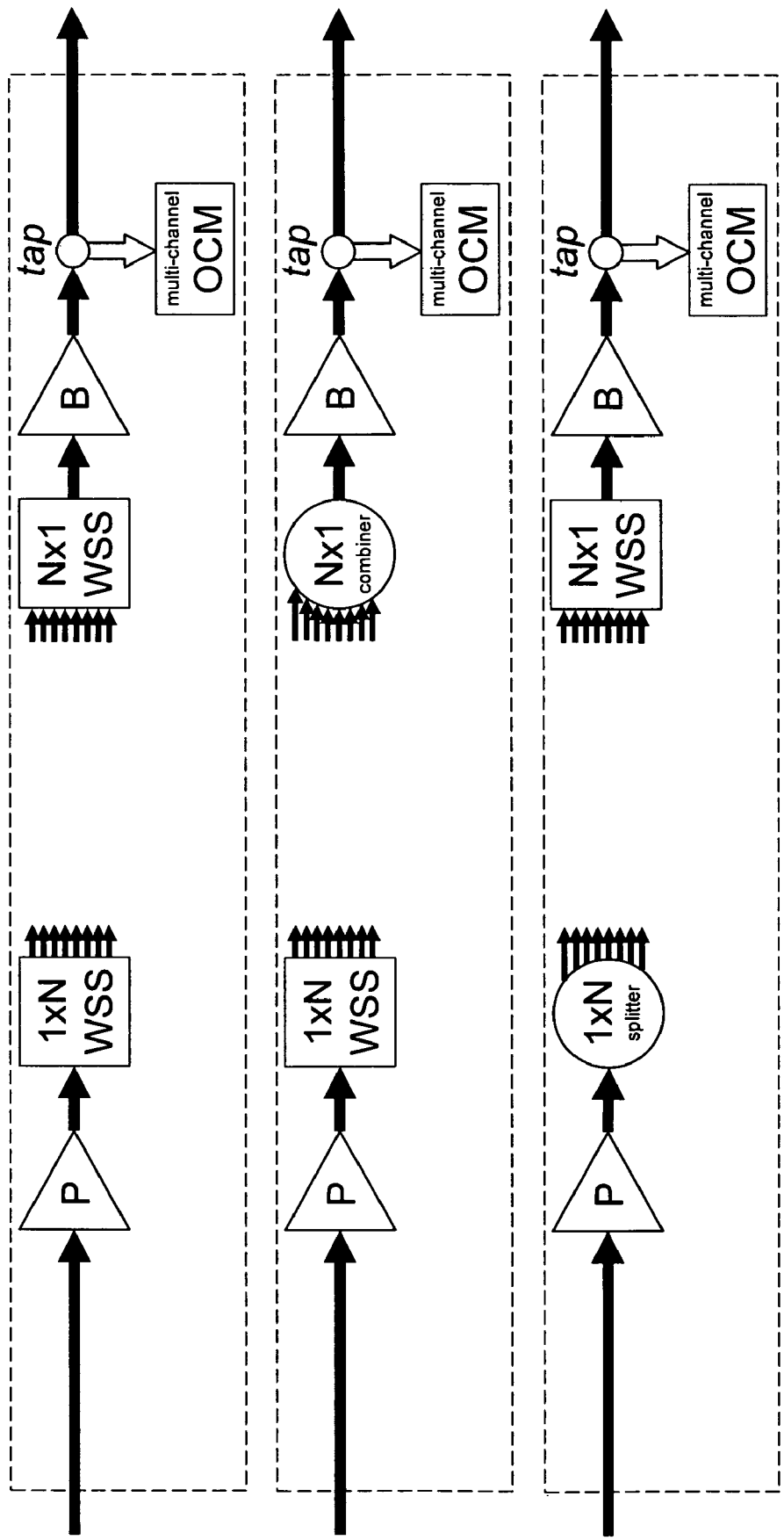
FIG. 42 shows Cross-Connect boards with optical channel monitors (OCMs) for WSS systems according to certain embodiments of the invention.
Figure 43:
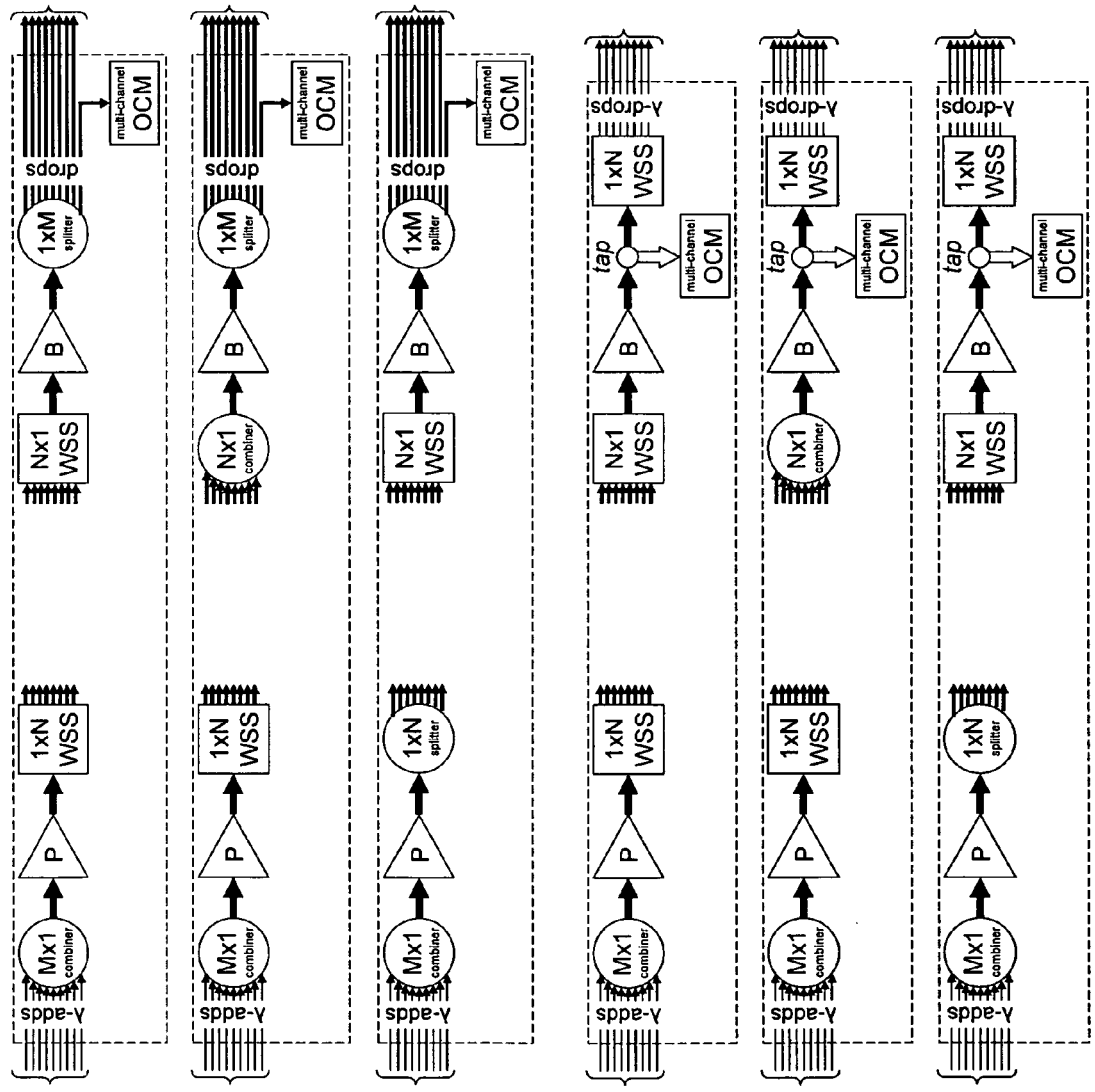
FIG. 43 shows Add-Drop boards with optical channel monitors (OCMs) for WSS systems according to certain embodiments of the invention.
Figure 44:
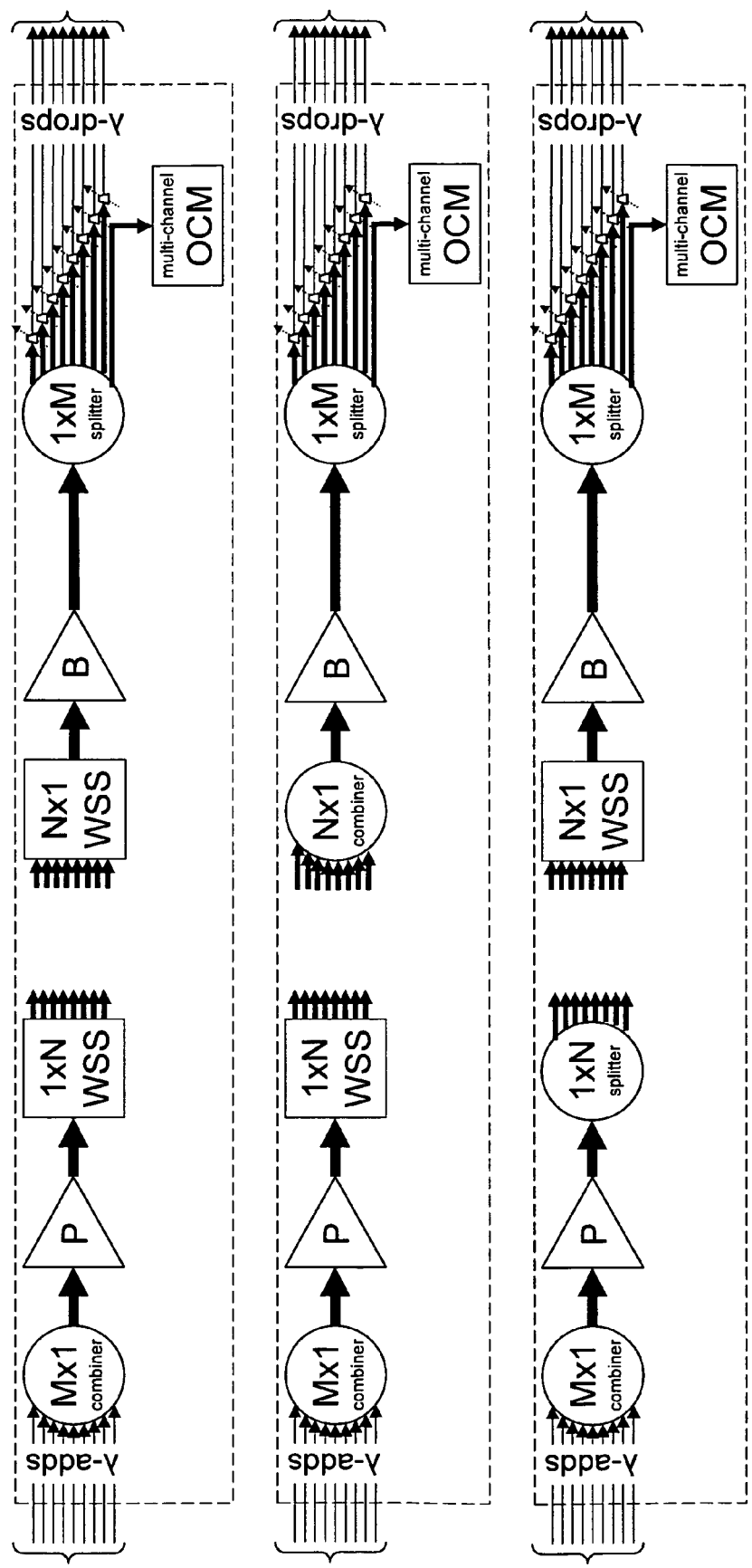
FIG. 44 shows Alien-Wavelength boards with optical channel monitors (OCMs) for WSS systems according to certain embodiments of the invention.

At each node of the optical network, the channel-wavelength signals are monitored for their presence and optical power, where a loss of power below a certain threshold would generate a fast alarm similar to a loss of signal (LOS) alarm. This includes pass-through signals, signals added, and signals being dropped. FIG. 42 shows certain embodiments of implementations of optical-channel monitoring on Cross-Connect boards, which covers monitoring of pass-through signals and signals added at this node. FIG. 43 shows certain embodiments of implementations of optical-channel monitoring on Add-Drop boards, which covers monitoring of signals dropped at this node. Alien-wavelength signals also require monitoring for presence and optical power. Besides the Add-Drop boards that can be used for alien-wavelength drops, FIG. 44 shows the specific Alien-Wavelength boards with optical channel monitoring according to certain embodiments of the invention. Alternatively, a tap coupler and multi-channel OCM could be placed after the pre-amp (P) but before the 1×N WSS or 1×N splitter instead of the approach taken in FIGS. 42-44.

Node Protection Embodiments

Figure 45:
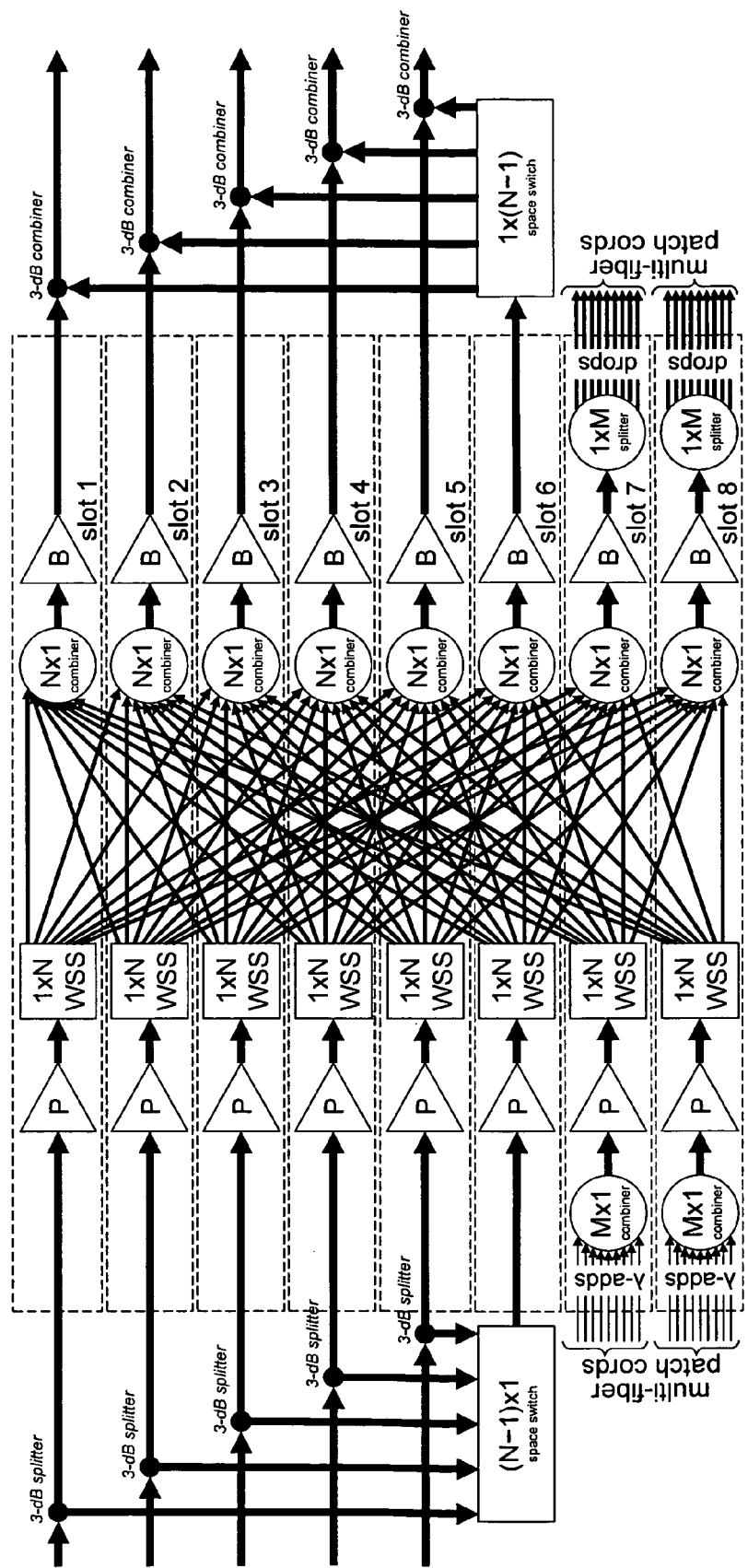
FIGS. 45-46 show protection schemes for failure of Cross-Connect boards in WSS systems according to certain embodiments of the invention.

A method of dealing with the possible failure of one of the Cross-Connect boards is highly desired for network reliability. FIG. 45 shows one embodiment of node protection using a 3-dB splitter to send a copy of the ingress signals to an auxiliary Cross-Connect board and a 3-dB combiner to place the egress signals on the egress port of the slot with the failed Cross-Connect board, where an (N−1)×1 space switch and a 1×(N−1) space switch together select which Cross-Connect board is under protected reroute. Egress signals that were sent by any 1×N WSSs to the failed Cross-Connect board need to be routed to the auxiliary Cross-Connect board. Note that transmission through the malfunctioning Cross-Connect board under protected reroute must be blocked by disabling the optical amplifiers, which makes them opaque.

Figure 46:
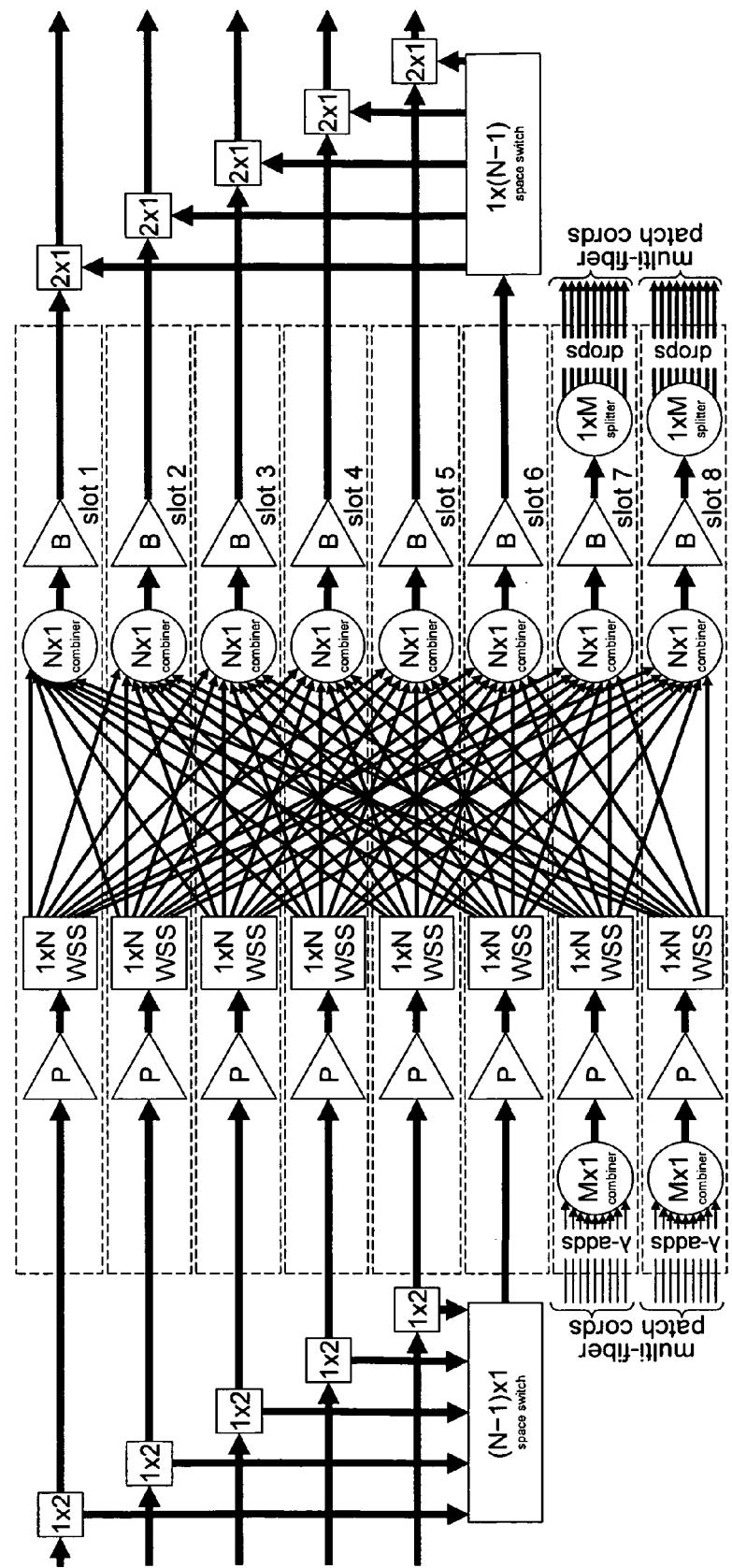

Another embodiment of node protection scheme shown in FIG. 46 uses a 1×2 space switch to reroute the ingress signals to an auxiliary Cross-Connect board and a 2×1 space switch to place the egress signals on the egress port of the slot with the failed Cross-Connect board, where an (N−1) ×1 space switch and a 1×(N−1) space switch together select which Cross-Connect board is under protected reroute. Egress signals that were sent by any 1×N WSSs to the failed Cross-Connect board need to be routed to the auxiliary Cross-Connect board. Note that transmission is blocked through the malfunctioning Cross-Connect board under protection reroute by the 1×2 and 2×1 space switches, which have isolated the failed board from any possible signal transmission.

These methods described for FIGS. 45 and 46 persist to be valid for other embodiments based on the use of other kinds of Cross-Connect boards. The only change is in the details of how egress signals sent to the failed Cross-Connect board are routed to the auxiliary Cross-Connect board.

Chassis Examples for Modular System
Chassis and their Backplanes

Figure 47:
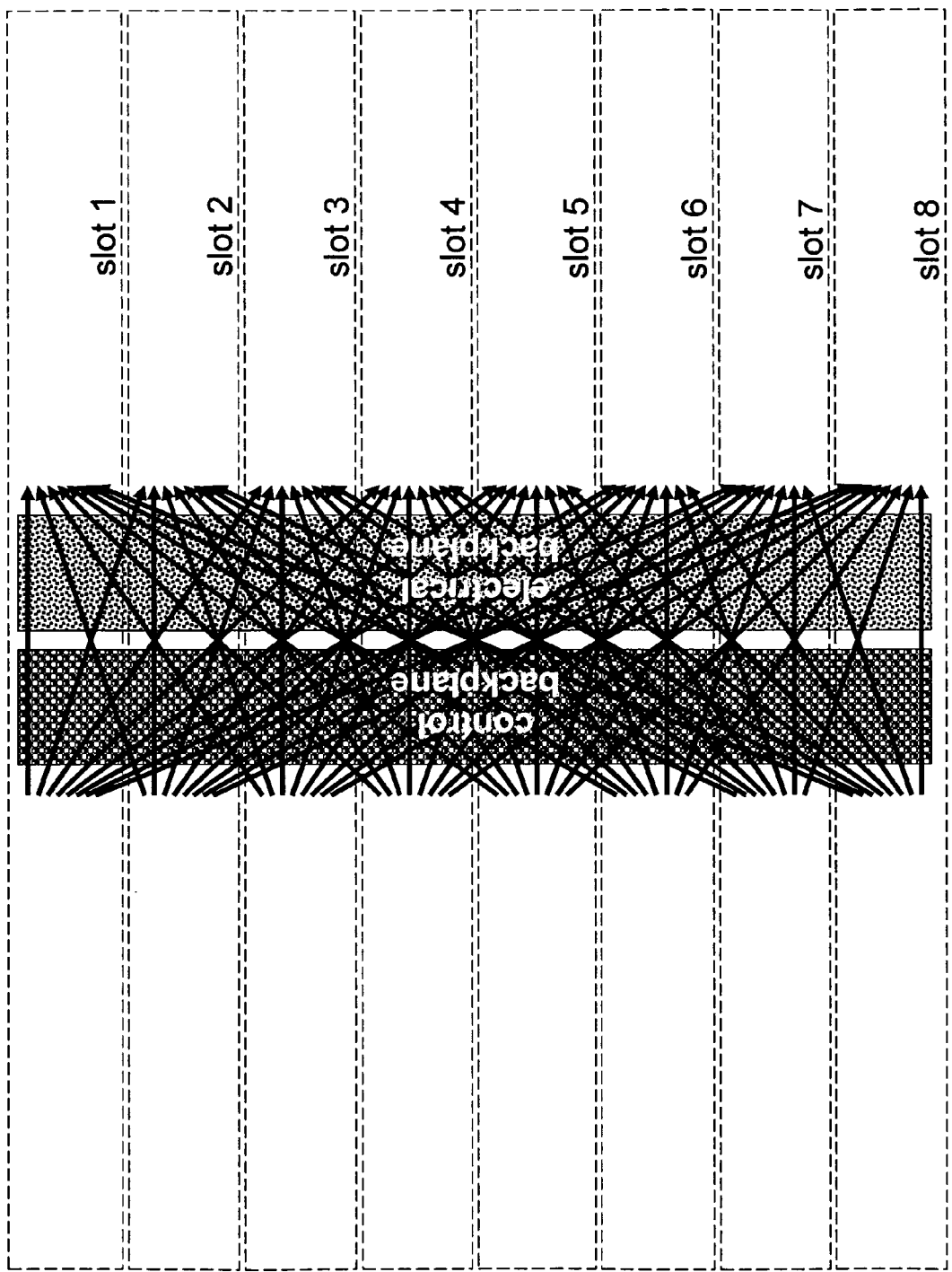
FIG. 47 shows a Super (i.e., main) chassis consisting of Optical, Electrical, and Control backplanes with board slots for WSS systems according to certain embodiments of the invention.
Figure 48:
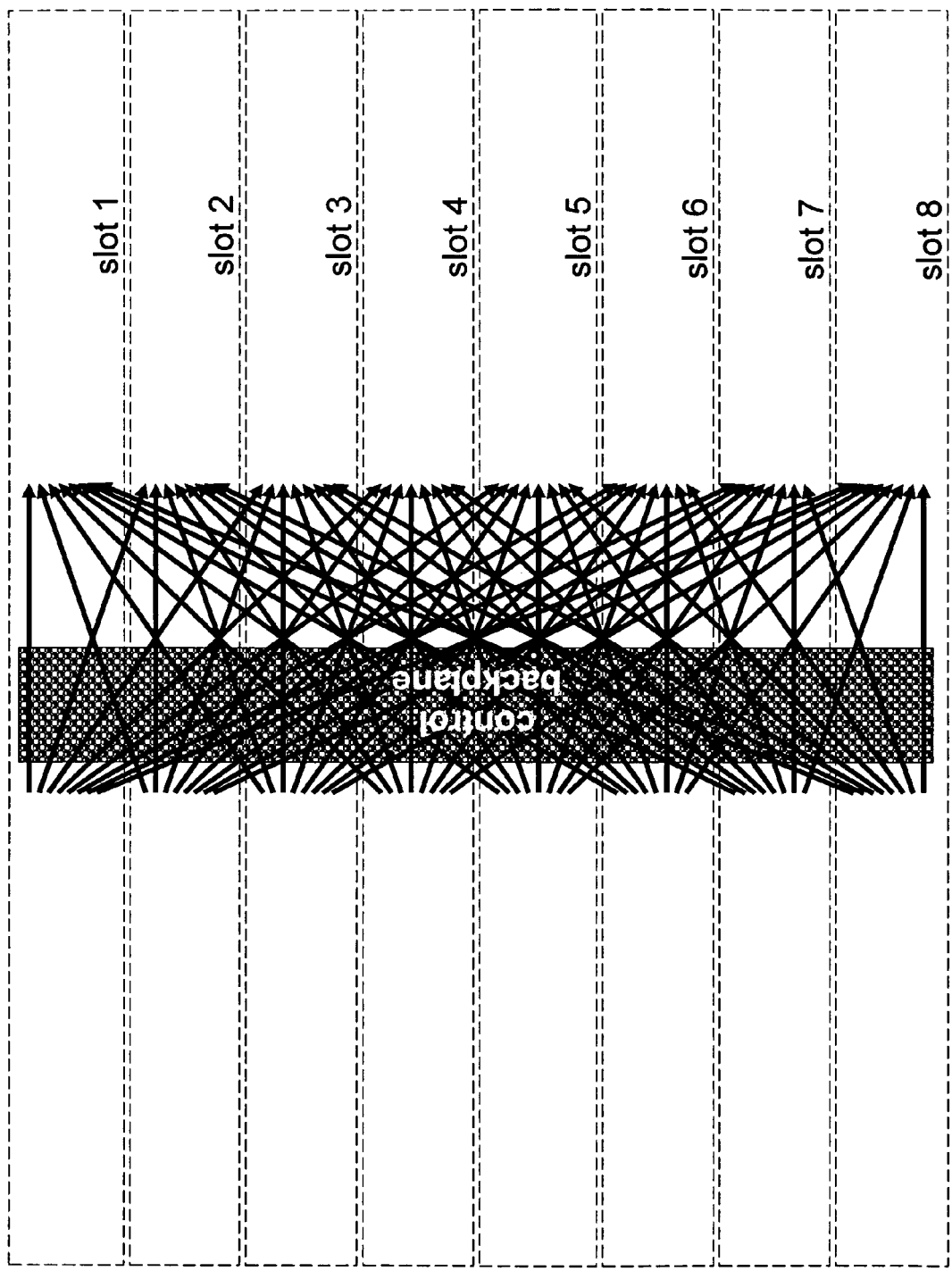
FIG. 48 shows an Optical chassis consisting of Optical and Control backplanes with board slots for WSS systems according to certain embodiments of the invention.
Figure 49:
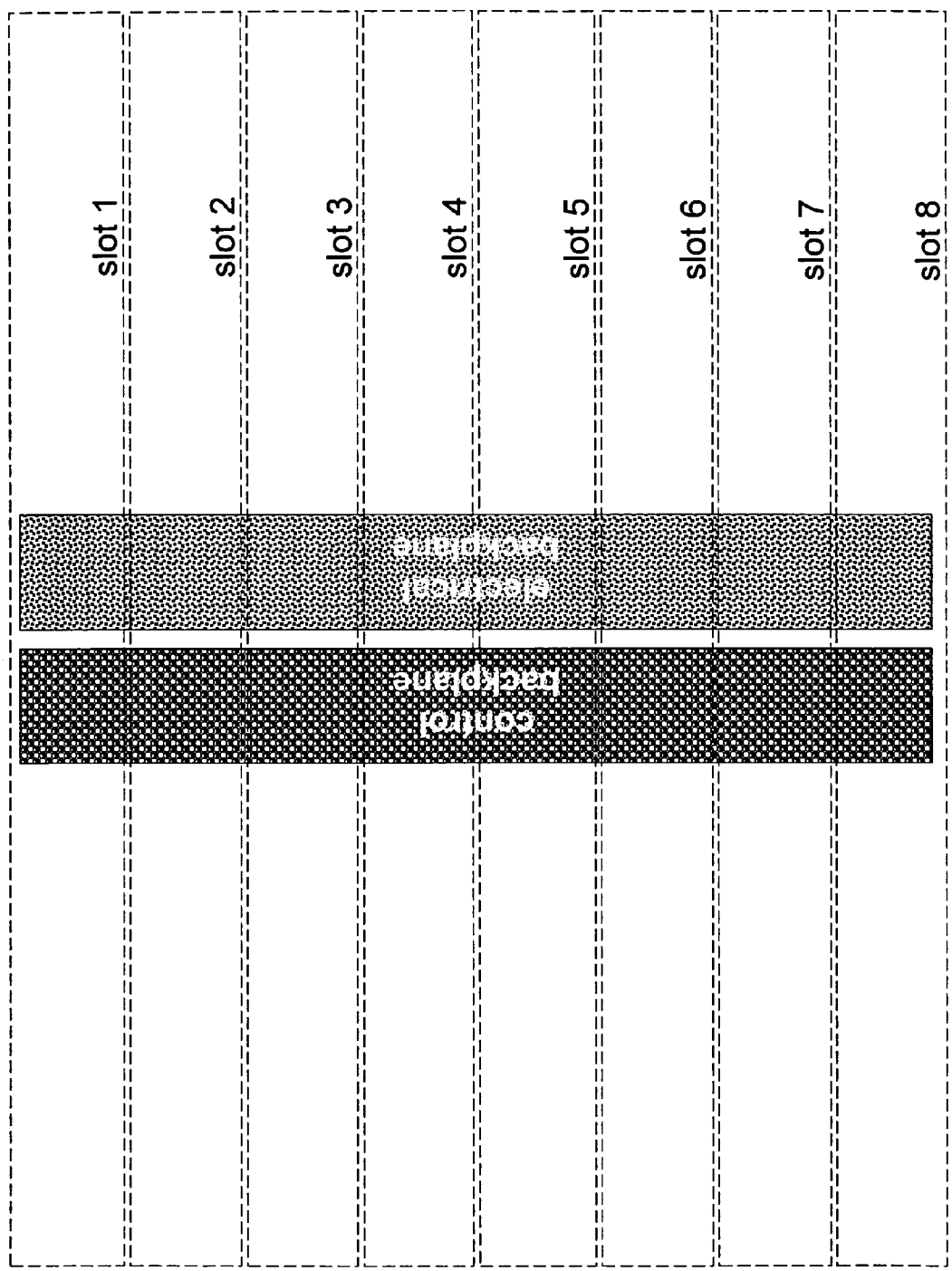
FIG. 49 shows an Electrical chassis consisting of Electrical and Control backplanes with boards slots for WSS systems according to certain embodiments of the invention.

Shown in FIG. 47 is a single chassis that is capable of handling all boards according to one embodiment, which we call a Super (i.e., main) chassis. It is a hybrid chassis containing an electrical-control backplane (Control backplane), a high-speed electrical-signal backplane (Electrical backplane), and an Optical backplane. Two separate chassis could also be used where one (as shown in FIG. 48 according to another embodiment) is an Optical chassis containing a electrical-control backplane (Control backplane) and an Optical backplane and the other (as shown in FIG. 49 according to another embodiment) is an Electrical chassis containing an electrical-control backplane (Control backplane) and a high-speed electrical-signal backplane (Electrical backplane). Cross-Connect, Add-Drop, Alien-Wavelength, Transmitter-Receiver, and Optical-2R boards would all go in the Super chassis. Cross-Connect, Add-Drop, and Alien-Wavelength boards would go in the Optical chassis. Transmitter-Receiver and Optical-2R boards would go in the Electrical chassis. In addition, Optical-2R could go in the Optical chassis.

Chassis Configurations

Figure 50:
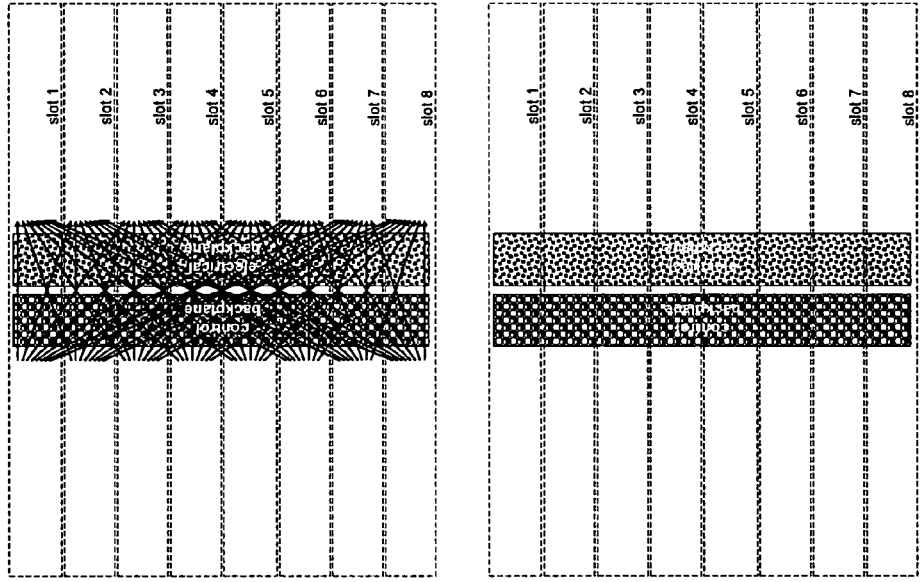
FIG. 50 shows configurations of the Super chassis either alone or with one or more Electrical chassis for WSS systems according to certain embodiments of the invention.
Figure 50:
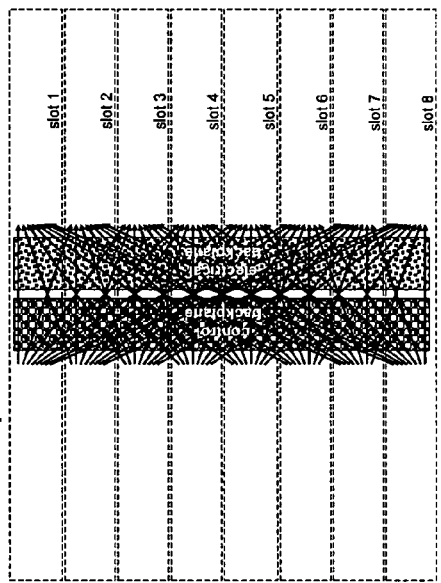
Figure 51:
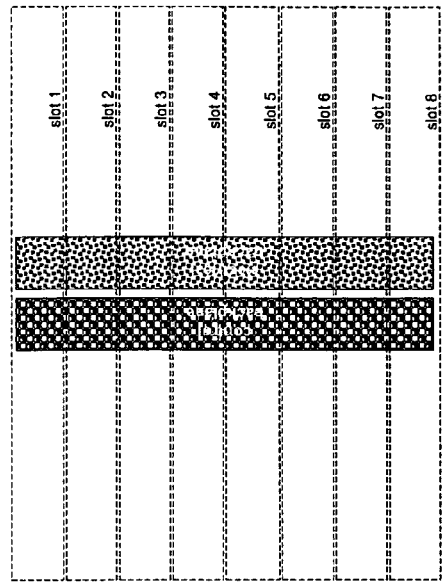
FIG. 51 shows an Optical chassis with one or more Electrical chassis for WSS systems according to certain embodiments of the invention.
Figure 51:
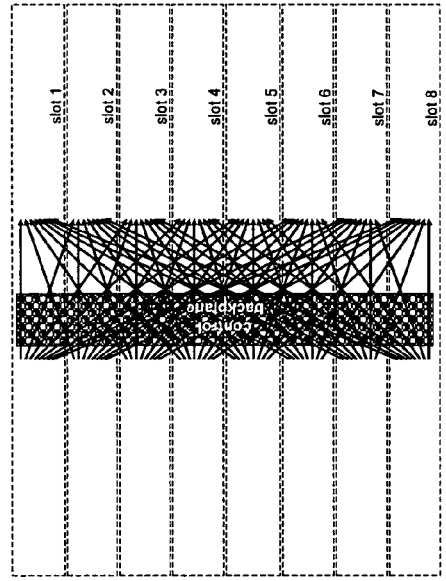
Figure 51:
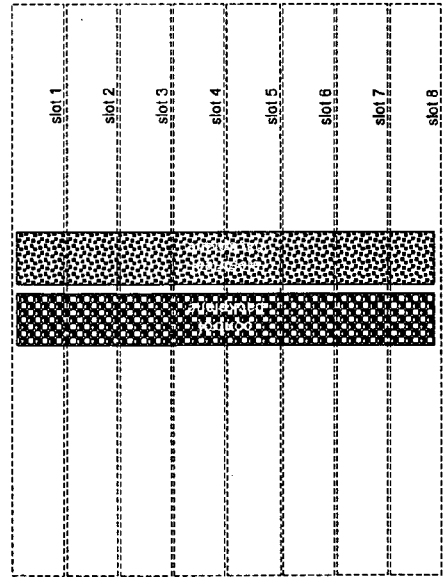

As shown in FIG. 50, according to one embodiment the (hybrid) Super chassis could be used alone or the (hybrid) Super chassis could be combined with an Electrical chassis at a later date to allow expansion of the number of Add-Drop signals at this node, which provides a future-upgrade option. FIG. 51 shows an Optical chassis with one or more Electrical chassis to satisfy immediate need and again provide for future-upgrade expansion of the number of Add-Drop signals at this node according to another embodiment. Note that the Optical chassis does not possess a potentially expensive high-speed electrical backplane and the Electrical chassis does not possess a potentially expensive Optical backplane.

Figure 52:
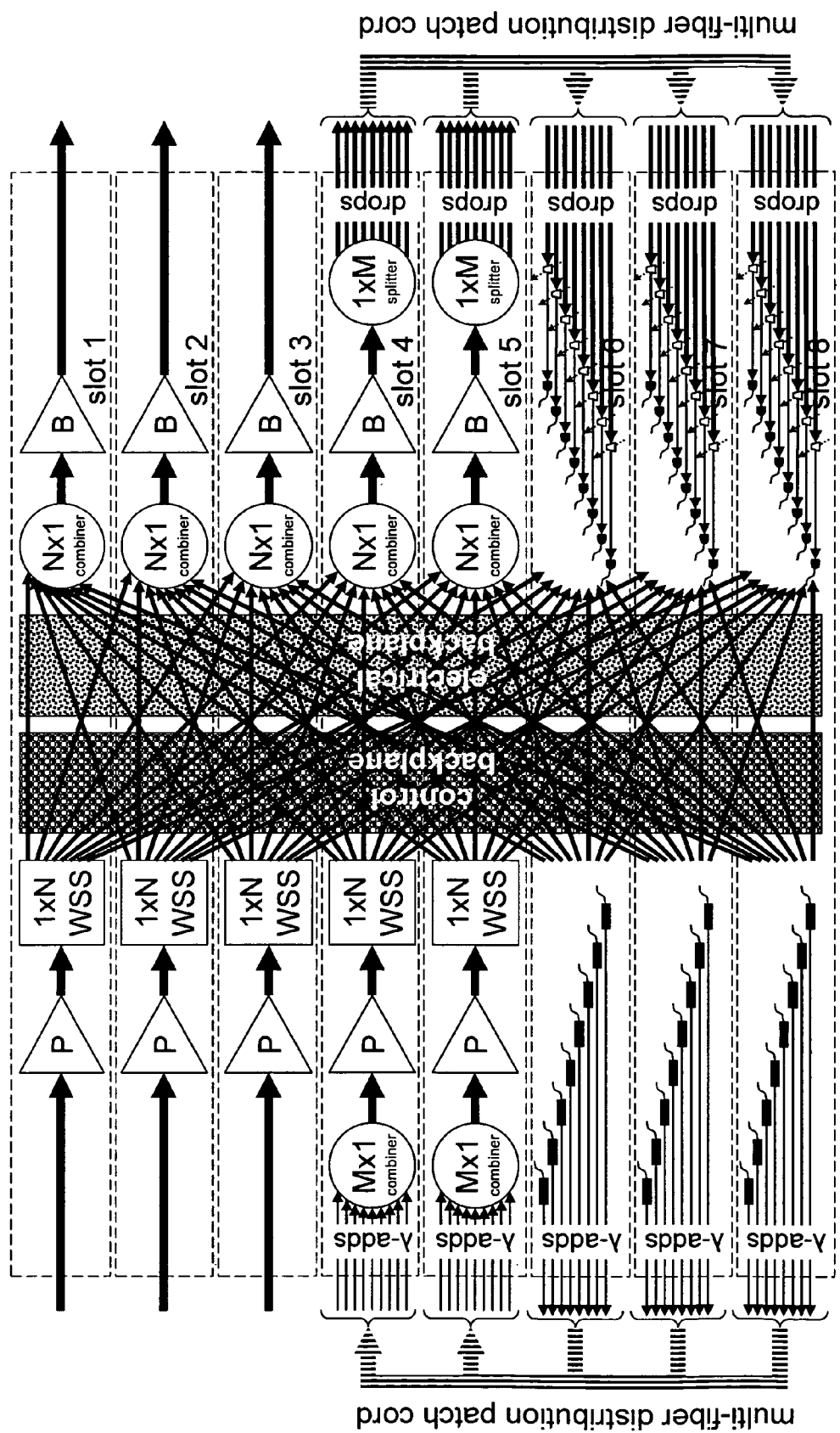
FIG. 52 shows a Super-chassis WSS system according to certain embodiments of the invention.
Figure 53:
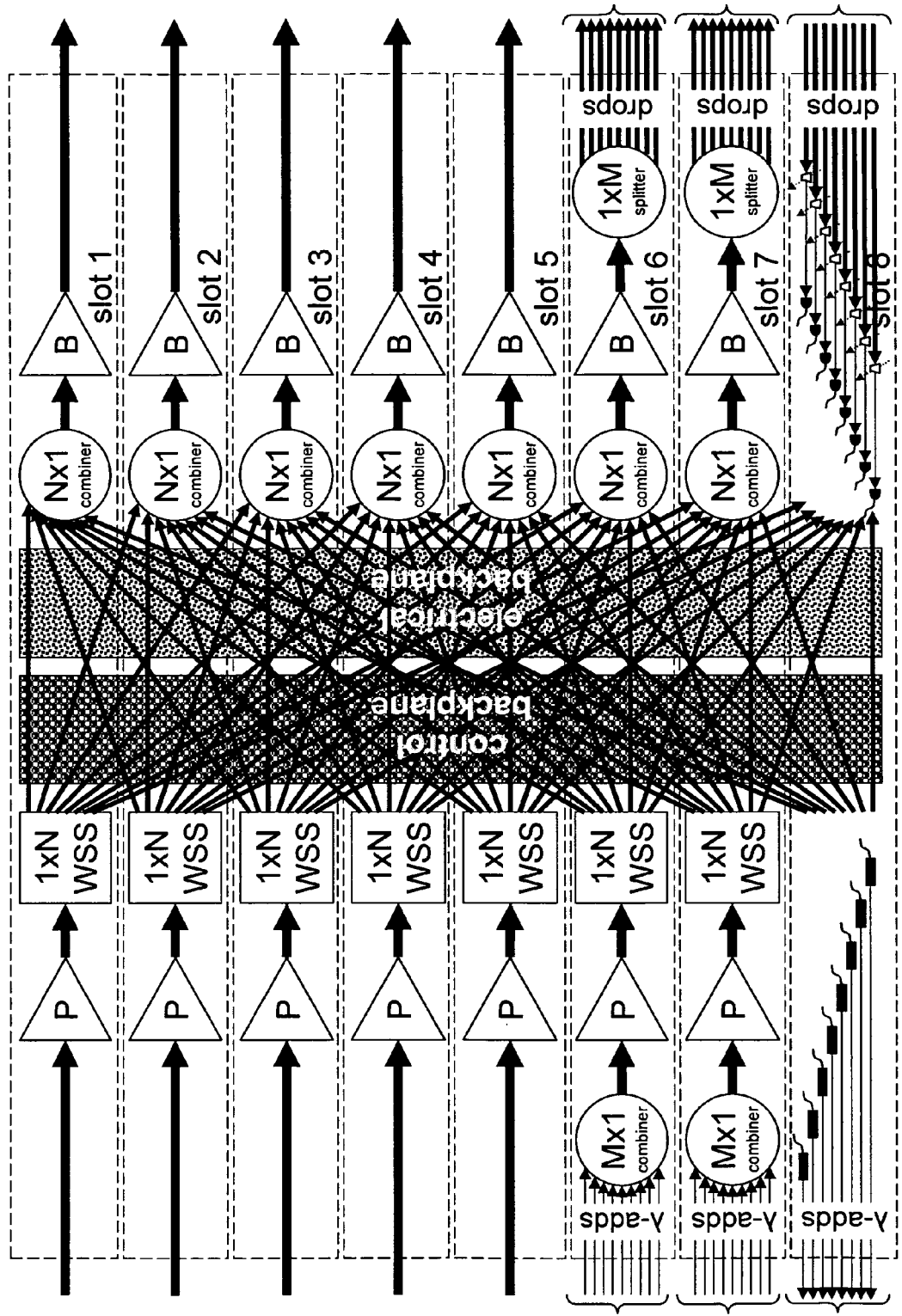
FIGS. 53-55 show a Super-chassis WSS system with expansion using an Electrical chassis according to certain embodiments of the invention.
Figure 54:
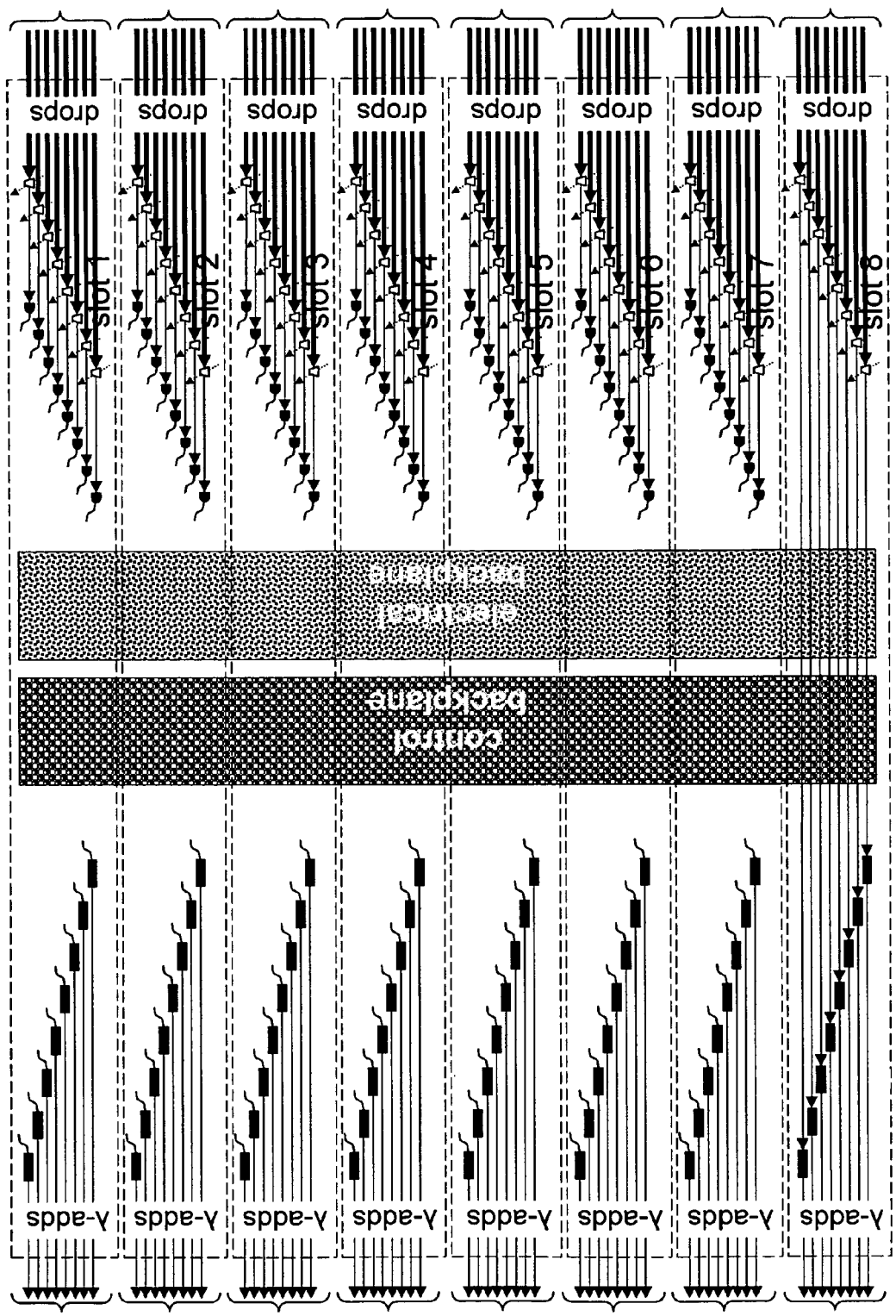
Figure 55:
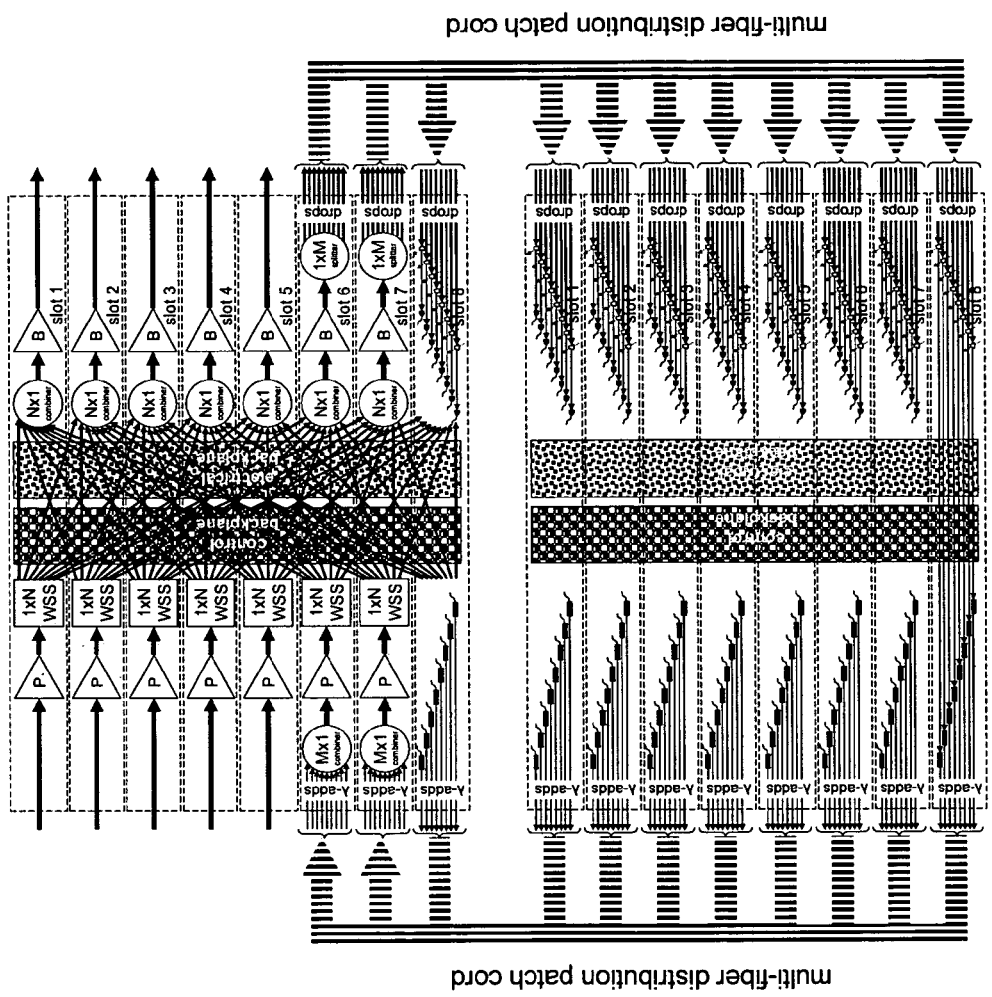

The utility of the (hybrid) Super chassis is shown by an example configuration in FIG. 52 with Cross Connect, Add-Drop, and Transmitter-Receiver boards, including the multi-fiber distribution patch cords that interconnect the Add-Drop and Transmitter-Receiver boards optically. In slots 6 through 8, the Optical backplane is not used by the Transmitter-Receiver boards. FIG. 53 shows another example configuration of a (hybrid) Super chassis with Cross Connect, Add-Drop, and Transmitter-Receiver boards. In slot 8, the Optical backplane is not used by the Transmitter-Receiver board. An example configuration of an Electrical chassis with Transmitter-Receiver and Optical-2R boards is shown in FIG. 54. FIG. 55 shows how the (hybrid) Super and Electrical chassis might be connected with multi-fiber distribution patch cords, which interconnect optically the Add-Drop boards with the Transmitter-Receiver or Optical-2R boards. The Electrical chassis provides expansion for more Transmitter-Receiver or Optical-2R boards. The Optical-2R board could have been placed in the (hybrid) Super chassis.

Figure 56:
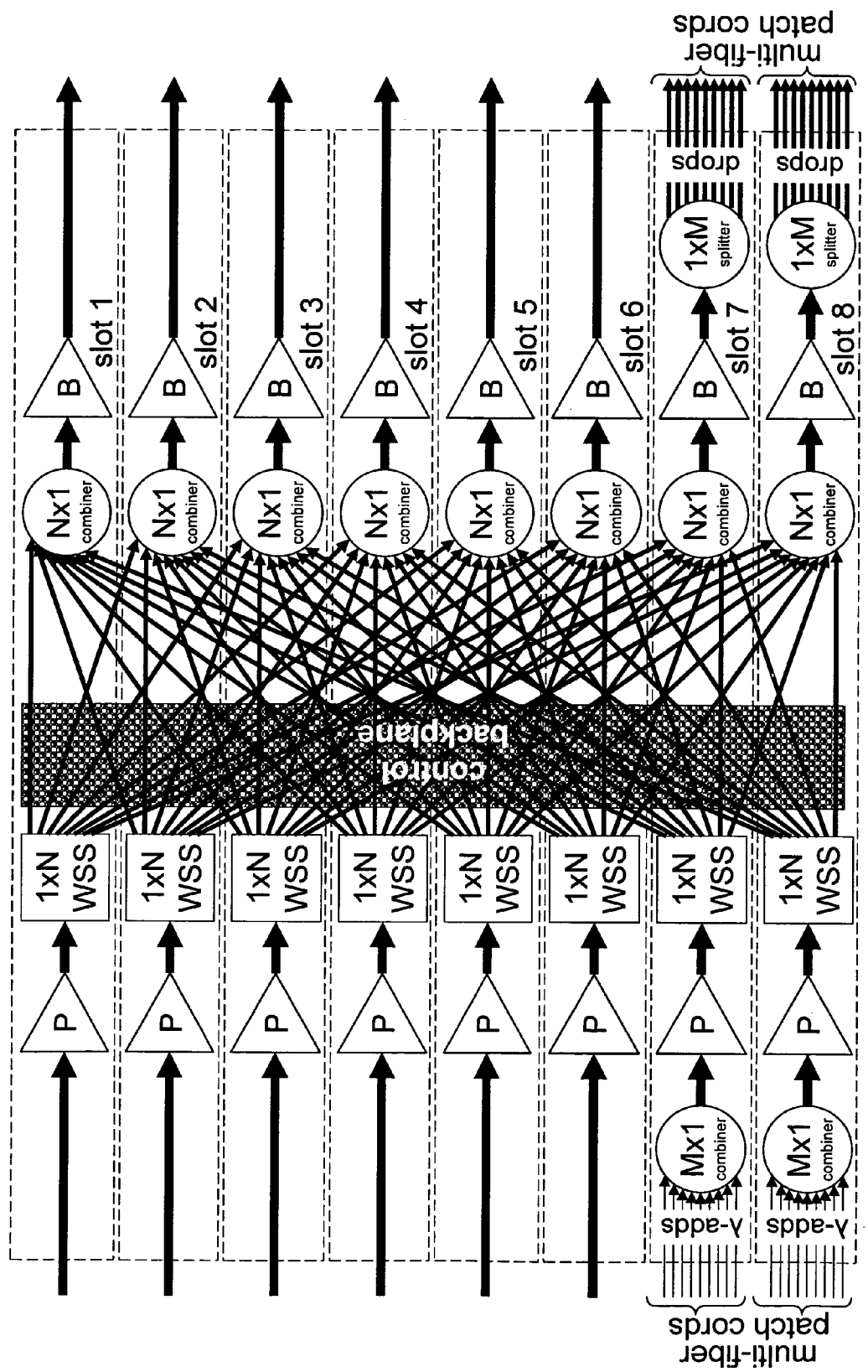
FIGS. 56-57 show a WSS system using an Optical and Electrical chassis according to certain embodiments of the invention.
Figure 57:
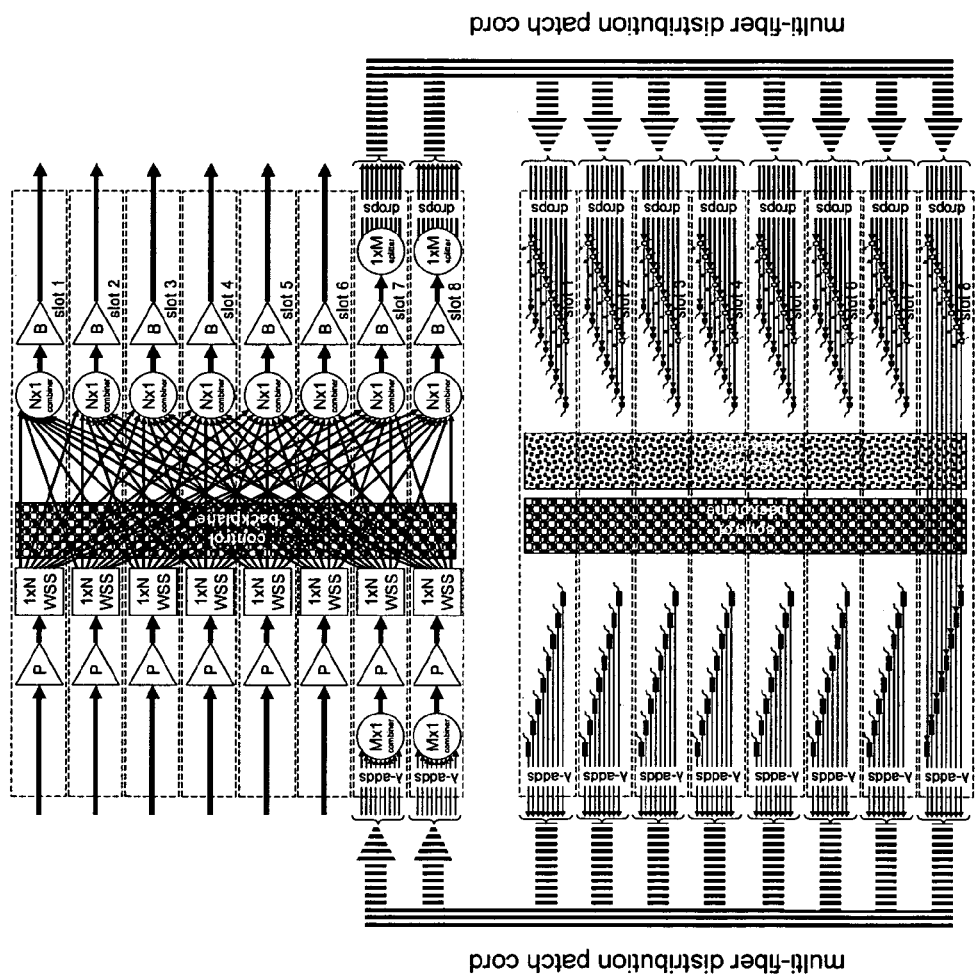

Shown in FIG. 56 is an example configuration of an Optical chassis according to one embodiment. FIG. 57 shows how this Optical chassis of FIG. 56 and the Electrical chassis of FIG. 54 may be interconnected using multi-fiber distribution patch cords between the Add-Drop boards and the Transmitter-Receiver or Optical-2R boards according to certain embodiments of the invention. Additional Electrical chassis would provide expansion for more Transmitter-Receiver or Optical-2R boards.

The issue that the one or more separate Electrical chassis deals with is the potential disparity between the numbers of required Transmitter-Receiver boards for every Add-Drop board. There may need to be far more Transmitter-Receiver boards per Add-Drop board. The number of transmitter and receiver pairs on a given Transmitter-Receiver board may be sparse, and much less than the integer M of adds/drops. Note that it is desired for M to be large and up to the total number of dense-wavelength-division-multiplexed (DWDM) channels per fiber-optic link, such as possibly 40 channels when at 100 GHz spacing or 80 channels when at 50 GHz spacing as discussed earlier.

Junior Chassis Embodiments

The presentation of the chassis possessing 8 slots has been completely arbitrary. The number of slots could have been larger, but is limited in practice by the numerical value of the integer N in the 1×N and N×1 WSS devices. Although, additional slots might also be present for other boards not described here. Also, for the (hybrid) super chassis, there could be more slots, but compatible only with Transmitter-Receiver and Optical-2R boards.

Figure 58:
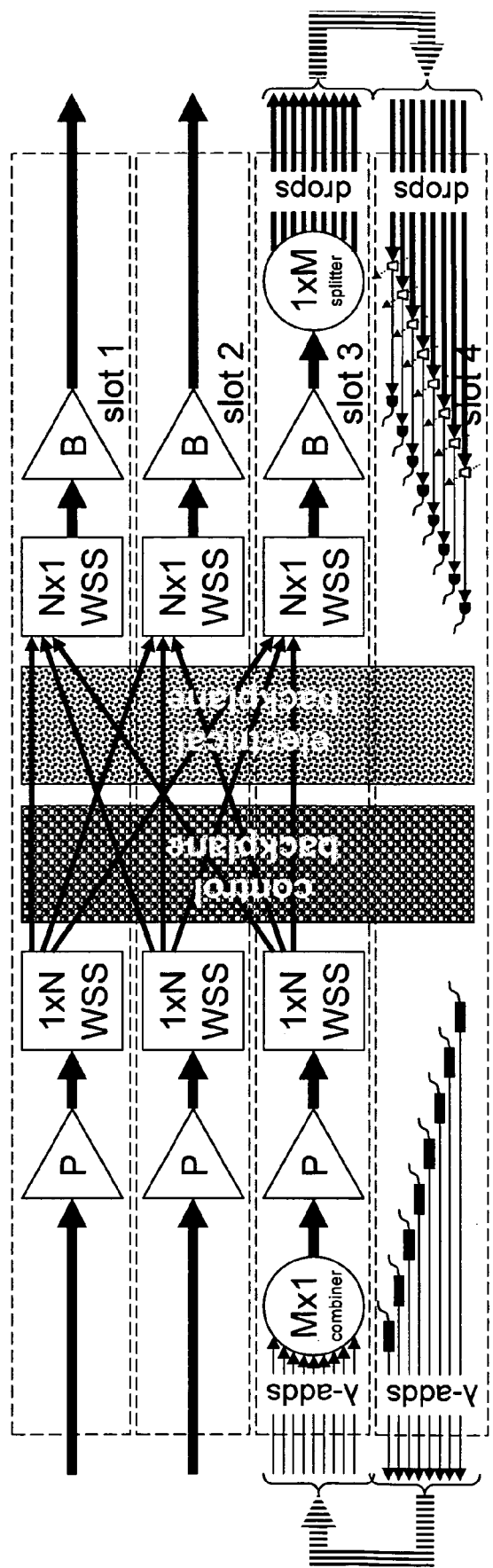
FIGS. 58-61 shows a Junior-chassis WSS system based on a scaled-down Super chassis according to certain embodiments of the invention.
Figure 59:
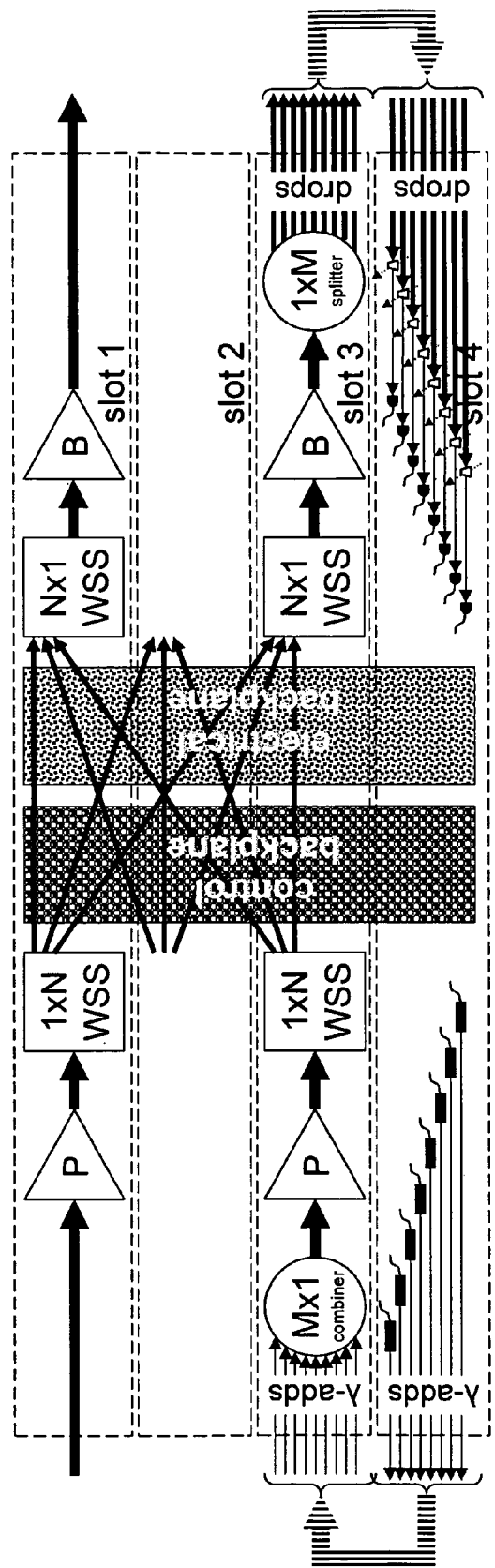
Figure 60:
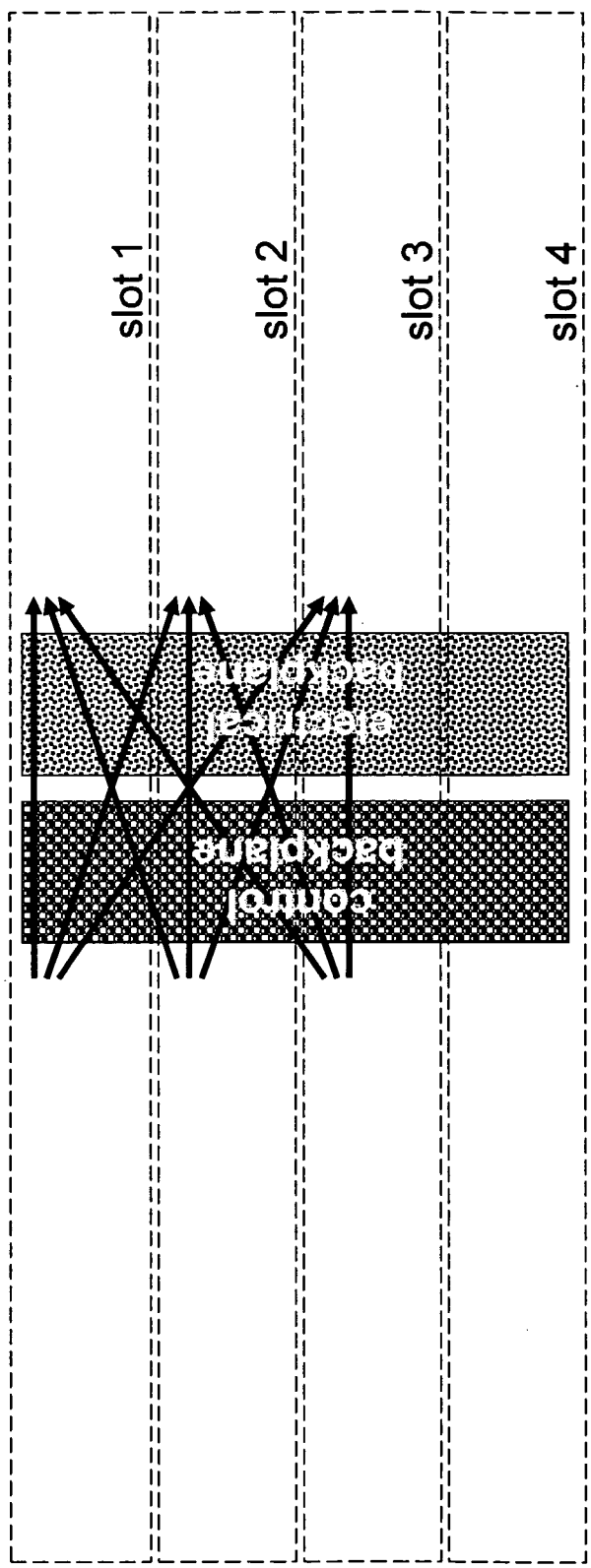
Figure 61:
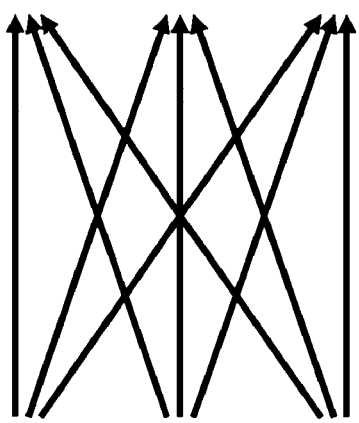

A particularly interesting case is actually at the low number of slots per chassis, a junior chassis according to certain embodiments of the invention. Shown in FIG. 58 is a node configuration based on such a junior chassis that provides for at most an East-West ROADM capability. It could also be configured to degree 1, a terminating node, as depicted in FIG. 59 according to one embodiment. FIG. 60 shows the down-sized control, electrical, and Optical backplanes of the junior chassis according to one embodiment. The junior chassis is a hybrid chassis like the Super chassis, so is capable of accepting all types of boards, just less in number. Note that in this case a much simpler 3×3 optical shuffle is required for the Optical backplane as depicted in FIG. 61 according to one embodiment. This implementation of a ROADM-like architecture exceeds the capabilities of a conventional ROADM because the transponders are not network-port assigned, which is an example of one of the inventions of this patent.

Dedicated Chassis for Signal Manipulation

The earlier embodiments for transmitting and receiving add and drop signals, respectively, use a colorless approach with port transparency. However, this approach also uses a single-wavelength channel for each fiber-optic patch cord. Even in the cases where multiple drop signals possibly occur on a given optical fiber, only one of these signals is received after being selected by the tunable filter placed somewhere before the photodetector of the receiver that the fiber is connected. Wavelength selective switches provide the capability that multiplexed add and drop signals be carried by a single optical fiber patch cord between chassis, and the individual signals do not have to be distributed down to a group of individual optical fibers for connection with transmitters and receivers, where port transparency is maintained. Both approaches have their advantages, though. The earlier approach is more flexible with growth of the number of adds and drops, while the later approach fits applications where one or more groups of add and drop channels are needed. Both approaches can be used together at a given node.

Chassis Configuration

The following three figures give various embodiments of configurations of a (hybrid) Super chassis as a dedicated colorless Add-Drop chassis. They use alternatively three different possible specialized boards to make this add-drop system possible. We call these specialized boards Distribution-Aggregation boards. The first two configurations also use specialized Single-Channel Transmitter-Receiver boards and specialized Single-Channel Optical-2R boards. The third configuration uses specialized Multi-Channel Transmitter-Receiver boards and specialized Multi-Channel Optical-2R boards.

Figure 62:
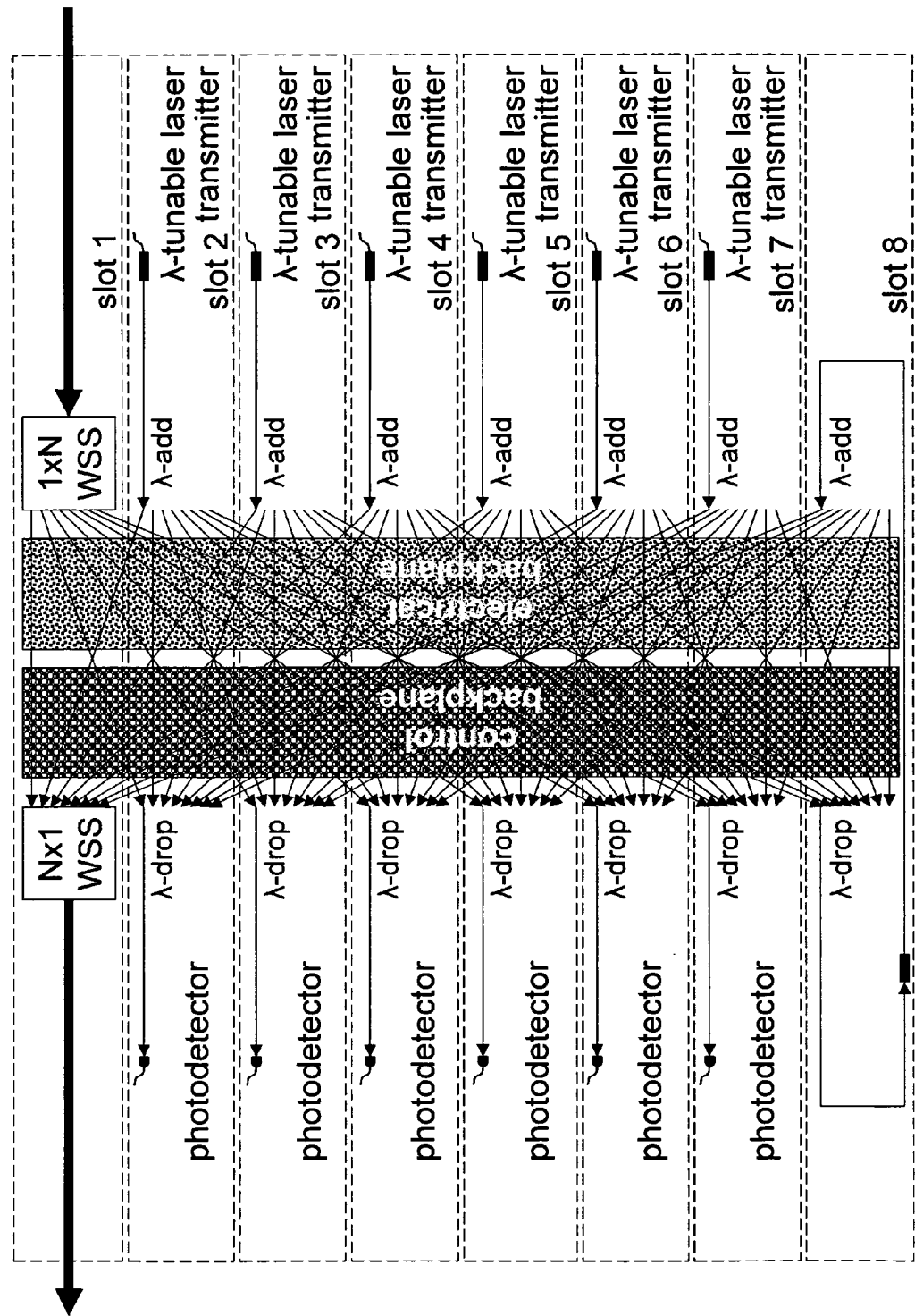
FIGS. 62-66 show Super chassis used to form an Add-Drop chassis for WSS systems according to certain embodiments of the invention.
Figure 63:
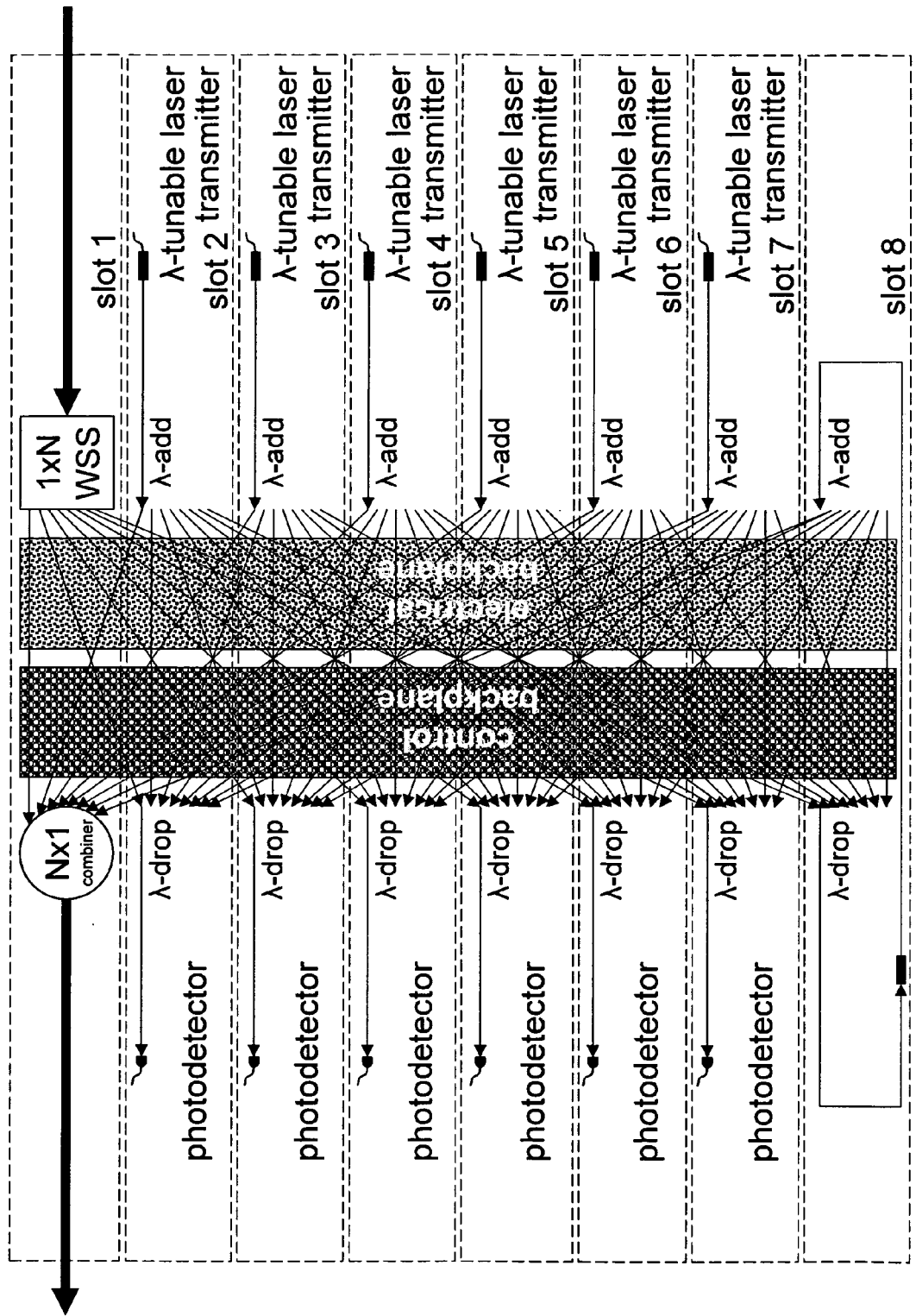

FIG. 62 shows chassis configured with a Distribution-Aggregation board based upon an N×1 and a 1×N WSS to provide a dedicated Add-Drop chassis, according to one embodiment which uses Single-Channel Transmitter-Receiver boards and Single-Channel Optical-2R boards. FIG. 63 shows a chassis configured with a Distribution-Aggregation board based upon an N×1 combiner and a 1×N WSS to provide a dedicated Add-Drop chassis, according to one embodiment which uses Single-Channel Transmitter-Receiver boards and Single-Channel Optical-2R boards. In these two cases, the 1×N WSS on the Distribution-Aggregation board does the drop channel selection for each Single-Channel Transmitter-Receiver board or each Single-Channel Optical-2R board. Note that in all cases where a WSS module is responsible for working with a single wavelength for each of the N fibers, a different technology could be employed.

Figure 64:
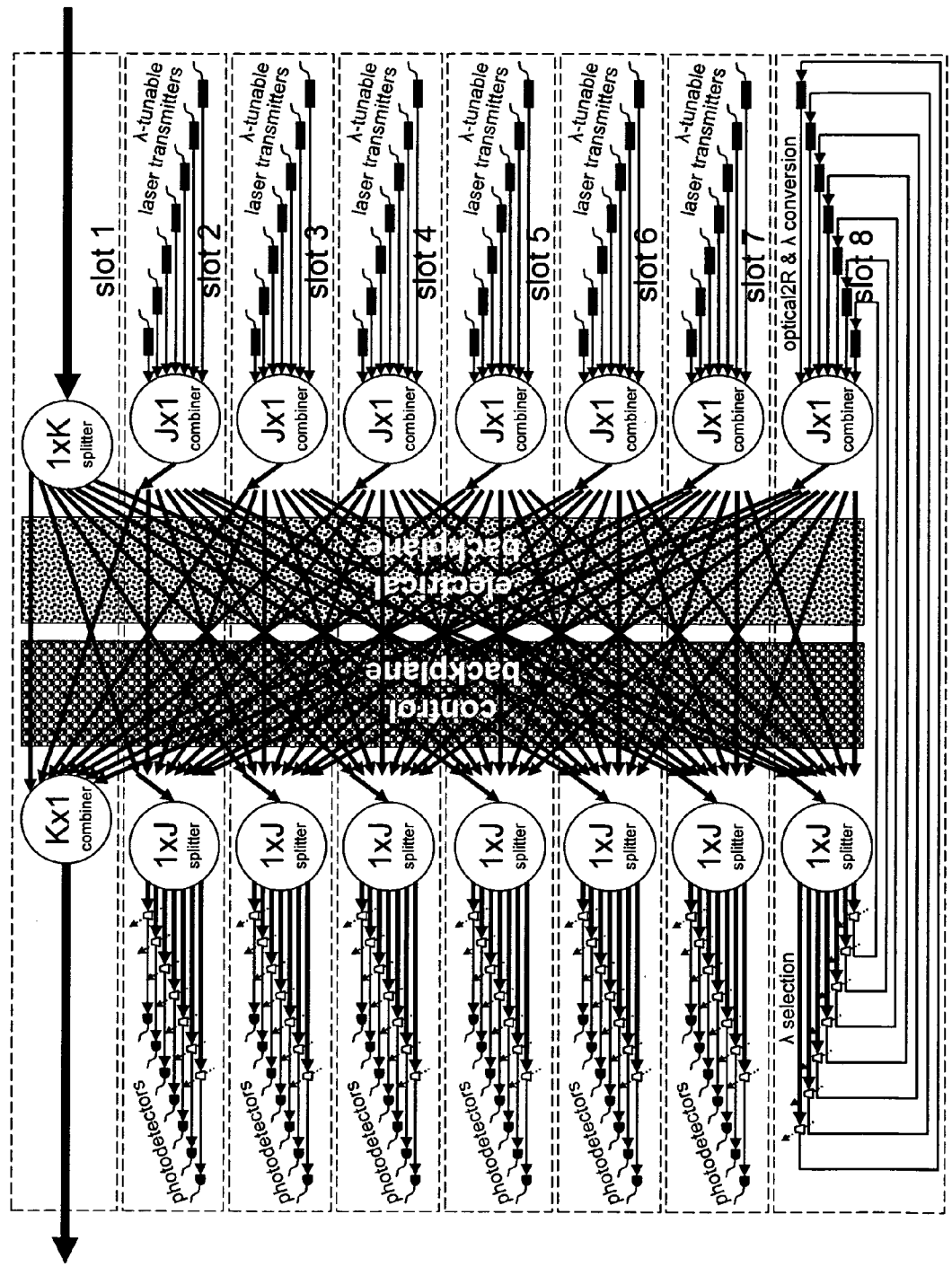
Figure 65:
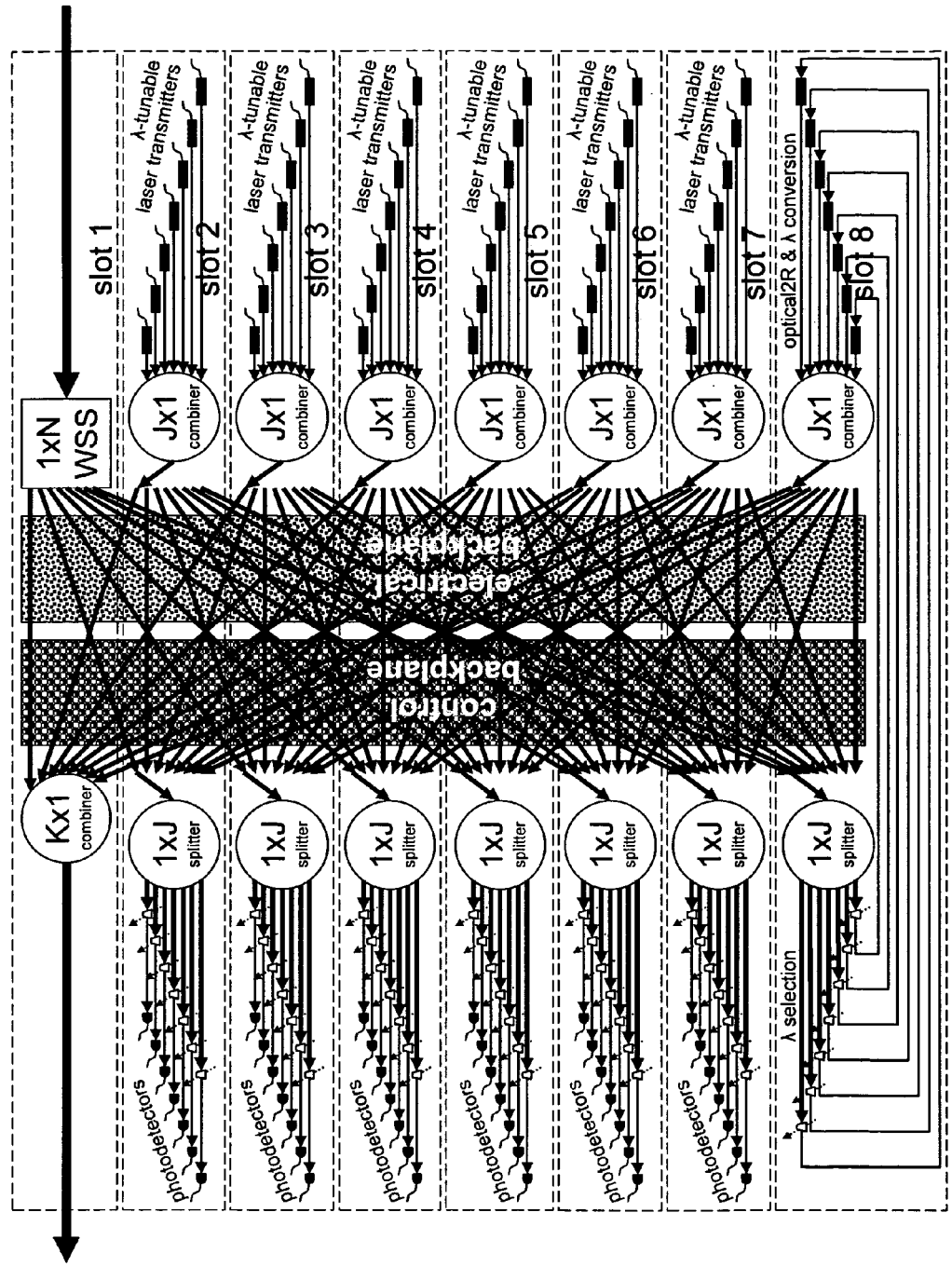
Figure 66:
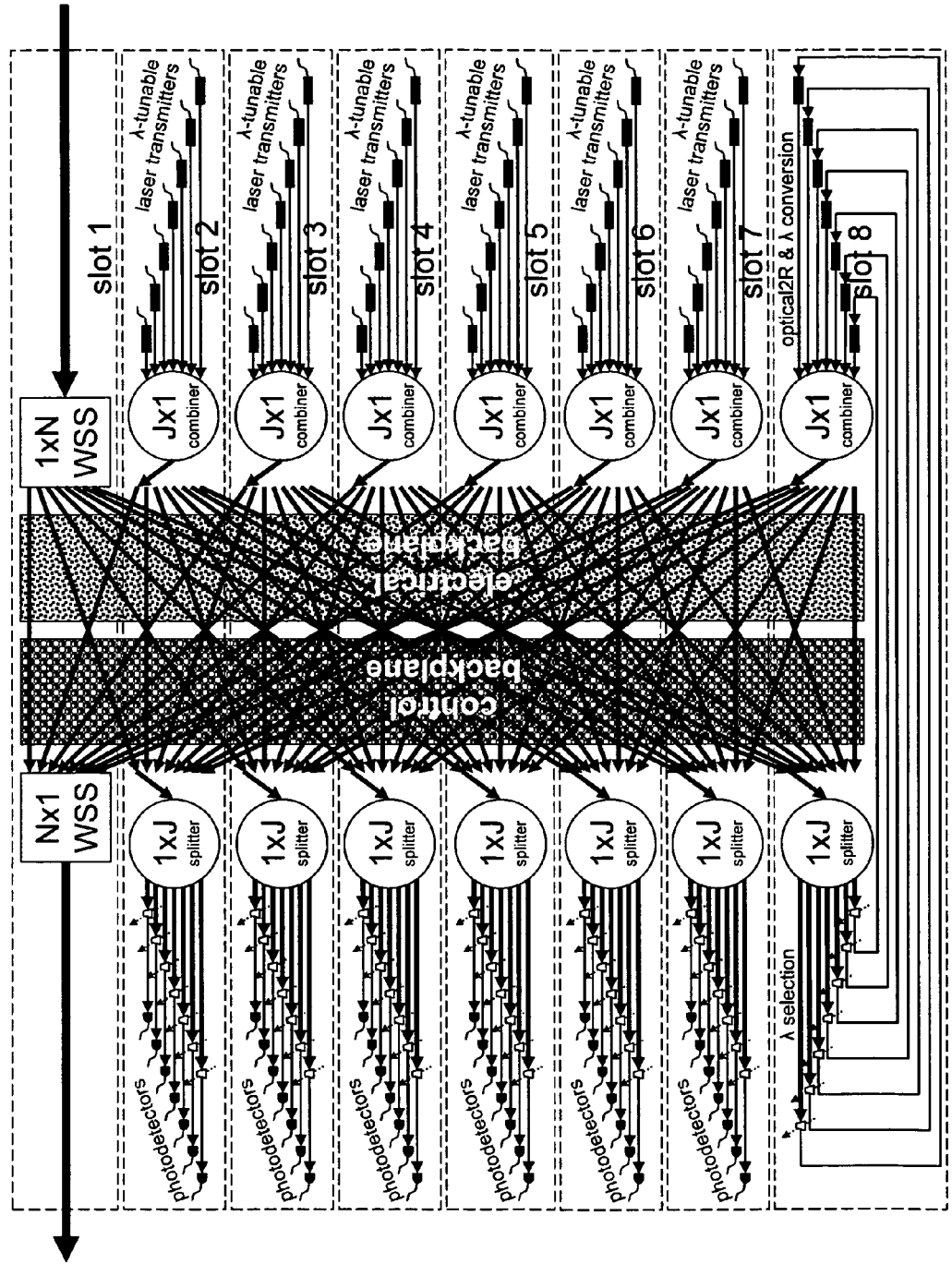

FIG. 64 shows a chassis configured with a Distribution-Aggregation board based upon a K×1 combiner and a 1×K splitter to provide a dedicated Add-Drop chassis, according to one embodiment which uses Multi-Channel Transmitter-Receiver boards and Multi-Channel Optical-2R boards. In this case, the channel selection is made by the optical filter that occurs just before each receiver. The integer value of K corresponds to the number of slots available for the signal manipulation boards, and J is limited by the maximum number of transmitters and receivers or optical-2R devices located on a single board. FIG. 65 and FIG. 66 show two other various embodiments of implementations. FIG. 65 shows a chassis configured with a Distribution-Aggregation board based upon a K×1 combiner and a 1×N WSS to provide a dedicated Add-Drop chassis, according to one embodiment which uses Multi-Channel Transmitter-Receiver boards and Multi-Channel Optical-2R boards. FIG. 66 shows a chassis configured with a Distribution-Aggregation board based upon an N×1 WSS and a 1×N WSS to provide a dedicated Add-Drop chassis, according to one embodiment which uses Multi-Channel Transmitter-Receiver boards and Multi-Channel Optical-2R boards.

The Optical backplane of the chassis routes the signals to the various Single-Channel or Multi-Channel Transmitter-Receiver boards. All of these specialized transmitter-receiver and optical-2R boards require the Distribution-Aggregation board be placed in a specific slot, which is slot 1 in the depicted embodiments.

Node Configuration

Figure 67:
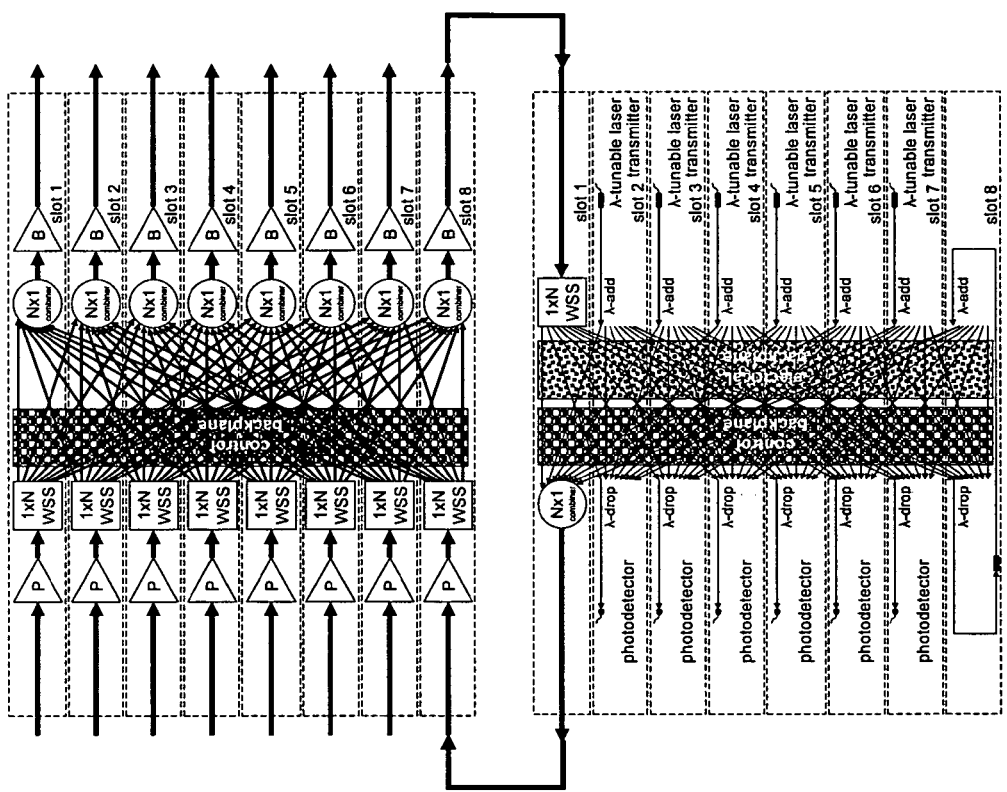
FIGS. 67-68 show WSS systems with an OXC-configured Optical chassis and a configured Add-Drop chassis according to certain embodiments of the invention.

The node configuration is simpler owing to the need for only two optical fibers between the dedicated Add-Drop chassis and any chassis (e.g., Super or Optical) containing Cross-Connect boards. Shown in FIG. 67 is one example configuration of an Optical chassis and an Add-Drop chassis, according to one embodiment with a single patch cord delivering multiplexed add signals to the input (ingress) of the Cross-Connect board of the Optical chassis from the output of the Distribution-Aggregation board of the Add-Drop chassis, and a single patch cord delivering multiplexed drop signals to the input of Distribution-Aggregation board of the Add-Drop chassis from the output (egress) of the Cross-Connect board of the Optical chassis.

Figure 68:
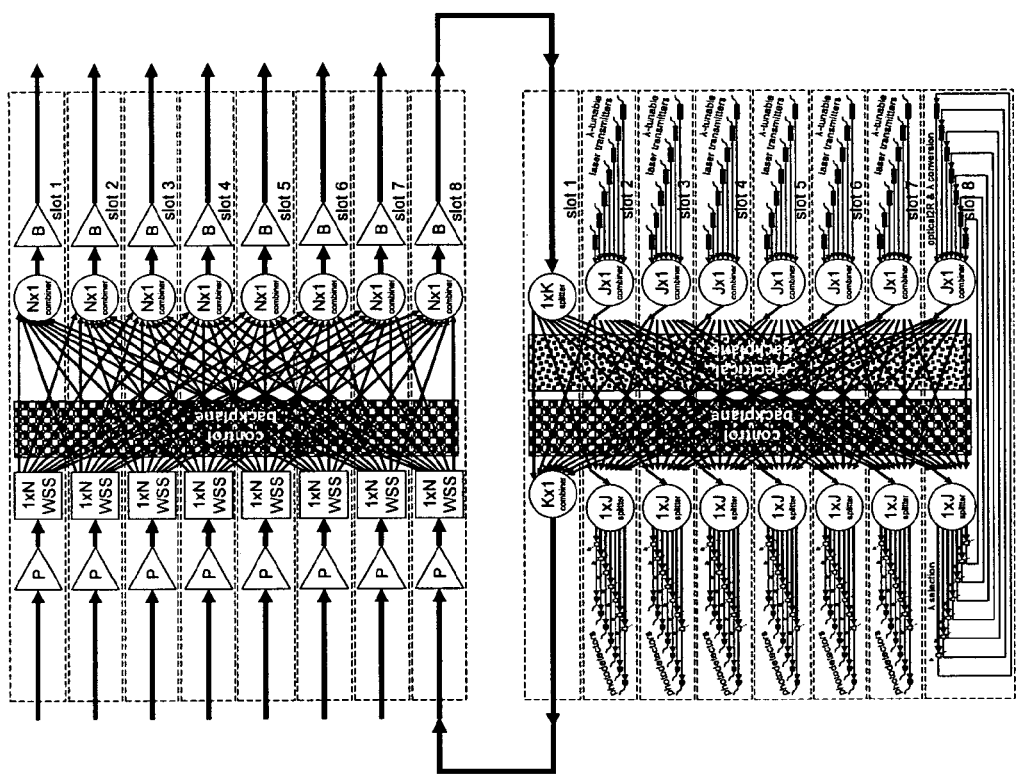

FIG. 68 shows another example configuration of an Optical chassis and an Add-Drop chassis, according to one embodiment with a single patch cord delivering multiplexed add signals to the input (ingress) of the Cross-Connect board of the Optical chassis from the output of the Distribution-Aggregation board of the Add-Drop chassis, and a single patch cord delivering multiplexed drop signals to the input of Distribution-Aggregation board of the Add-Drop chassis from the output (egress) of the Cross-Connect board of the Optical chassis.

Summary of Specialized Boards

Figure 69:
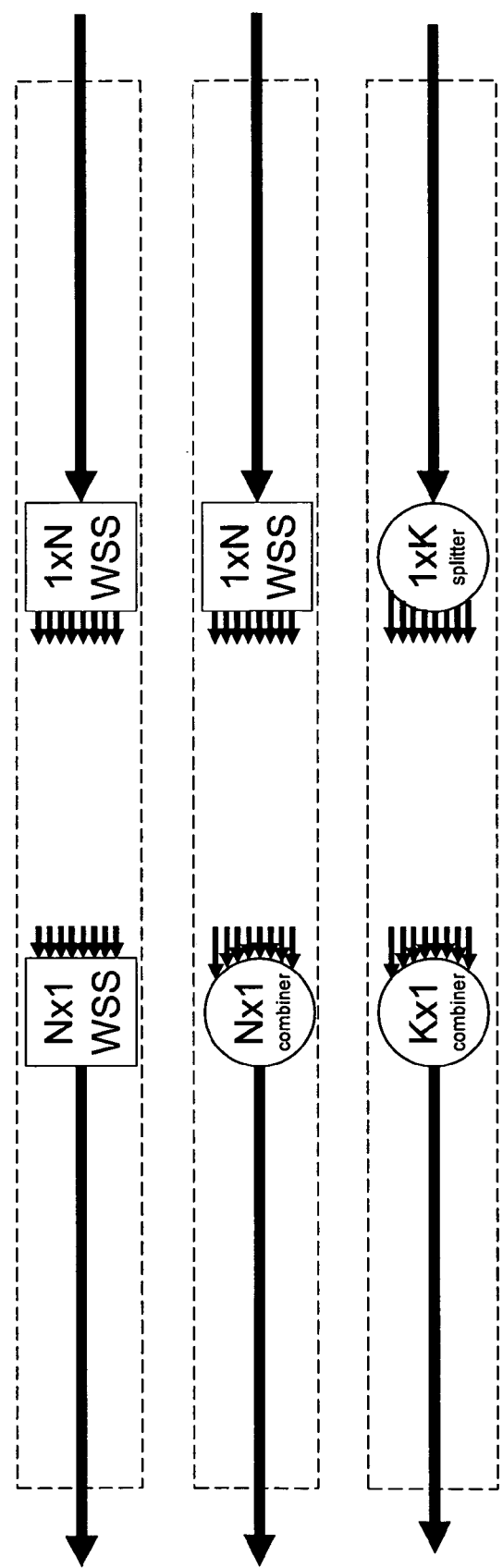
FIG. 69 shows a summary of WSS-based Distribution-Aggregation boards for use with an Add-Drop chassis according to certain embodiments of the invention.
Figure 70:
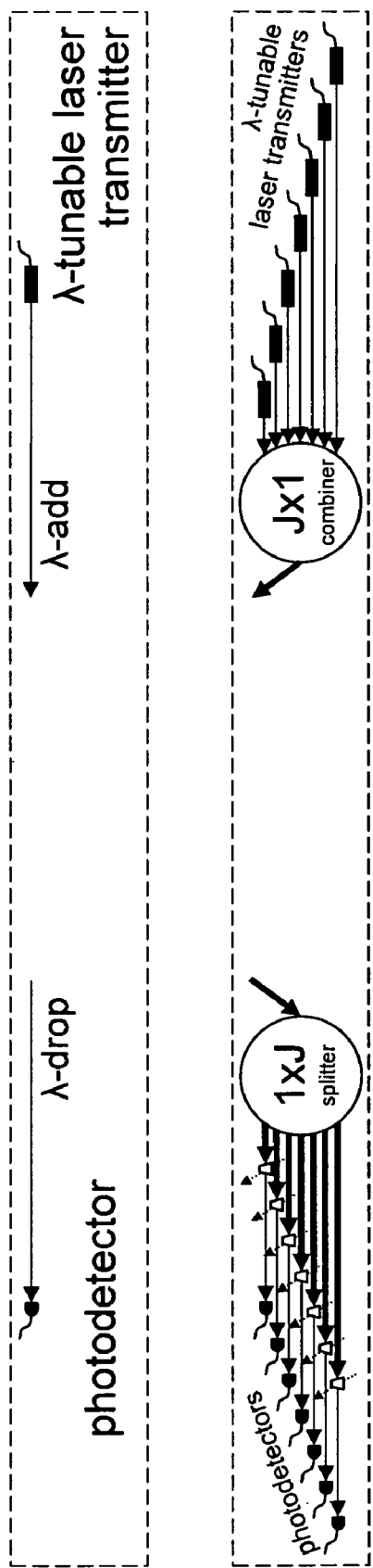
FIG. 70 shows Single-Channel and Multi-Channel Transmitter-Receiver boards that are compatible with the Add-Drop chassis according to certain embodiments of the invention.
Figure 71:
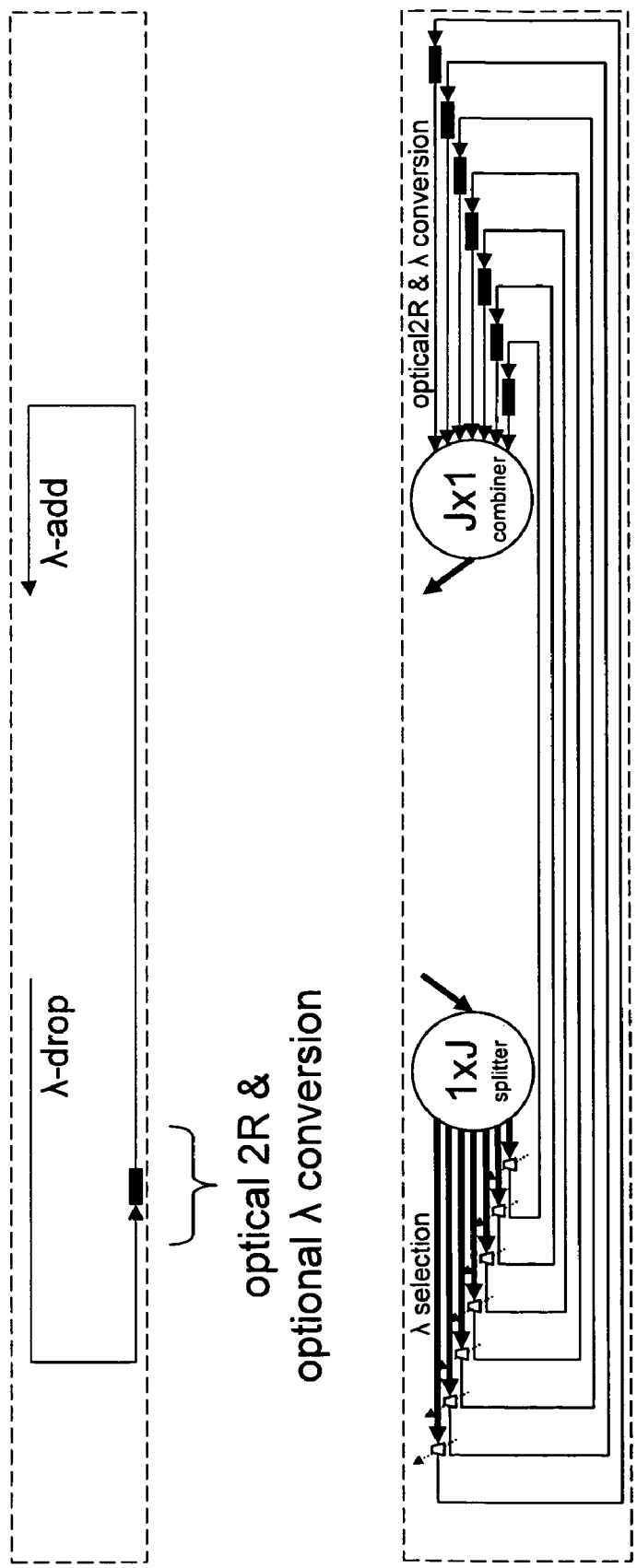
FIG. 71 shows Single-Channel and Multi-Channel Optical-2R boards that are compatible with the Add-Drop chassis according to certain embodiments of the invention.

FIG. 69 gives a summary of Distribution-Aggregation boards according to certain embodiments of the invention. FIG. 70 gives a summary of Single-Channel and Multi-Channel Transmitter-Receiver boards according to certain embodiments of the invention. FIG. 71 gives a summary of Single-Channel and Multi-Channel Optical-2R boards according to certain embodiments of the invention.

Expanded East-West ROADM Embodiments

An east-west ROADM is a potentially often needed type of configuration. As shown earlier in FIG. 24, FIG. 52 (but with only two Cross-Connect boards), and FIG. 58, the chassis with two Cross-Connect boards form the east and west connections of an east-west ROADM. For this particular application, other specialized transmitter-receiver and optical-2R boards are possible to make an Expanded East-West ROADM when using a (hybrid) Super chassis, where these boards are colorless and port transparent. These boards also provide the additional feature that no fiber-optic patch cords for add or drop signals are required as in other configurations. All add and drop signals are routed through the Optical backplane. Again, add and drop signals of a given transponder are not wavelength or network port (slot) assigned. In the two different cases of using Cross-Connect boards below, where WSS modules are employed, a simplified technology for the WSS module could be used since each of the N fibers will contain only a single wavelength.

Based on 1×N & N×1 WSS Cross-Connect Boards

Figure 72:
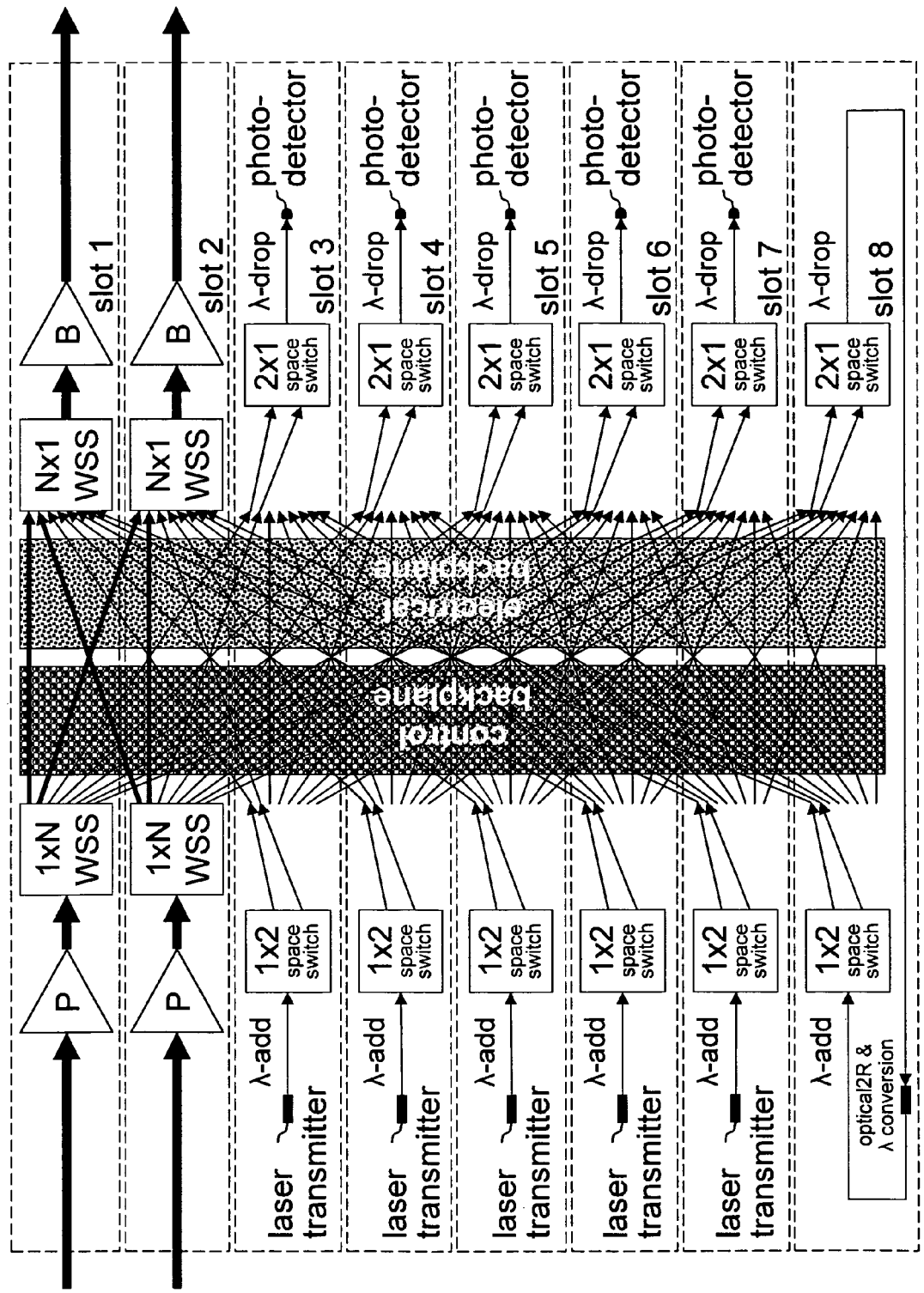
FIGS. 72-77 show an Expanded East-West ROADM according to certain embodiments of the invention.
Figure 73:
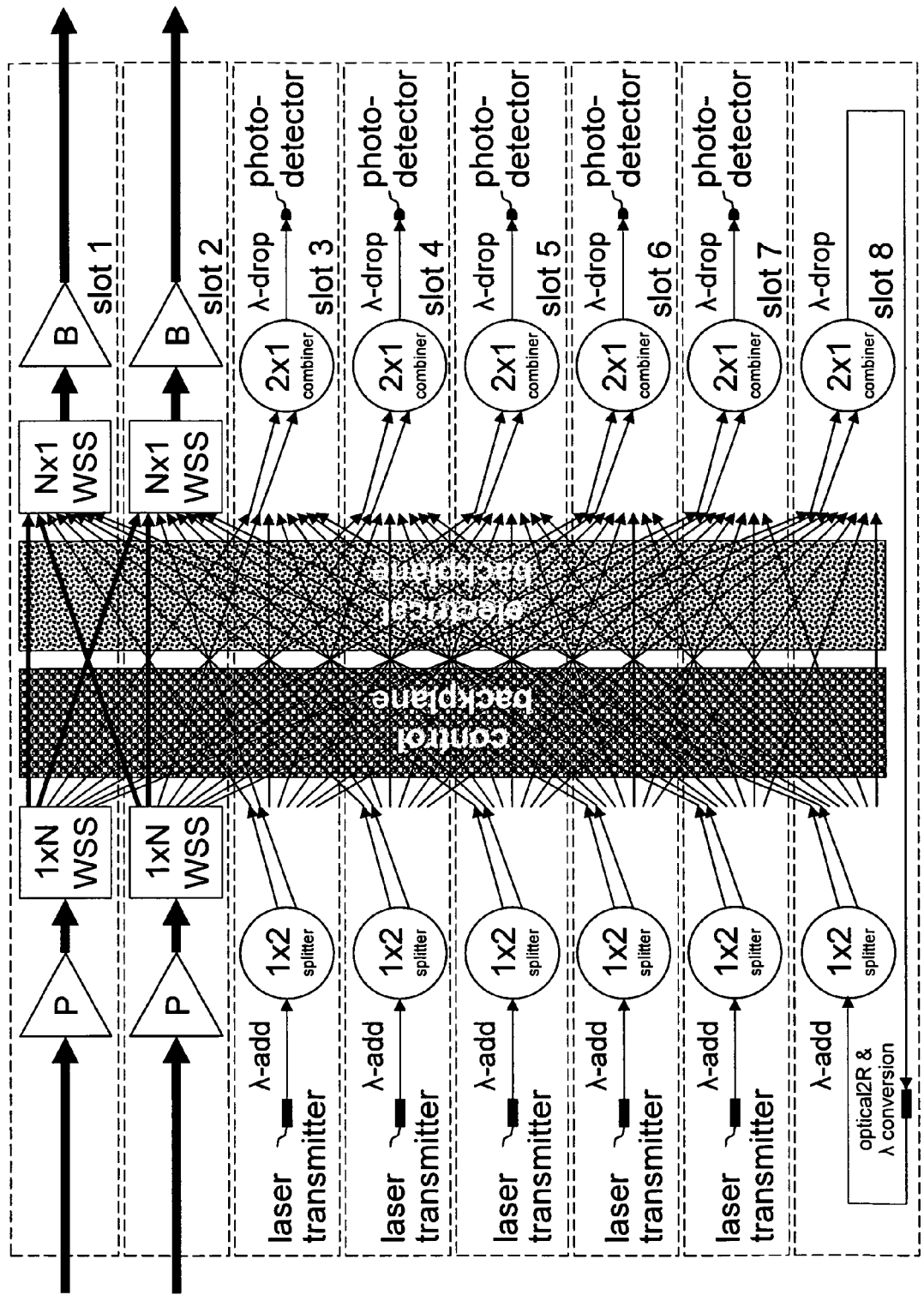
Figure 74:
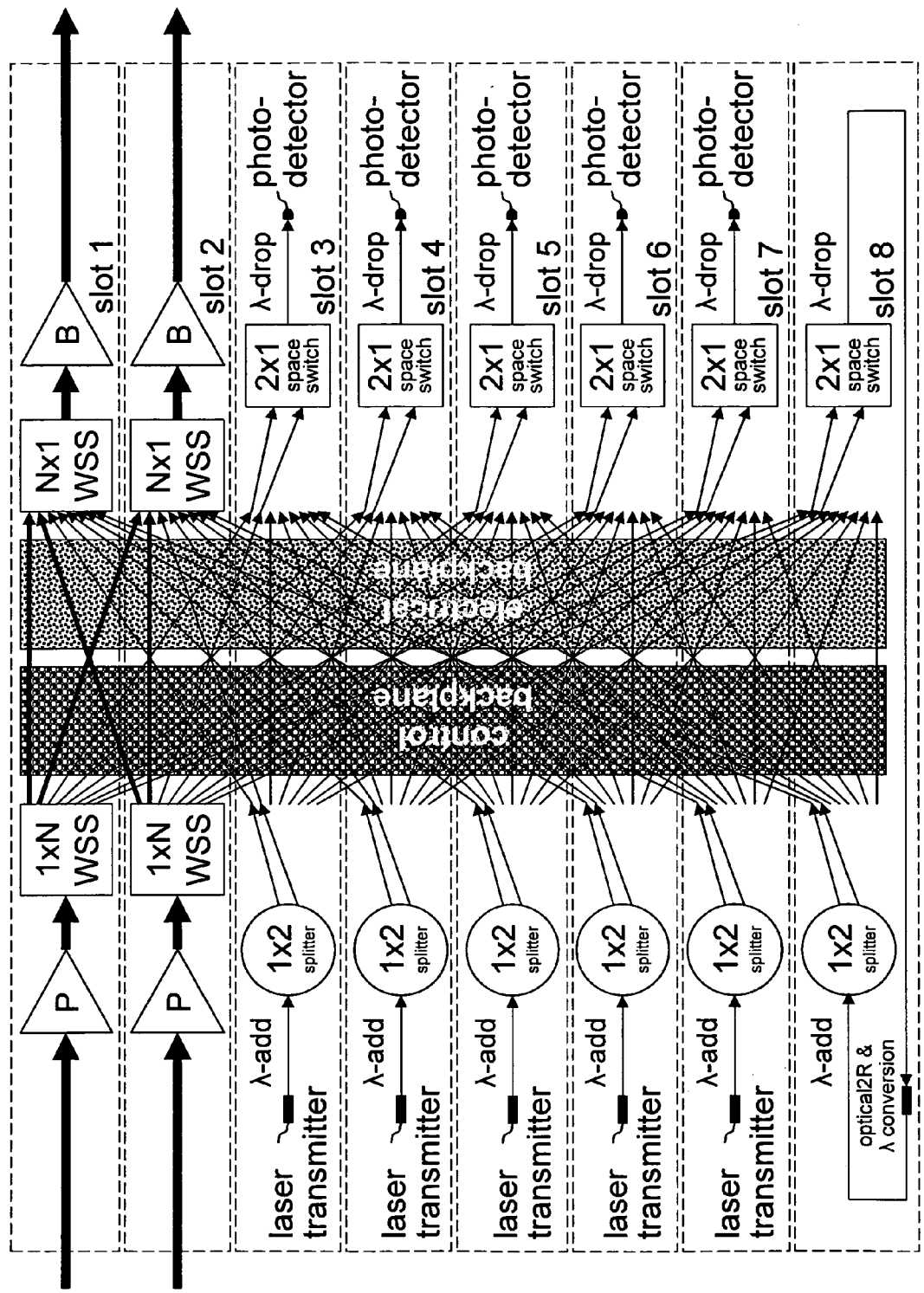
Figure 75:
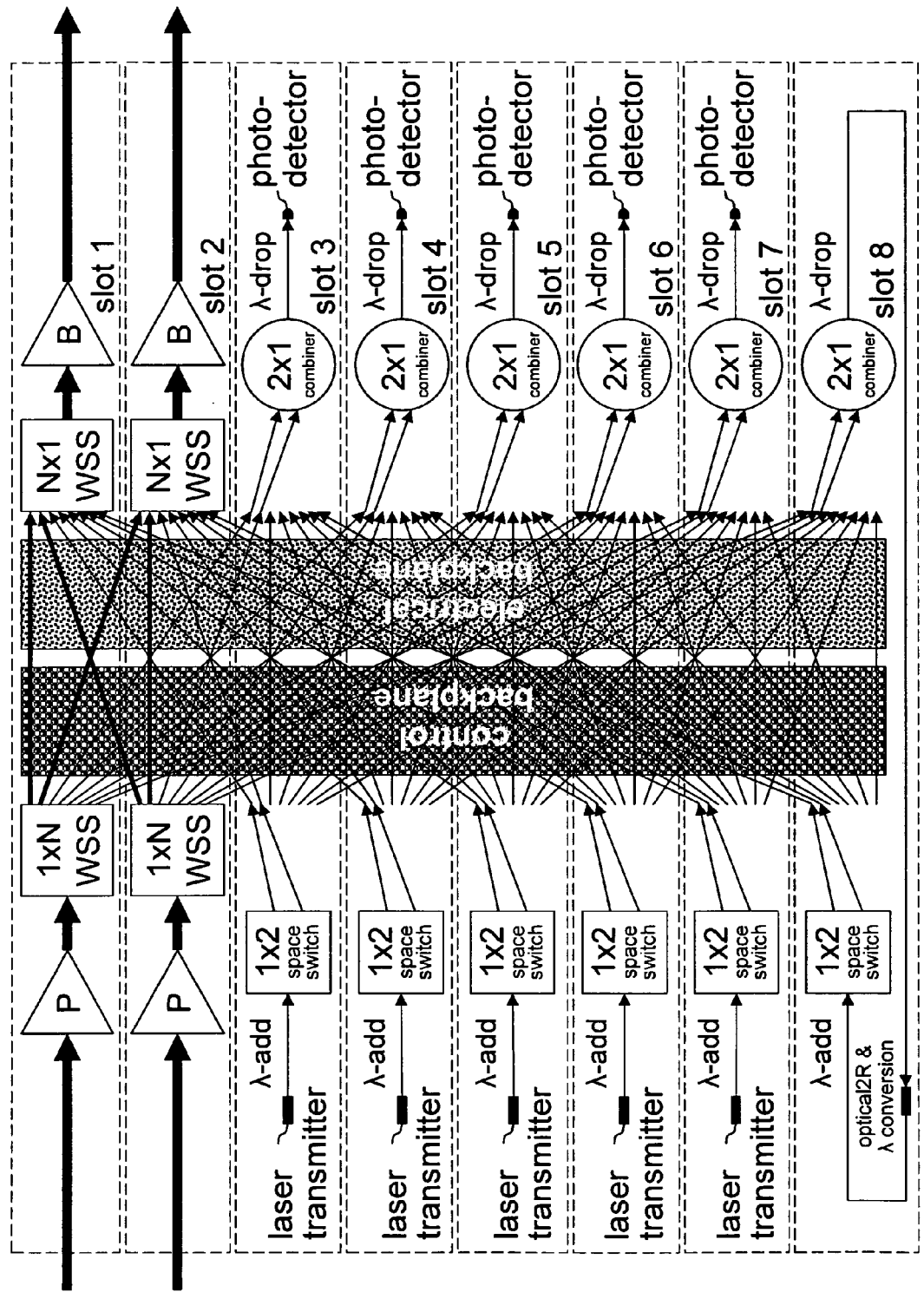

When, in the Expanded East-West ROADM, the Cross-Connect boards used are based upon 1×N and N×1 WSSs, then there are four possible transmitter-receiver type boards and four possible optical-2R type boards according to certain embodiments. We call these specialized boards East-West Transmitter-Receiver boards and East-West Optical-2R boards. We show in a series of four figures these specialized boards and how they form an Expanded East-West ROADM. FIG. 72 shows an Expanded East-West ROADM that has a 1×2 space switch to select the east or west egress for the add signal, and has a 2×1 space switch to accept the east or west ingress drop signal as delivered by the 1×N WSS according to one embodiment. FIG. 73 shows another example of an Expanded East-West ROADM that has a 1×2 splitter to broadcast the add signal where the N×1 WSS selects the east or west egress for the add signal, and has a 2×1 combiner to accept the east or west ingress drop signal as delivered by the 1×N WSS according to one embodiment. FIG. 74 shows another example of an Expanded East-West ROADM that has a 1×2 splitter to broadcast the add signal where the N×1 WSS selects the east or west egress for the add signal, and has a 2×1 space switch to accept the east or west ingress drop signal as delivered by the 1×N WSS according to one embodiment. FIG. 75 shows another example of an Expanded East-West ROADM that has a 1×2 space switch to select the east or west egress for the add signal, and has a 2×1 combiner to accept the east or west ingress drop signal as delivered by the 1×N WSS according to one embodiment.

Based on 1×N WSS & N×1 Combiner Cross-Connect Boards

Figure 76:
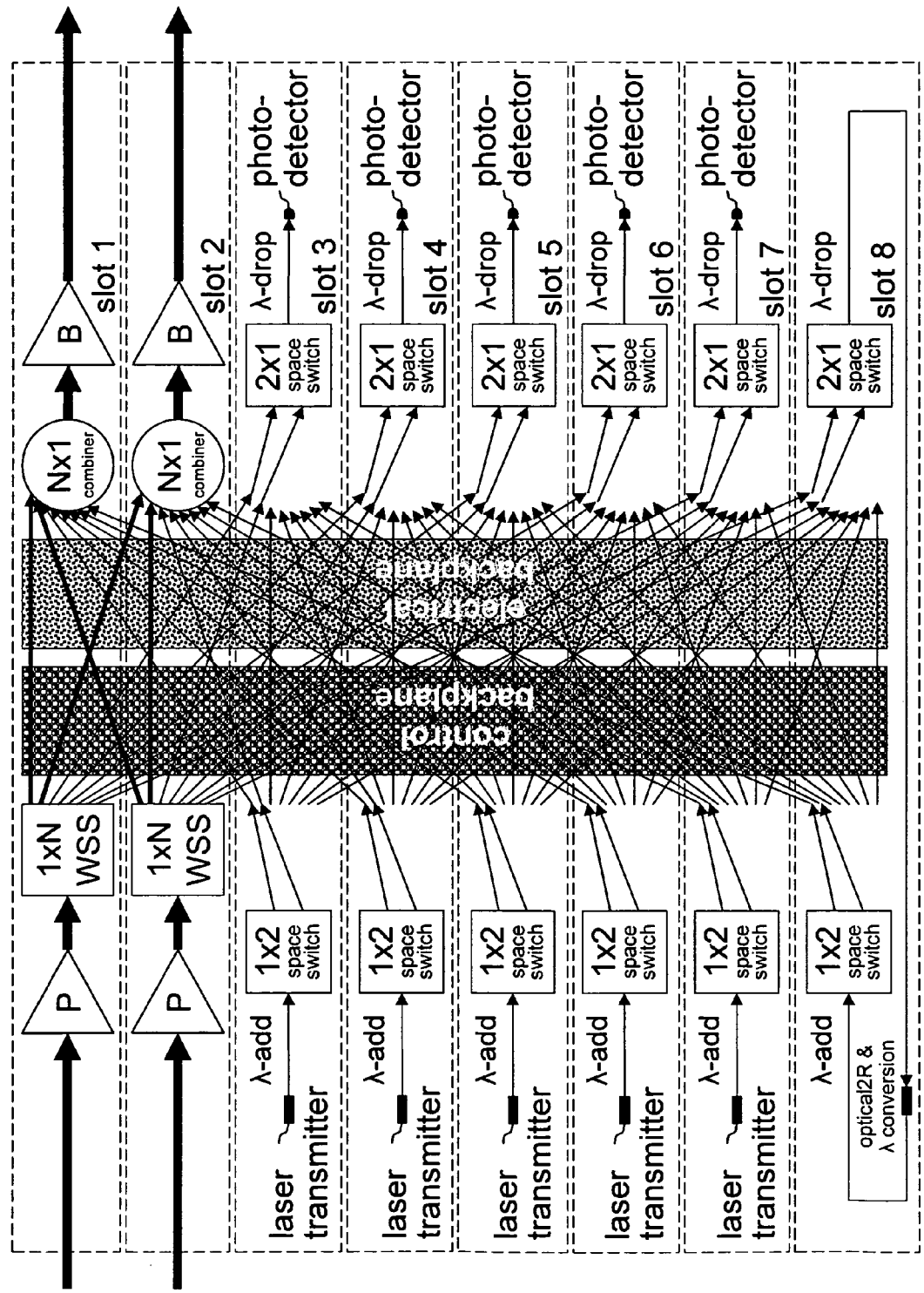
Figure 77:
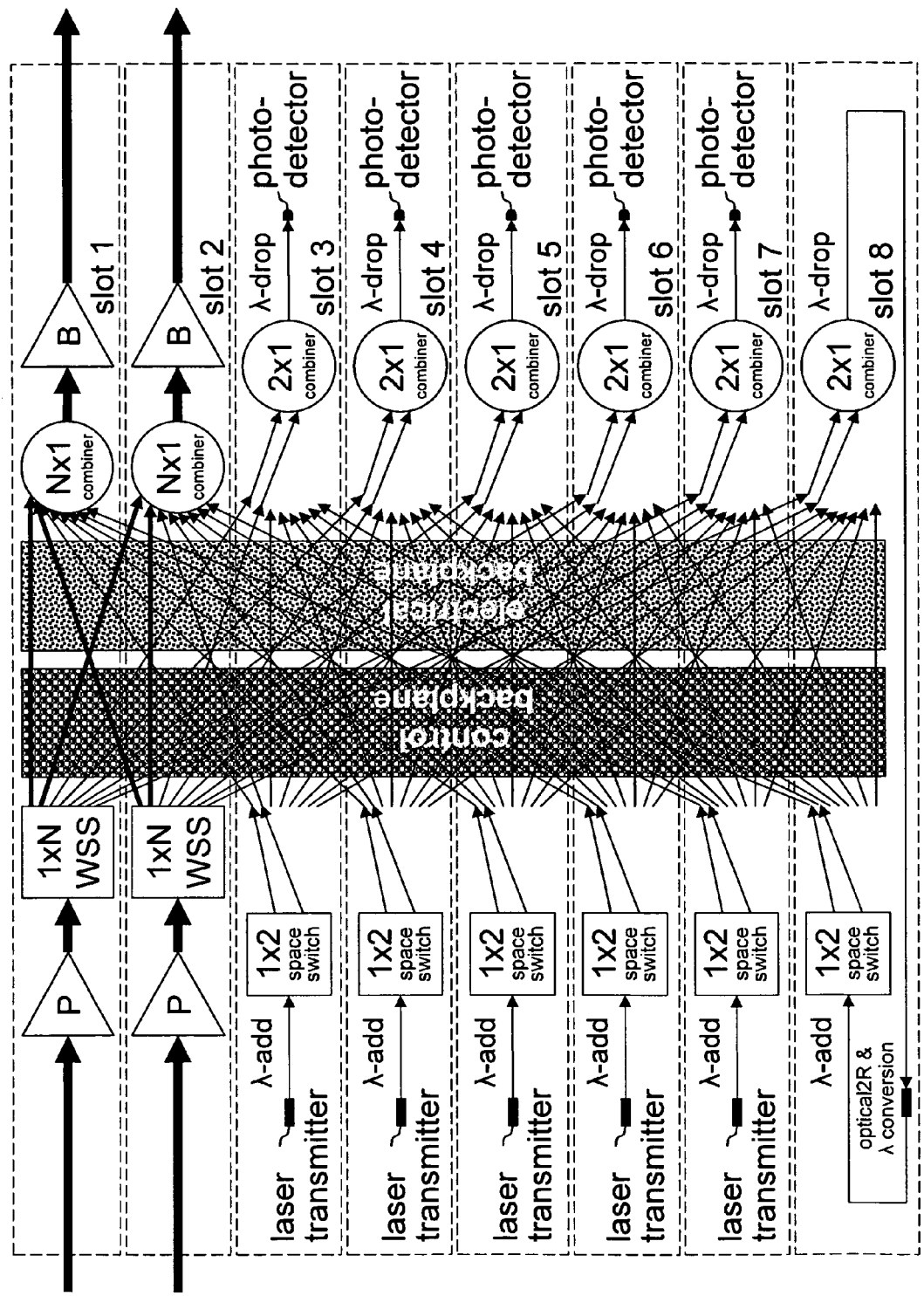

According to one embodiment, there may be another type of Cross-Connect board may also be used to make an Expanded East-West ROADM, which is a Cross-Connect board based on a 1×N WSS and an N×1 combiner. There are two compatible East-West Transmitter-Receiver boards and only two compatible East-West Optical-2R boards. We show these two cases of forming an Expanded East-West ROADM in FIG. 76 and FIG. 77 according to certain embodiments. FIG. 76 shows the case of an Expanded East-West ROADM that has a 1×2 space switch to select the east or west egress for the add signal, and has a 2×1 space switch to accept the east or west ingress drop signal as delivered by the 1×N WSS. FIG. 77 shows the case of an Expanded East-West ROADM that has a 1×2 space switch to select the east or west egress for the add signal, and has a 2×1 combiner to accept the east or west ingress drop signal as delivered by the 1×N WSS.

Figure 78:
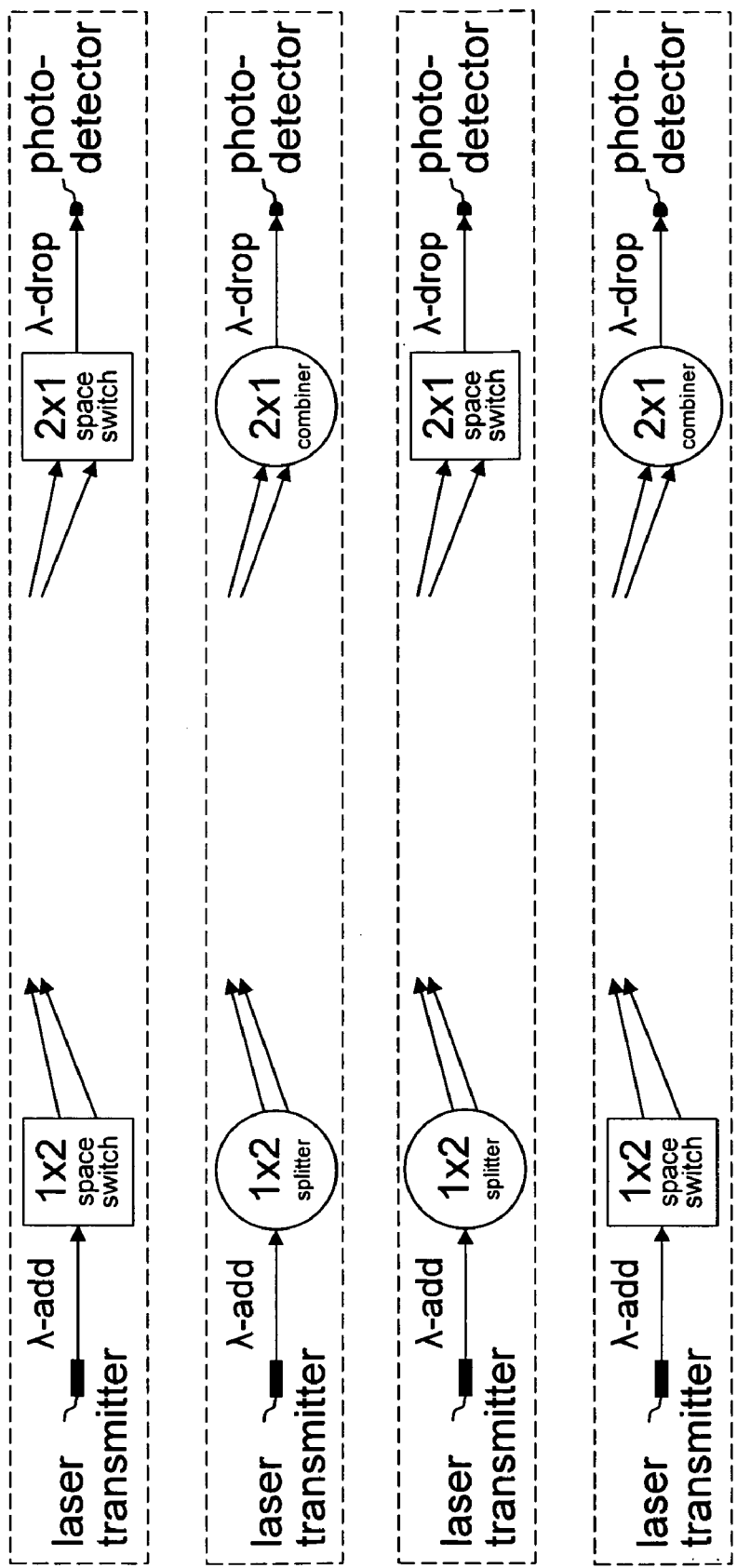
FIG. 78 shows a summary of East-West Transmitter-Receiver boards according to certain embodiments of the invention.
Figure 79:
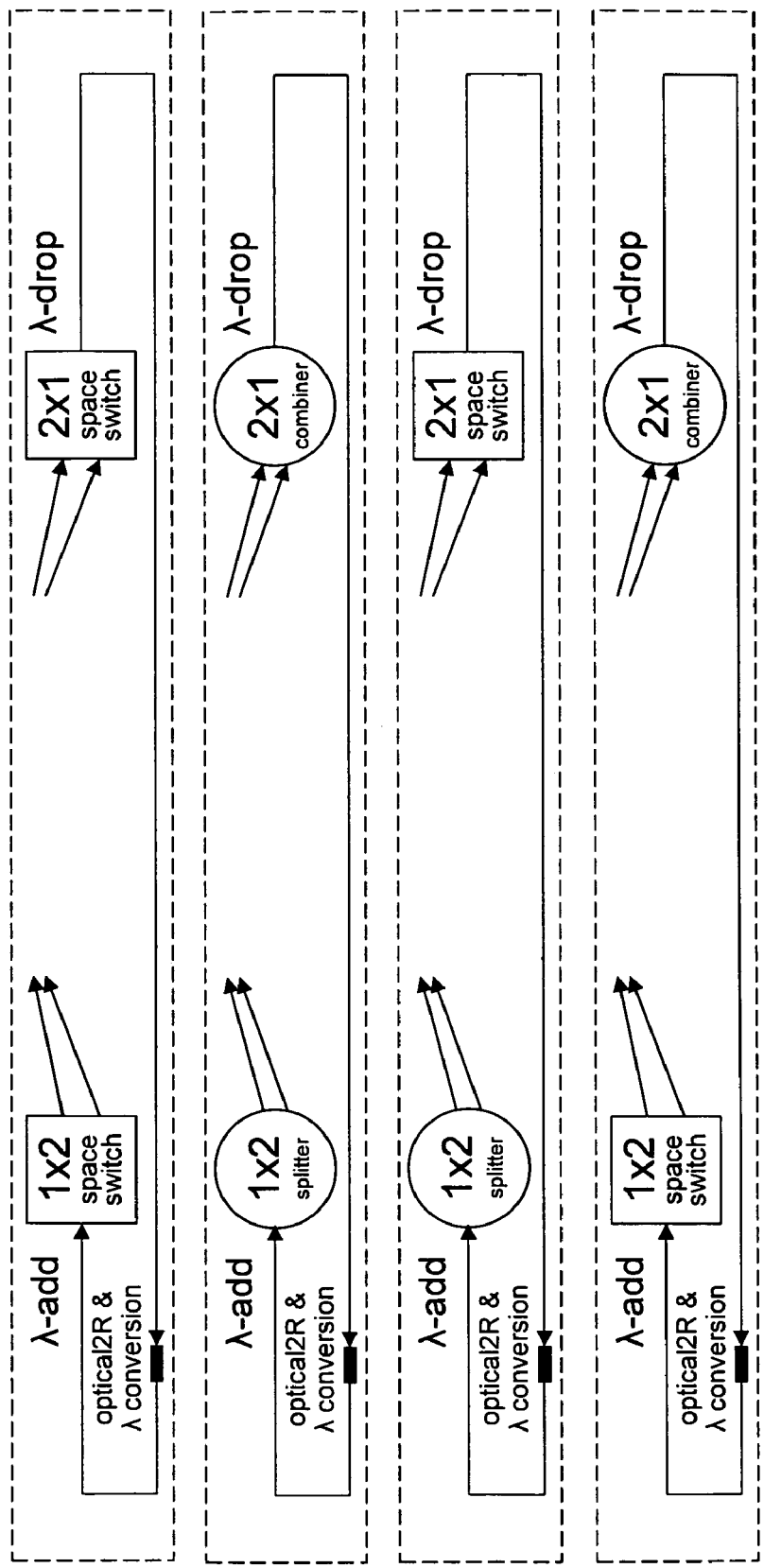
FIG. 79 shows a summary of East-West Optical-2R boards according to certain embodiments of the invention.

FIG. 78 gives a summary of the East-West Transmitter-Receiver boards and FIG. 79 gives a summary of the East-West Optical-2R boards according to certain embodiments. All of these specialized transmitter-receiver and optical-2R boards require the Cross-Connect boards be placed in specific slots, which are slots 1 and 2 in the depicted embodiments. Other configurations may exist.

Simplified Optical Backplane Fabrics

For the Add-Drop chassis and the Expanded East-West ROADM, the full Optical backplane shown in FIG. 22 is not entirely used. The opportunity exists to use a depopulated Optical backplane. The full backplane may consist of multiple fabric layers, where on the necessary ones are installed for the Add-Drop chassis and the Expanded East-West ROADM. Note in the depiction of Optical backplanes, the direction of the arrows does not imply a need for a change in the physical nature of the Optical backplane. The direction of the arrows only indicates the direction the channel-wavelength signals propagate when the Optical backplanes are used. Bold lines indicate the possibility of two or more multiplexed channel-wavelength signals.

For Use with the Add-Drop Chassis

Figure 80:
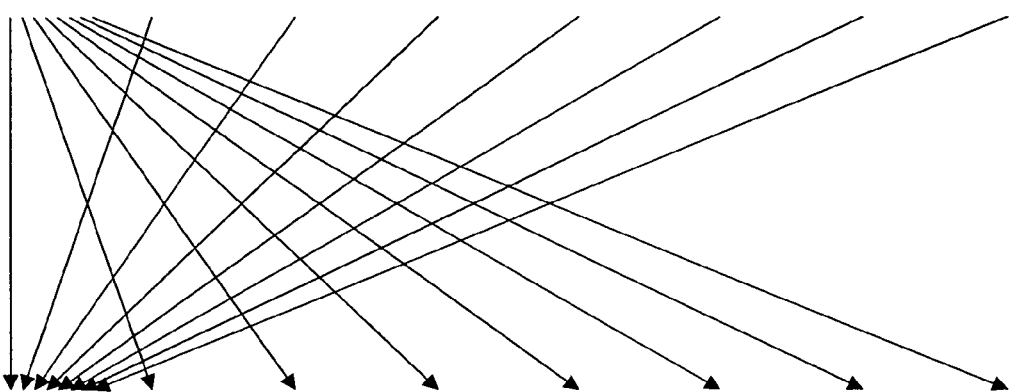
FIG. 80 shows an optical-backplane layer of the Super chassis required for an Add-Drop chassis.

Shown in FIG. 80 is the simplified Optical backplane fabric required for the Add-Drop chassis shown in FIGS. 62 through and including 66. This fabric may be a single layer of the full fabric shown in FIG. 22. Note that if such a simplified Optical backplane were to be used, the chassis would no longer be a Super chassis, but indeed a dedicated Add-Drop chassis.

For Use with the Expanded East-West ROADM

Figure 81:
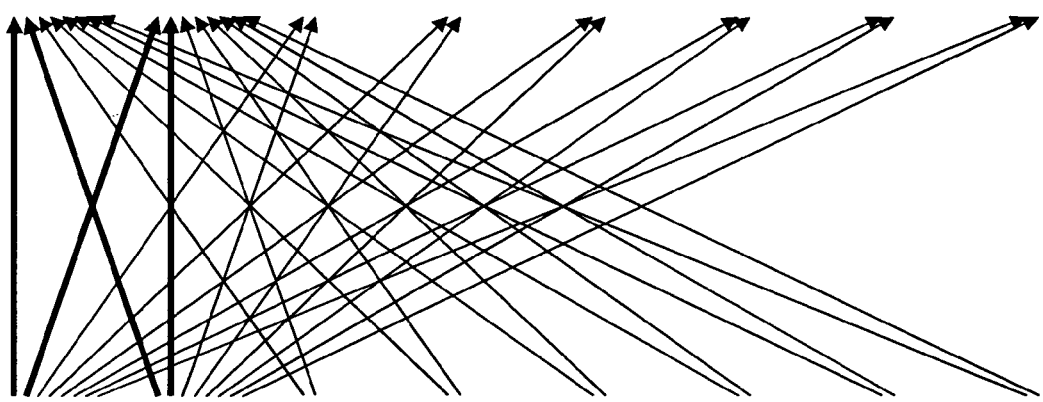
FIG. 81 shows optical-backplane layers of the Super chassis required for an Expanded East-West ROADM.

Shown in FIG. 81 is the simplified Optical backplane fabric required for the Expanded East-West ROADM based on a (hybrid) Super chassis shown in FIGS. 72 through and including 77. This fabric may be two layers of the full fabric shown in FIG. 22. Note that if such a simplified Optical backplane were to be used, the chassis would no longer be a Super chassis, but a specialized Expanded East-West ROADM chassis.

SUMMARY

Thus, modular WSS-based Communications system with colorless and port-transparent add/drop interfaces has been described herein. Note that the techniques described above may be applied to simply optical fiber management, which is described in a co-pending U.S. patent application Ser. No. 11/220,630, entitled "Optical Backplane System", filed Sep. 6, 2005. The cross-connects described above may be implemented or having components as those described in a co-pending U.S. patent application Ser. No. 11/215,058, entitled "Optical Switches", filed Aug. 29, 2005, and co-pending U.S. patent application Ser. No. 10/867,948, entitled "Optical Switch Matrix", filed Jun. 14, 2004. The disclosure of the above-identified applications is incorporated herein in its entirety.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An optical network node, comprising:
   a main chassis having a plurality of slots coupled to a control backplane, an optical backplane, and an electrical backplane;
   one or more cross-connect boards inserted into first slots of the main chassis and coupled to the control backplane and the optical backplane, the one or more cross-connect boards, each having a network ingress port and a network egress port, forming an optical cross-connect including one or more network ingress ports and egress ports;
   an add-drop board inserted into a second slot of the main chassis, wherein one or more channel-wavelength optical signals are capable of being added via the add-drop board onto one of the egress ports of the cross-connect board and one or more of the channel-wavelength optical signals are capable of being dropped via the add-drop board from one of the ingress ports of the cross-connect board;
   a transmit-receive board inserted into a third slot of the main chassis, wherein one or more transmitters generate channel-wavelength optical signals routed to one or more add-ports of the add-drop board by a multi-fiber patch cord and one or more channel-wavelength optical signals are routed from one or more drop ports of the add-drop board by a multi-fiber patch cord to a receiver of the transmit-receive board;
   an optical-2R board inserted into a fourth slot of the main chassis, wherein an output of the optical-2R board generates channel-wavelength optical signals routed to the one or more add-ports of the add-drop board by a multi-fiber patch cord and one or more channel-wavelength optical signals are routed from the one or more drop ports of the add-drop board by a multi-fiber patch cord to an input of the optical-2R board, wherein the optical-2R board includes one or more optical-2R devices that perform signal re-amplification and reshaping operations on the channel-wavelength optical signals without using an optical-to-electrical-to-optical (OEO) conversion; and
   an alien-wavelength board inserted into a fifth slot of the main chassis, separated from the add and drop board, to add and drop signals of only a single predetermined wavelength channel that are not handled by the add and drop board, wherein the signals of the single predetermined wavelength channel are added via the alien-wavelength board into one of the egress ports of the one or more cross-connect boards, and wherein the signals of the single predetermined wavelength channel are dropped via the alien-wavelength board from one of the ingress ports of the one or more cross-connect boards.

2. The optical network node of claim 1, wherein signals that are added and dropped are originated from a client coupled to the alien-wavelength board, and wherein the predetermined wavelength channel is specifically required by the client.

3. The optical network node of claim 2, wherein the main chassis further comprises an optical chassis having a plurality of slots and an electrical chassis having a plurality of slots, the optical chassis being coupled to the control backplane and optical backplane and the electrical chassis being coupled to the control backplane and the electrical backplane, wherein the cross-connect board, the add-drop board, and the alien-wavelength board are inserted into slots of the optical chassis, and wherein the transmitter-receiver board and the optical-2R board are inserted into slots of the electrical chassis.

4. The optical network node of claim 3, wherein interfaces of the optical chassis and the electrical chassis are colorless, wavelength-channel transparent, and network-port transparent add/drop interfaces for a linear, ring, and mesh all-optical network.

5. The optical network node of claim 3, wherein the same wavelength-channel are reused by multiple different transmitters/receivers located in the same main chassis or electrical chassis when connected to multiple different add-drop boards respectively.

6. The optical network node of claim 3, wherein transmitters/receivers located on the main chassis or the electrical-chassis are connected to the same Add-Drop board.

7. The optical network node of claim 3, wherein at least one of optical broadcasting and multicasting is provided for adding a channel-wavelength signal from one of the transmit-receiver board and the optical-2R board.

8. The optical network node of claim 1, wherein the optical backplane comprises one or more layers of optical backplane fabric.

9. The optical network node of claim 1, wherein an additional chassis can be connected to the main chassis and additional boards can be inserted into slots of each chassis.

10. The optical network node of claim 3, wherein multiple identical boards are inserted into multiple slots of one of the main chassis, optical chassis, and electrical chassis, and wherein at least one board is used to back up another board for redundancy purposes.

11. The optical network node of claim 4, wherein the cross-connect board further comprises a dispersion compensation unit compatible with the colorless and port-transparent add/drop interfaces.

12. The optical network node of claim 1, further comprising multi-channel optical channel monitors (OCMs) implemented in the cross-connect board, the add-drop board, and the alien-wavelength board.

13. The optical network node of claim 1, further comprising:
   a first cross-connect board and a second cross-connect board as an auxiliary board to the first cross-connect board that has an $(N-1)\times 1$ switch on its ingress and a $1\times(N-1)$ switch on its egress for selecting a first cross-connect board if the first cross-connect board fails;
   a splitter coupled to transmit a copy of ingress signals to the second cross-connect board if the first cross-connect board fails; and
   a combiner coupled to transmit a copy of egress signals from the second cross-connect board back to the egress of the first cross-connect board.

14. The optical network node of claim 1, further comprising:
   a first cross-connect board and a second cross-connect board as an auxiliary board to the first cross-connect board that has an $(N-1)\times 1$ switch on its ingress and a $1\times(N-1)$ switch on its egress for selecting a first cross-connect board if the first cross-connect board fails;

a 1×2 switch to transmit alternatively the ingress signals to the second cross-connect board if the first cross-connect board fails; and a 2×1 switch to transmit the egress signals from the second cross-connect board back to the egress of the first cross-connect board.

15. The optical network node of claim 3, wherein the cross-connect board is compatible with slot interfaces of at least one of the main chassis and optical chassis.

16. The optical network node of claim 3, wherein the add-drop board is compatible with slot interfaces of at least one of the main chassis and optical chassis.

17. The optical network node of claim 3, wherein the alien-wavelength board is compatible with slot interfaces of the at least one of the main chassis and optical chassis.

18. The optical network node of claim 3, wherein the transmitter-receiver board is compatible with slot interfaces of the at least one of the main chassis and electrical chassis.

19. The optical network node of claim 3, wherein the optical-2R board is compatible with slot interfaces of the at least one of the main chassis and electrical chassis.

20. The optical network node of claim 3, wherein the main chassis or optical chassis and electrical chassis are implemented having fewer slots for supporting a relatively small network node.

21. The optical network node of claim 3, further comprising a distribution-aggregation board compatible with the main chassis for forming a dedicated add-drop chassis, which is colorless and network-port transparent, for connection with the cross-connect board directly, with a dedicated single-channel and multi-channel transmitter-receiver board and a dedicated single-channel and multi-channel optical-2R board.

22. The optical network node of claim 21, further comprising one or more single or multi-channel transmitter-receiver boards inserted into the add-drop chassis.

23. The optical network node of claim 21, further comprising one or more single or multi-channel optical-2R boards inserted into the add-drop chassis.

24. The optical network node of claim 3, further comprising an expanded chassis originated from the main chassis to function as an east-west ROADM, when using two or more cross-connect boards, one or more east-west transmitter-receiver boards, and one or more optical-2R boards.

* * * * *